(12) United States Patent
Toly

(10) Patent No.: US 7,857,626 B2
(45) Date of Patent: Dec. 28, 2010

(54) MEDICAL PHYSIOLOGICAL SIMULATOR INCLUDING A CONDUCTIVE ELASTOMER LAYER

(76) Inventor: Christopher C. Toly, 3213 W. Wheeler St. #178, Seattle, WA (US) 98199

( * ) Notice: Subject to any disclaimer, the term of this patent is extended or adjusted under 35 U.S.C. 154(b) by 1884 days.

(21) Appl. No.: 10/718,492

(22) Filed: Nov. 20, 2003

(65) Prior Publication Data

US 2004/0126746 A1     Jul. 1, 2004

Related U.S. Application Data

(63) Continuation-in-part of application No. 09/695,380, filed on Oct. 23, 2000, now Pat. No. 6,780,016.

(51) Int. Cl.
G09B 23/28    (2006.01)
(52) U.S. Cl. ........................ 434/267; 434/262
(58) Field of Classification Search .............. 434/118, 434/262–275, 307 R, 308, 362, 365; 600/407; 307/116; 178/18.05; 714/742
See application file for complete search history.

(56) References Cited

U.S. PATENT DOCUMENTS

| | | | |
|---|---|---|---|
| 2,689,415 A | 9/1954 | Haver | |
| 2,871,579 A | 2/1959 | Niiranen et al. | |
| 2,995,832 A | 8/1961 | Alderson | |
| 3,426,449 A | 2/1969 | Van Noy, Jr. | |
| 3,704,529 A | 12/1972 | Cioppa | |
| 4,134,218 A | 1/1979 | Adams et al. | |
| 4,273,682 A | 6/1981 | Kanamori | |
| 4,360,345 A | 11/1982 | Hon | |
| 4,439,162 A | 3/1984 | Blaine | |
| 4,459,113 A | 7/1984 | Gatti et al. | |
| 4,481,001 A | 11/1984 | Graham et al. | |
| 4,596,528 A | 6/1986 | Lewis et al. | |
| 4,605,373 A | 8/1986 | Rosen ........................ 434/274 |

(Continued)

FOREIGN PATENT DOCUMENTS

CH         646538 A      11/1984

(Continued)

OTHER PUBLICATIONS

Catalog, Everest Medical Corporation, Minneapolis, MN, 1994.

(Continued)

*Primary Examiner*—Xuan M Thai
*Assistant Examiner*—Timothy Musselman
(74) *Attorney, Agent, or Firm*—Ronald M. Anderson

(57) ABSTRACT

Conductive elastomeric circuits are used in various simulated physiological structures such as tissues and organs, enabling feedback to be provided indicating whether a simulated task is being performed correctly. For example, a surgical trainer has a simulated human tissue structure made of an elastomeric composition, at least one reinforcing layer of a fibrous material, and at least one flexible electrical circuit. The surgical trainer preferably includes multiple areas for practicing surgical skills, each with evaluation circuits for providing feedback regarding that skill. Conductive elastomers are also incorporated into other types of medical training simulators, to similarly provide feedback. In another embodiment, a simulated organ has a conductive elastomeric circuit in the periphery of the simulated organ, enabling feedback to be provided to evaluate whether a person is properly manipulating the organ in response to a manual applied pressure.

16 Claims, 28 Drawing Sheets

U.S. PATENT DOCUMENTS

| | | | |
|---|---|---|---|
| 4,687,885 A * | 8/1987 | Talmage et al. | 178/18.05 |
| 4,767,333 A | 8/1988 | Born | |
| 4,773,865 A | 9/1988 | Baldwin | |
| 4,789,340 A | 12/1988 | Zikria | |
| 4,872,841 A * | 10/1989 | Hamilton et al. | 434/274 |
| 4,898,173 A | 2/1990 | Daglow et al. | |
| 4,907,973 A * | 3/1990 | Hon | 434/262 |
| 5,051,605 A * | 9/1991 | D'Antonio et al. | 307/116 |
| 5,090,910 A | 2/1992 | Narlo | |
| 5,104,328 A | 4/1992 | Lounsbury | |
| 5,112,228 A | 5/1992 | Zouras | |
| 5,137,458 A | 8/1992 | Ungs et al. | |
| 5,149,270 A | 9/1992 | McKeown | |
| 5,175,214 A * | 12/1992 | Takaya et al. | 525/104 |
| 5,205,286 A | 4/1993 | Soukup et al. | |
| 5,211,165 A | 5/1993 | Dumoulin et al. | 600/410 |
| 5,215,469 A | 6/1993 | Kohnke et al. | |
| 5,320,537 A | 6/1994 | Watson | |
| 5,425,644 A | 6/1995 | Szinicz | |
| 5,518,406 A | 5/1996 | Waters | |
| 5,518,407 A | 5/1996 | Greenfield et al. | |
| 5,589,639 A * | 12/1996 | D'Antonio et al. | 73/724 |
| 5,589,838 A | 12/1996 | McEwan | 342/387 |
| 5,609,615 A | 3/1997 | Sanders et al. | |
| 5,620,326 A | 4/1997 | Younker | |
| 5,722,836 A | 3/1998 | Younker | |
| 5,734,418 A | 3/1998 | Danna | |
| 5,754,313 A | 5/1998 | Pelchy et al. | |
| 5,775,916 A | 7/1998 | Cooper et al. | |
| 5,800,178 A | 9/1998 | Gillio | |
| 5,832,772 A | 11/1998 | McEwan | |
| 5,853,292 A * | 12/1998 | Eggert et al. | 434/262 |
| 5,855,553 A * | 1/1999 | Tajima et al. | 600/407 |
| 5,883,591 A | 3/1999 | McEwan | |
| 5,947,743 A | 9/1999 | Hasson | |
| 5,967,790 A * | 10/1999 | Strover et al. | 434/274 |
| 6,074,213 A * | 6/2000 | Hon | 434/262 |
| 6,095,148 A | 8/2000 | Shastri et al. | |
| 6,139,489 A | 10/2000 | Wampler et al. | |
| 6,211,904 B1 | 4/2001 | Adair et al. | |
| 6,234,804 B1 | 5/2001 | Yong | |
| 6,256,012 B1 | 7/2001 | Devolpi | |
| 6,270,491 B1 | 8/2001 | Toth et al. | |
| 6,273,728 B1 * | 8/2001 | van Meurs et al. | 434/268 |
| 6,361,323 B1 * | 3/2002 | Beach et al. | 434/263 |
| 6,428,323 B1 | 8/2002 | Pugh | |
| 6,436,035 B1 | 8/2002 | Toth et al. | |
| 6,527,704 B1 | 3/2003 | Chang et al. | |
| 6,532,379 B2 | 3/2003 | Stratbucker | |
| 6,544,041 B1 * | 4/2003 | Damadian | 434/262 |
| 6,575,757 B1 * | 6/2003 | Leight et al. | 434/273 |
| 6,659,776 B1 | 12/2003 | Aumann et al. | |
| 6,857,878 B1 * | 2/2005 | Chosack et al. | 434/267 |
| 7,321,228 B2 | 1/2008 | Govari | 324/207.17 |
| 2001/0000187 A1 | 4/2001 | Peckham et al. | |
| 2001/0055748 A1 * | 12/2001 | Bailey | 434/262 |
| 2002/0126501 A1 | 9/2002 | Toth et al. | |
| 2002/0168618 A1 * | 11/2002 | Anderson et al. | 434/262 |
| 2003/0051561 A1 * | 3/2003 | Weiss | 73/862.046 |
| 2003/0068606 A1 * | 4/2003 | Nicholls et al. | 434/262 |

FOREIGN PATENT DOCUMENTS

| | | |
|---|---|---|
| DE | 4212908 A1 | 10/1993 |
| EP | 0 601 806 A2 | 6/1994 |
| FR | 0 217 689 A1 | 11/1986 |
| GB | 2 277 826 B | 11/1994 |
| WO | WO 93/14483 | 7/1993 |
| WO | WO 93/16664 | 9/1993 |
| WO | WO 93/21619 | 10/1993 |
| WO | WO 94/25948 | 11/1994 |
| WO | WO 98/58358 | 12/1998 |
| WO | WO 01/32249 A1 | 5/2001 |

OTHER PUBLICATIONS

Catalog, Advanced Surgical, Inc., Princeton, N.J., early as Apr. 1996.
Limbs & Things Ltd. Brochure, Bristol, England, 18 pp. 1996.
"Product News," Limbs & Things Newsletter, 4pp. 1995.
"*The Good, The Bad, and The Ugly*" Target material. Kaman Measuring Systems, 2004, 3pages. <http://www.kamansensors.com/html/technology/technology-tntargetmaterial.htm>.
"*Variable Impedance Transducers*". Kaman Measuring Systems, 2004, 2 pages. <http://www.kamansensors.com/html/technology/technology-variable.htm>.
"*Differential Impedance Transducers*" Kaman Measuring Systems, 2004, 2 pages. <http://www.kamansensors.com/html/technology/technology-differential.htm>.
"*A Low-Power Hall-Effect Switch*." Sensors Magazine, Jun. 1999. Christine Graham, 2 pages Allegro MicroSystems, Inc., USA <http://www.allegromicro.com/techpub2/3210papr.htm>.
"*Giant Magnetic Resistive Potentiometers with Strong Potentialities.*" (CORDIS focus, No. 45, Oct. 2003). 2pages. <http://www.sensorsportal.com/HTML/Potentiometers_Projects.htm>.
"*Non-contact Thread Detection.*" (Sensor Applications, Application Story, Mar. 2002). 2 pages. <http://www.sensorland.com/AppPage049.html>.
"*The Hall Effect*." How they Work, How Sensors Work—HART Protocol. Sep. 22, 2004. 2 pages. <http://www.sensorland.com/HowPage046.html>.
"*Technical Advances in Hall-Effect Sensing*". (Product Description) Allegro® MicroSystems, Inc. Gilbert, Joe. 6 pages.

\* cited by examiner

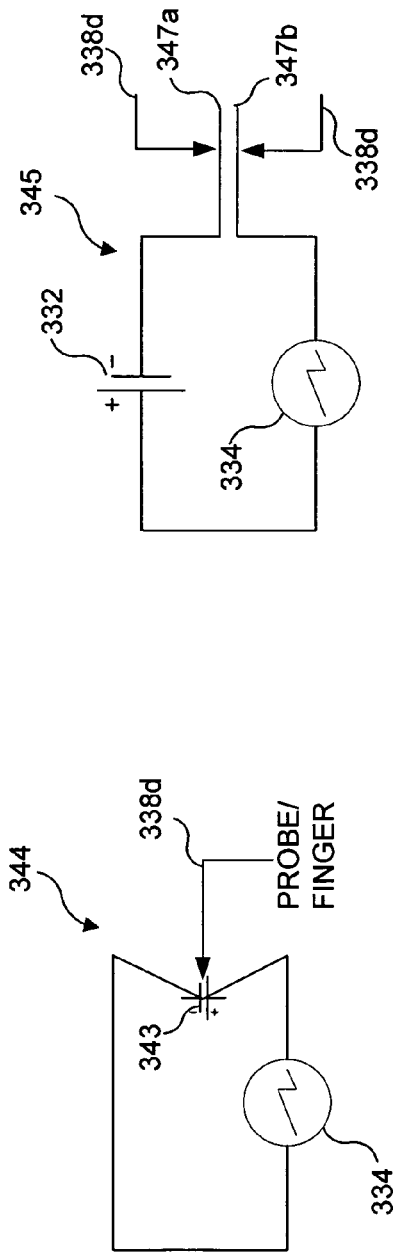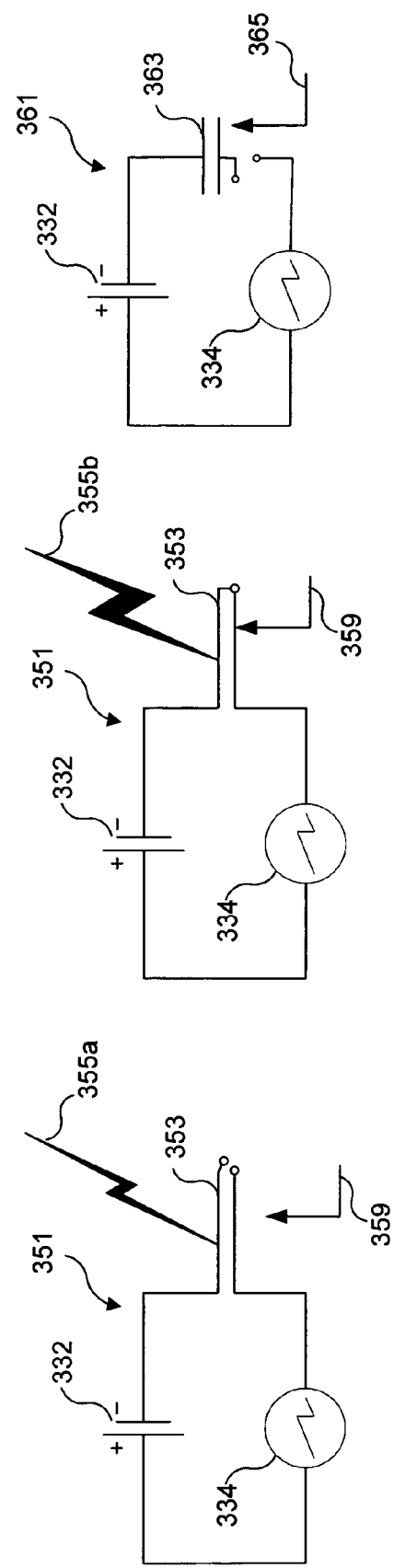
FIG. 11A
FIG. 11B
FIG. 11C
FIG. 11D
FIG. 11E

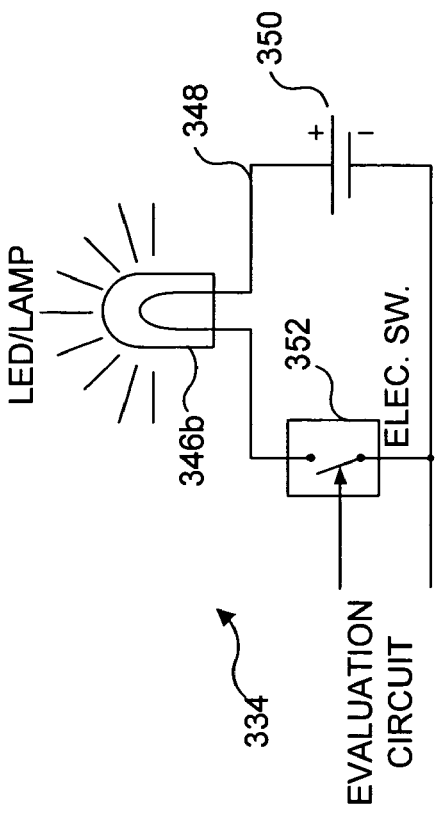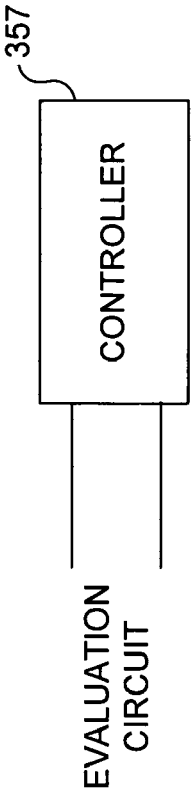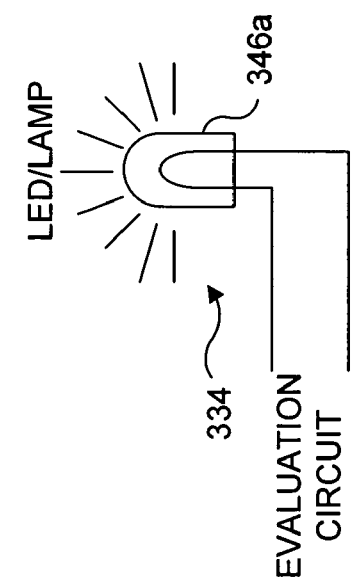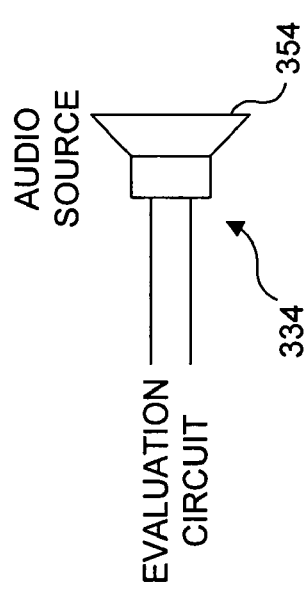
*FIG. 12A*  *FIG. 12B*  *FIG. 12C*  *FIG. 12D*

MEDICAL PHYSIOLOGICAL SIMULATOR INCLUDING A CONDUCTIVE ELASTOMER LAYER

RELATED APPLICATIONS

This application is a continuation-in-part of a patent application, Ser. No. 09/695,380, filed on Oct. 23, 2000, now U.S. Pat. No. 6,780, 016, the specification and drawings of which are hereby incorporated herein by reference, and the benefit of the filing date of which is hereby claimed under 35 U.S.C. §120.

FIELD OF THE INVENTION

The present invention generally pertains to simulated physiological structures for use as medical training aids, and more specifically, to simulated physiological structures that include conductive elastomeric circuits to provide feedback related to simulated procedures performed on the simulated physiological structures.

BACKGROUND OF THE INVENTION

The use of simulated physiological structures for training medical students and providing skill training for practicing physicians is widespread. Although cadavers have traditionally been beneficially employed for this purpose, cadavers are not always readily available and are not well suited for all types of training.

Simulated physiological structures should preferably be usable repeatedly and should provide a realistic training experience corresponding to what the trainee would expect if applying a procedure on an actual patient. Students, and even practicing physicians and nurses, often need to be tested to determine their skill level with respect to certain procedures. Since an objective standard is preferable in conducting such tests, a simulated physiological structure should include systems for providing feedback indicating how well the student or physician is performing a simulated task.

The need for such simulators should not be underestimated, because they can provide valuable training that will lead to more effective treatment of patients. For example, medical personnel who administer emergency trauma care can greatly benefit from the training achieved using a simulated physiological structure. Training in administering trauma surgical procedures, which include those procedures that are usually performed on a person who has experienced some form of severe and often life-threatening injury, is particularly beneficial. Such procedures may aid in the diagnosis of a condition, or may provide immediate life-saving care until more complete medical treatment is available. The procedures may include clearing a blocked airway or draining accumulations of fluids from internal organs. While appearing to be simple procedures, if these procedures are performed improperly, the result can worsen the patient's condition, placing the patient at an even greater peril of death. By their nature, trauma procedures are usually performed under emergency conditions in which the person administering the care is under time-related stress. It is therefore useful to provide training methods and apparatus to fully prepare students and physicians in these procedures, so that they can be performed without delay, under stressful conditions.

It should be noted that one reason why the use of a training model (either a cadaver, an animal, or a simulator) is desirable is that while anatomy follows general rules; variations based on sex, age, height, and weight are the norm. A surgical student cannot simply be provided directions such as "make an incision four inches long and two inches deep, starting at the navel." Normal variations such as the amount of body fat will significantly change the depth of fat tissue that must be incised to reach an internal organ. Surgeons must rely on their knowledge of general anatomy, and visual cues (i.e. the patient has low body fat, the patient has high body fat, the patient is a child, the patient is an adult, the patient is a female, etc.) to determine the correct location on a specific patient for performing a procedure. The use of cadavers, animal models, and anatomically correct simulators enable surgical students to apply their knowledge of anatomy to determine the proper position for executing a procedure.

To provide the desired level of realism, a simulated physiological structure used for training medical personnel should provide tactile sensations during a simulated procedure that faithfully portray the tactile sensations experienced during an actual procedure performed on a patient. Human anatomical models have been proposed using elastomeric compositions for human tissue. However, most elastomeric-based simulators that have previously been created do not include a level of detail that faithfully portrays the finer aspects of human tissue, including the tactile feel of different types of tissue.

Even if a simulated physiological structure having simulated tissue faithfully portrays finer details of an actual physiological structure and provides a realistic tactile sensation during a simulated procedure, prior simulators do not include means for producing objective and measurable results that can be used to evaluate how well a simulated procedure is performed. Clearly, it would be desirable to employ a simulated physiological, structure that is able to provide a realistic tactile sensation during a simulated procedure, and which is also able to provide an objective indication that can be used to evaluate how well a simulated procedure was executed.

One of the key requirements for such a simulator is that physically flexible electrical circuitry be included within the elastomeric material that represents tissue and other flexible organic elements, without changing the tactile characteristics of the elastomeric material. For example, flexible elastomeric conductive materials can be employed to produce flexible circuits that would be usable in a simulator. Sanders et al. (U.S. Pat. No. 5,609,615) discloses a cardiac simulator including an electrically conductive polymer. Thus, medical devices including electrically conductive polymers are known in the art. Indeed, other patents disclose the use of electrically conductive polymers in medical treatment devices (see for example: U.S. patent application Ser. No. 2001/0000187 (Peckham et al.) describing prosthetics; U.S. Pat. No. 6,532,379 (Stratbucker) describing a defibrillator lead; U.S. Pat. No. 6,095,148 (Shastri et al.) describing a neural stimulator; U.S. Pat. No. 4,898,173 (Daglow et al.) describing an implantable electrical connector; PCT application WO 01/32249 (Geddes et al.) describing a tracheotrode; EPO application No. 0601806A2 (Moaddeb et al.) describing a cardiac stimulating electrode; and EPO application No. 0217689 (Compos) describing an ultrasound transducer). Each of the Toth references (U.S. Pat. Nos. 6,540,390; 6,436, 035; and 6,270,491) discloses a surgical light that includes a user-actuatable switch that is constructed using conductive elastomers. Kanamori (U.S. Pat. No. 4,273,682) discloses a pressure sensitive conductive elastomer, but not in the context of a simulated physiological structure. Soukup et al. (U.S. Pat. No. 5,205,286) describes an implantable data port that employs an electrically conductive polymer to enable data to be conveyed from an implanted medical device or sensor to an externally disposed data dump. While the data port includes a conductive elastomer, the circuit does not provide evaluation data regarding a simulated procedure and is not part of a simulated physiological structure used for training purposes.

Significantly, none of the above-described medical devices are training devices or models simulating human tissue or physiology, but they do demonstrate some of the advantages of using a conductive polymer. Since elastomeric materials can be employed to produce realistic simulated physiological structures, it would be desirable to provide a simulated physiological structure that includes an evaluation circuit formed from a conductive elastomer that does not alter the tactile sensations of the elastomeric materials with which the conductive elastomer is used. It would be also be desirable to provide a simulated organ that includes a pressure-sensitive conductive elastomer in the periphery of a simulated organ, to enable an evaluation of a trainee's ability to properly manipulate the simulated organ. The prior art does not disclose simulated physiological structures that can provide these important capabilities.

SUMMARY OF THE INVENTION

The present invention is directed to a simulated physiological structure that includes a conductive elastomer-based circuit. Preferably the conductive elastomer-based circuit is an evaluation circuit configured to enable feedback relating to a simulated procedure to be provided. The feedback can be provided as a visual or audible indication. The feedback can be hidden from the trainee and provided only to a proctor, or provided to the trainee during the simulation. The feedback can also be a simulated physiological response initiated in the simulated physiological structure, such as a change in a simulated heartbeat, the simulated physiological response being consistent with the simulated procedure. The evaluation circuit is configured to provide a signal relating to a simulated procedure being performed on the simulated physiological structure. The conductive elastomer enhances the realism of the simulator, as conventional conductors would look out of place in a simulated physiological structure.

In at least one embodiment, the evaluation circuit is configured to provide the signal when a change in pressure is applied to at least a portion of the simulated physiological structure. Such an embodiment can be implemented using a piezoelectric element responsive to a change in pressure, or by using a capacitance-based sensor, wherein the signal corresponds to a magnitude of the applied pressure.

In at least one embodiment, the evaluation circuit is configured to provide the signal when at least a portion of the simulated physiological structure is touched. Such an embodiment can be implemented using a capacitance sensitive switch, a resistance sensitive switch, a temperature sensitive switch, or a radio sensitive switch.

In some embodiments, the evaluation circuit is configured to provide the signal when a manipulation of at least a portion of the simulated physiological structure causes the evaluation circuit to close. Such an embodiment can be implemented using an evaluation circuit that includes an energized portion coupled to a power supply, and a target portion disposed adjacent to the energized portion, such that the target portion is coupled to the energized portion to complete the circuit and produce the signal when an instrument is properly employed in the simulated procedure. Such an embodiment can also be implemented using an evaluation circuit that is not initially energized, such that the evaluation circuit is energized and produces the signal when an instrument coupled with a power supply is properly employed in the simulated procedure. Yet another implementation involves an evaluation circuit that is incomplete at a gap in the evaluation circuit, and wherein the evaluation circuit is completed when a conductive probe employed in the simulated procedure is positioned in the gap to correctly perform the simulated procedure, thereby producing the signal. Still another implementation involves an evaluation circuit that is incomplete because a portion of the simulated physiological structure acts as an insulator separating portions of the evaluation circuit, and the simulated procedure requires the insulative portion to be removed, and the adjacent portions of the evaluation circuit to be coupled together.

In other embodiments, the evaluation circuit is configured to provide the signal when a manipulation of at least a portion of the simulated physiological structure causes the evaluation circuit to open. In yet another embodiment, the evaluation circuit is configured to provide the signal when an instrument is in proximity to at least a portion of the simulated physiological structure. Proximity sensing can be achieved by using touch sensitive circuits, capacitance sensitive circuits, and inductive circuits. Preferably the evaluation circuit is implemented in three dimensions.

Some embodiments further include a sensor coupled with the evaluation circuit, and the evaluation circuit is configured to provide the signal when the sensor indicates a change in a physical property has been detected. Beneficial sensors will include temperature sensors and chemical sensors.

Some embodiments include additional evaluation circuits. Preferably each additional evaluation circuit includes a conductive elastomer, and each additional evaluation circuit is configured to provide a signal when a different portion of the simulated physiological structure is manipulated during a procedure performed on the simulated physiological structure.

Preferably the physiological training and evaluation simulator includes an indicator coupled to the evaluation circuit, such that in response to the signal the indicator provides an indication relating to the performance of the simulated procedure. The indicator can be implemented as a light source, a meter, or an audio source.

Preferably the evaluation circuit couples to a processor configured to manipulate the signal. In some embodiments, the physiological training and evaluation simulator includes a physiological control element configured to produce a simulated physiological response in the simulated physiological structure under the control of the processor. The physiological control element can be implemented by a pump or a servo, or both.

In another embodiment, the conductive elastomer is configured to achieve a touch sensitive circuit. Touch sensitive circuits can be achieved using circuits sensitive to changes in temperature, resistance, capacitance, and radio reception. Some touch sensitive circuits can be configured to be pressure sensitive as well, such that a magnitude of pressure applied can be determined.

The simulated physiological structure can be a layered tissue structure, a simulated joint, a simulated bone, a simulated internal organ, or a more complex model that includes more than one different type of simulated physiological structure. Particularly in complex models, at least a portion of the evaluation circuit is implemented as a neural network simulating nerve bundles.

In a preferred embodiment of the layered human tissue structure, the tissue includes a skin layer of silicone reinforced with a silicone-coated fibrous layer, a subcutaneous fat layer of silicone underlying the skin, an anterior rectus sheath layer of silicone reinforced with a silicone-coated fibrous layer underlying the subcutaneous fat, a muscle layer of silicone underlying the fat, a posterior rectus sheath layer of silicone reinforced with a silicone-coated fibrous layer underlying the muscle layer, an extraperitoneal layer of silicone underlying the posterior rectus sheath, and a peritoneum of silicone reinforced with a silicone-coated layer underlying the extraperitoneal layer. Various different silicone compositions are employed for each of the individual layers to mimic the consistency of the analogous human tissue. Pigments are incorporated in the layers to make the simulated tissue appear visually similar to human tissue. At least a portion of one such layer is formed using a conductive elastomer configured to achieve an evaluation circuit that is used as noted above.

In another embodiment, a simulated human tissue includes artificial venous and arterial channels. Conductive elastomers are included within these channels, enabling electrical circuits to be distributed throughout the simulated human tissue structure. Such circuits are used to electrically couple various devices distributed within the simulated human tissue structure. For example, the simulated human tissue structure can include a simulated heart configured to "beat," and the circuits disposed in the artificial venous and arterial channels are used to provide electrical energy to power the simulated heart. The circuits are also used to control the simulated heart, to reflect changes in heartbeat function due to a simulated anesthetic being administered, or a simulated arrest. When the simulated physiological structure is a simulated human tissue structure that includes a plurality of layers, the electrical circuit is preferably part of at least one layer.

A simulated organ, either alone or when disposed underlying a simulated human tissue structure, can incorporate a conductive elastomeric circuit in its periphery that is actuated by and monitors applied pressure, enabling feedback to be provided to evaluate if a student is manipulating the organ using acceptable techniques.

Preferably, regardless of the specific physiological structure being simulated, the electrical evaluation circuit is disposed relative to the simulated physiological structure so that a simulated medical procedure being performed on the simulated physiological structure can be objectively evaluated. In most cases, the electrical evaluation circuit is part of the simulated physiological structure.

One embodiment of the present invention is a surgical trainer having a simulated human tissue structure made of an elastomeric composition. The surgical trainer preferably includes multiple areas for practicing surgical skills. A key aspect of this embodiment is the inclusion of flexible electrical circuits, formed of conductive elastomers, in the simulated human tissue structure. These circuits enable feedback to be provided regarding the skill and accuracy with which a simulated task or procedure is being performed. For example, when the simulated task is pericardiocentesis, circuits made of conductive elastomers included in the simulated human tissue structure measure how accurately a student positions a needle used to perform the task. The measurement provided by the circuits indicates not only the position where the needle is inserted, but also the depth of its insertion.

Another aspect of the invention is directed to fabricating a conductive elastomer by adding conductive carbon to an elastomeric material. The conductive carbon is added to an elastomeric monomer, and the electrical evaluation circuit is then cast into a desired configuration. The polymerization is induced by a chemical agent, or by irradiating the mixture of the conductive carbon and the elastomeric monomer.

Yet another aspect of the present invention is directed to a method for making a medical training model suitable for medical skills training and evaluation, including the steps of determining a physiological structure that the medical training model is to simulate, determining a medical procedure that the simulated physiological structure will be used to simulate, and constructing a medical training model using the selected simulated physiological structure. The step of constructing a medical training model is performed so that the medical training model includes the selected simulated physiological structure and an electrical evaluation circuit having a conductive elastomer. The electrical evaluation circuit is configured to provide feedback relating to the simulated medical procedure.

Preferably, the electrical evaluation circuit is disposed proximate a location on the simulated physiological structure at which a medical device will be employed in a simulated medical procedure, to evaluate if a user performed the simulated medical procedure properly.

In one embodiment, the electrical evaluation circuit is disposed in the periphery of the simulated physiological structure as the medical model is constructed. The electrical evaluation circuit is either configured to be incomplete, so that portions of the electrical evaluation circuit are electrically coupled to form a complete circuit by a medical device when the medical device is properly utilized to perform the simulated procedure, or so that portions of the electrical evaluation circuit are broken by a medical device to form an incomplete circuit when the medical device is properly utilized to perform the simulated procedure.

In at least one embodiment, the electrical evaluation circuit is configured to include or couple to a light source, to provide a visual indication when the medical device is properly utilized to perform the simulated procedure.

Still another aspect of the present invention is directed to a method for evaluating the performance of a trainee using a medical training model to execute a simulated medical procedure. In this method, a medical training model including a simulated physiological structure and a conductive elastomer-based electrical evaluation circuit is provided to the trainee. The conductive elastomer-based electrical evaluation circuit is configured to provide an indication either that the trainee has correctly executed the simulated medical procedure, or that the trainee has incorrectly executed the simulated medical procedure.

The conductive elastomer-based electrical evaluation circuit is used to monitor the trainee's performance, to produce an indication indicative of the quality of the performance. In one embodiment, the indication is provided to a proctor, such that the trainee is unaware of the evaluation of the performance during the simulated medical procedure. In another embodiment, the indication is used to provide at least one of a visual and an audible feedback to the trainee during the execution of the simulated medical procedure.

BRIEF DESCRIPTION OF THE DRAWINGS FIGURES

The foregoing aspects and many of the attendant advantages of this invention will become more readily appreciated as the same becomes better understood by reference to the following detailed description, when taken in conjunction with the accompanying drawings, wherein.

Figure 1:
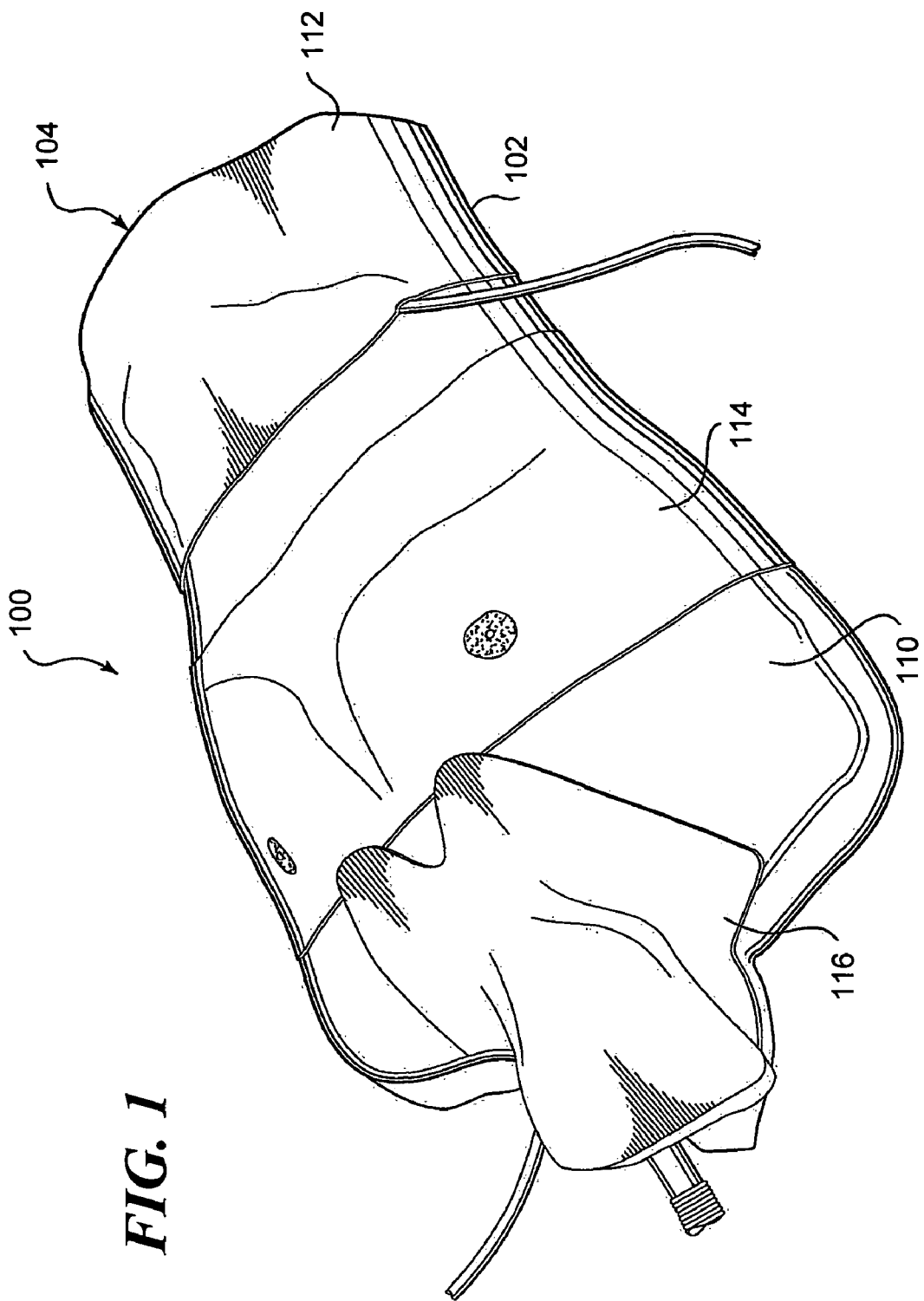
FIG. 1 is a perspective view of a human torso surgical trainer constructed according to the present invention.
Figure 3:
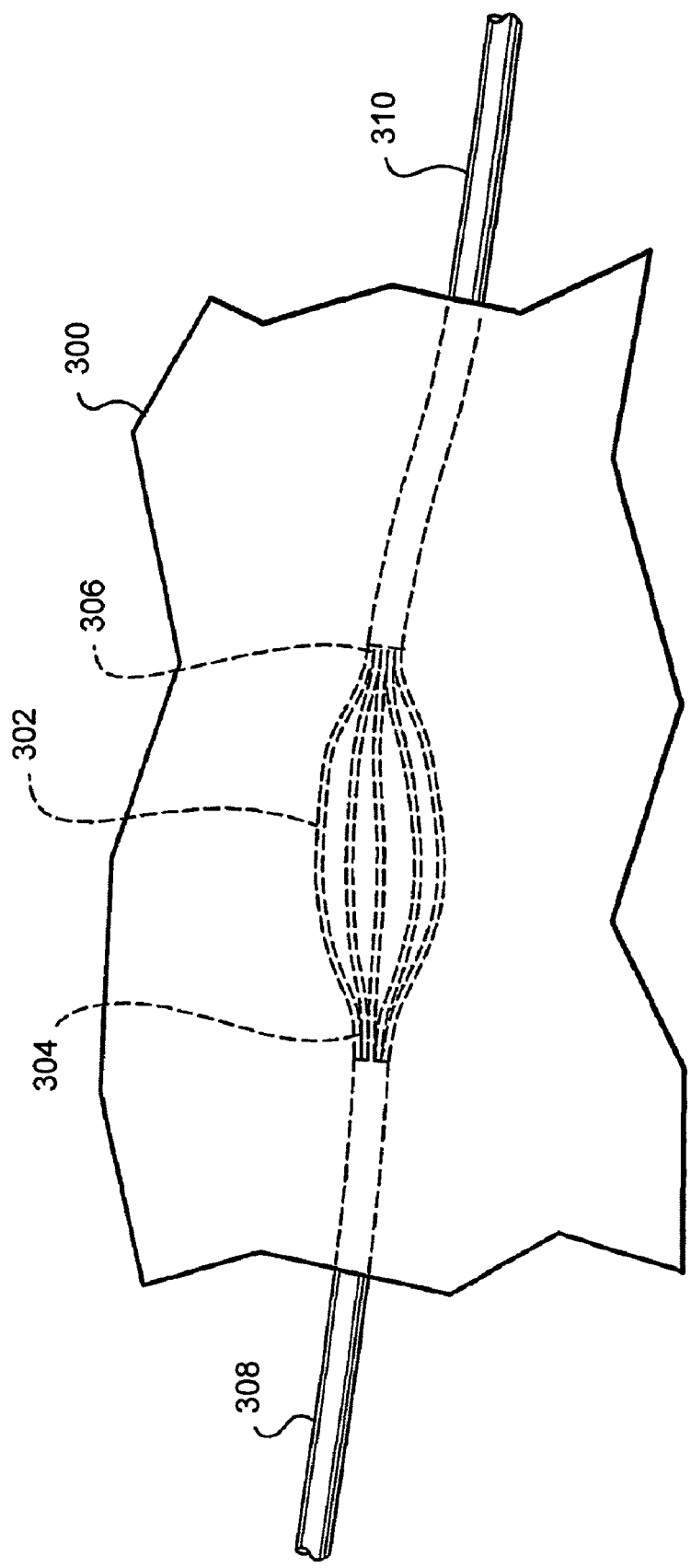
FIG. 3 is a plan view of human tissue with simulated venous and arterial channels constructed according to the present invention.
Figure 4:
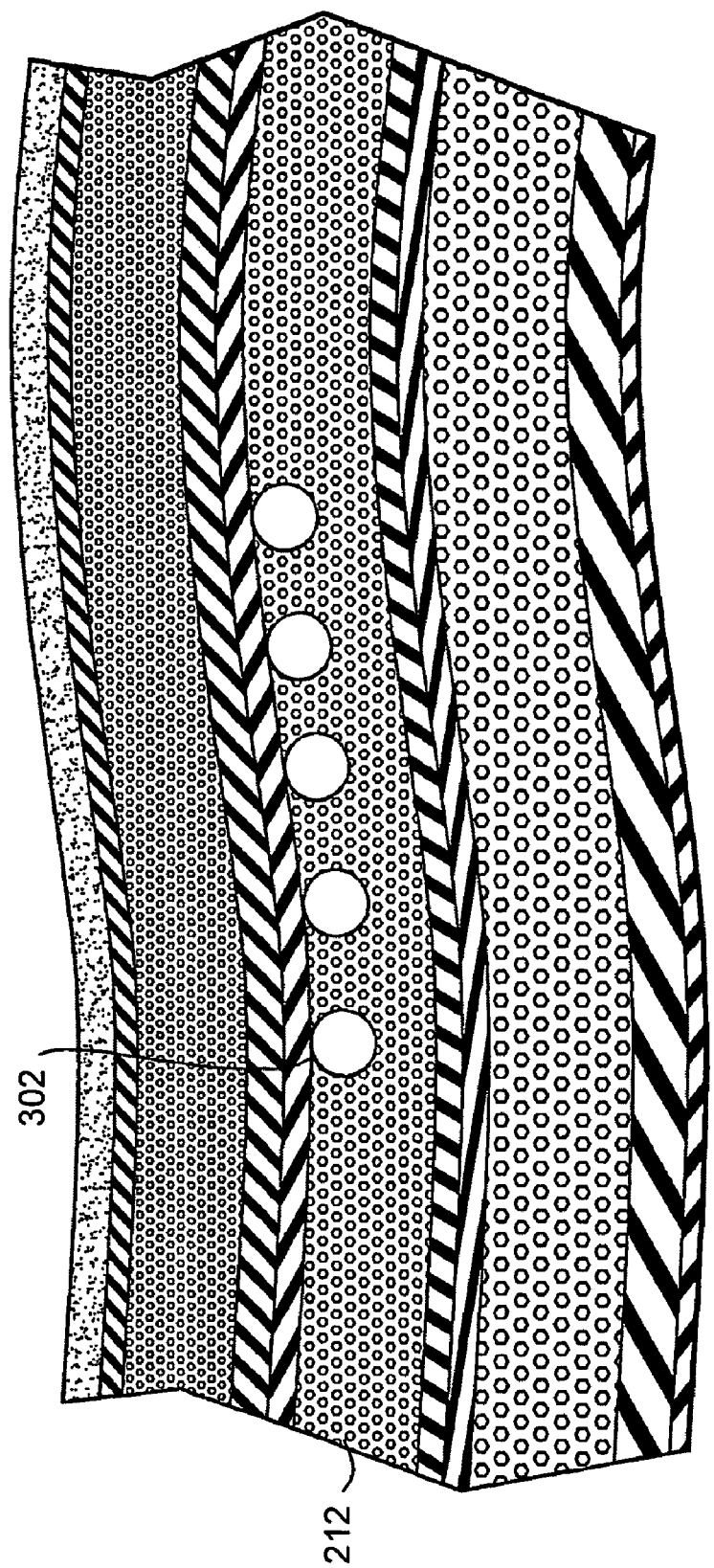
FIG. 4 is a cross-sectional view of the simulated human tissue of FIG. 3.
Figure 10B:
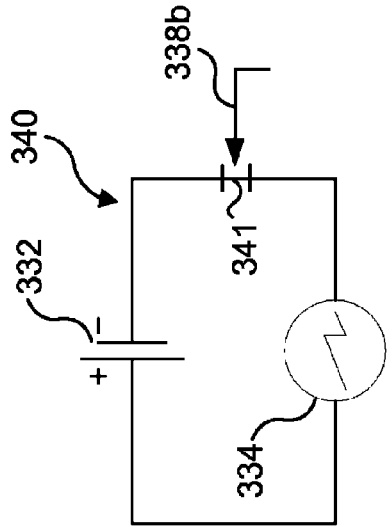
Figure 10D:
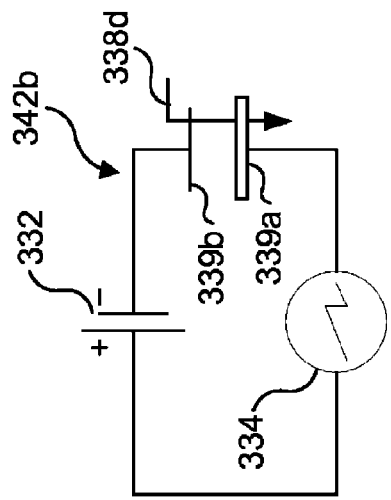
Figure 10A:
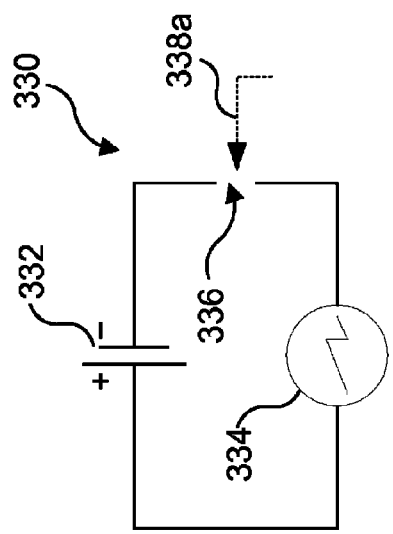
Figure 10C:
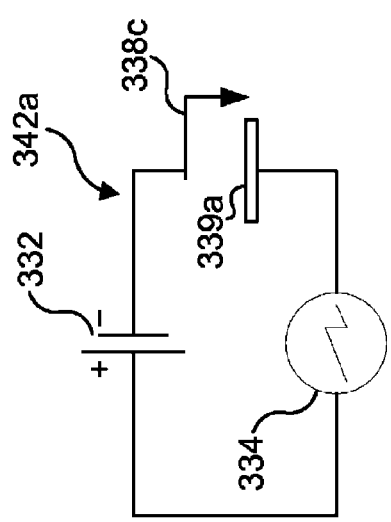
Figure 21:
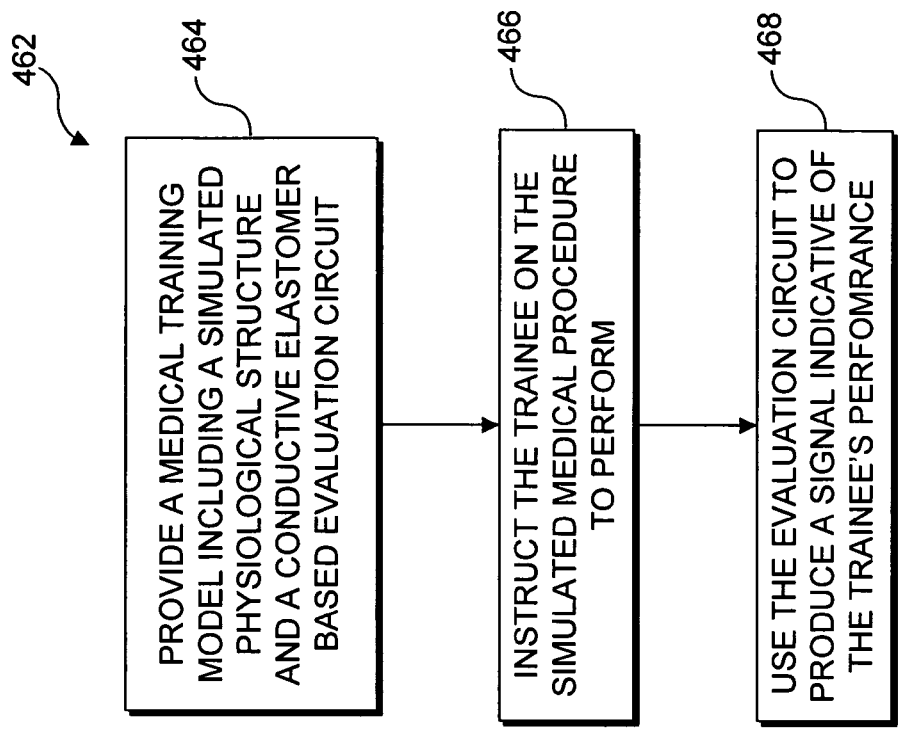
Figure 13:
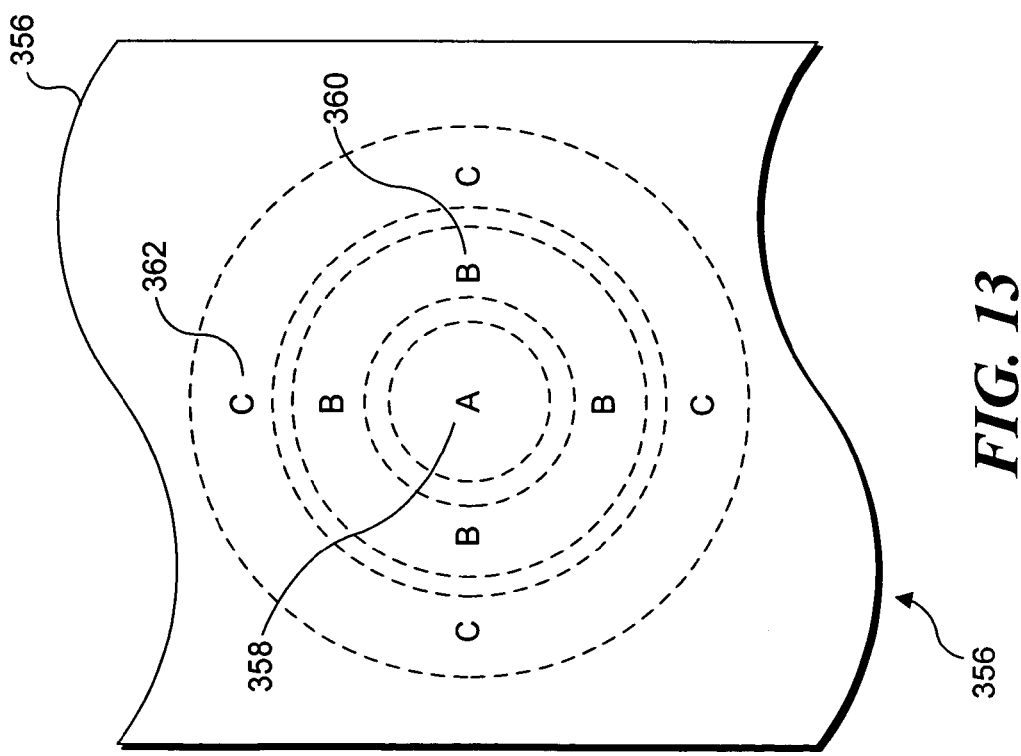
Figure 14A:
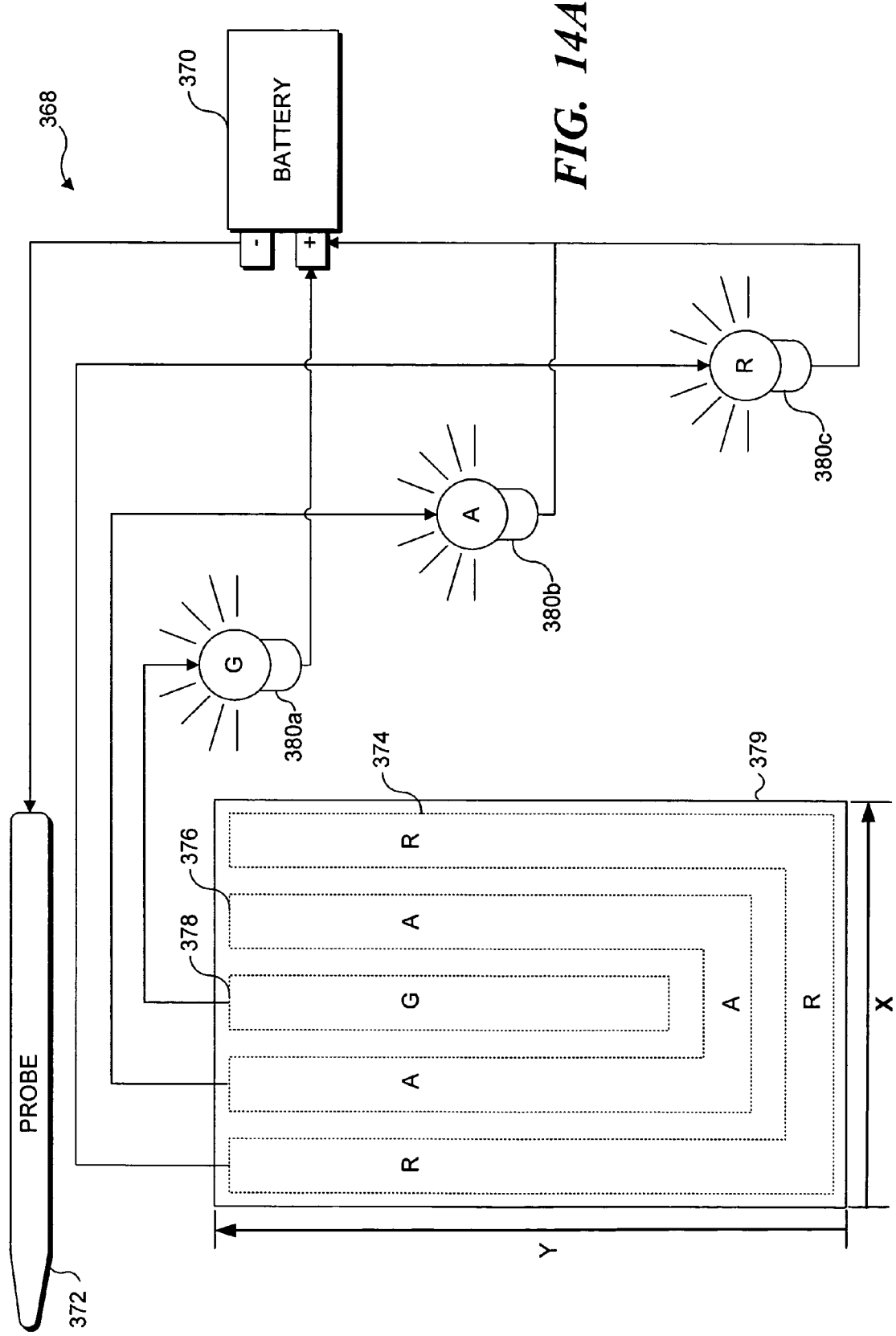
Figure 14B:
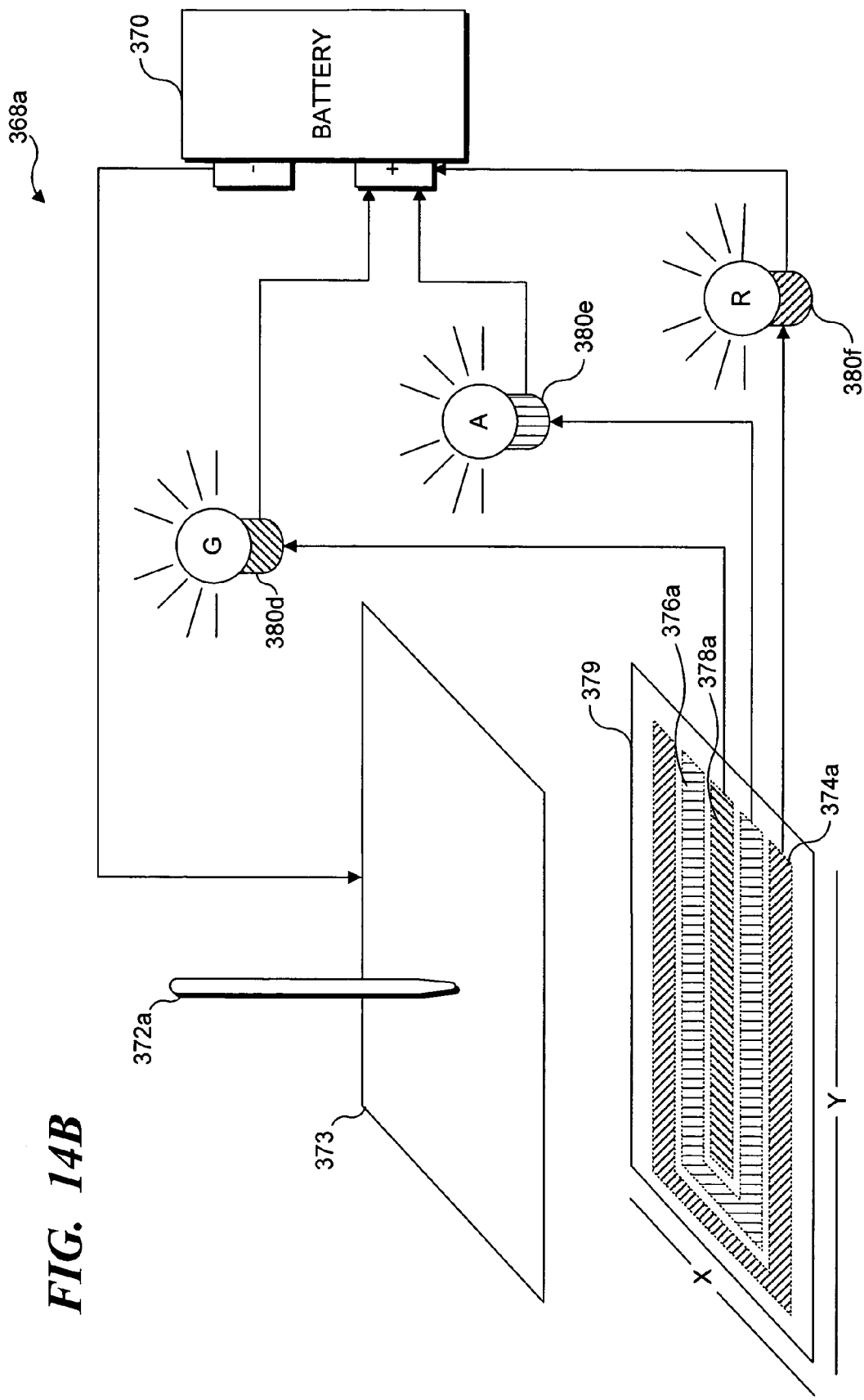
Figure 15:
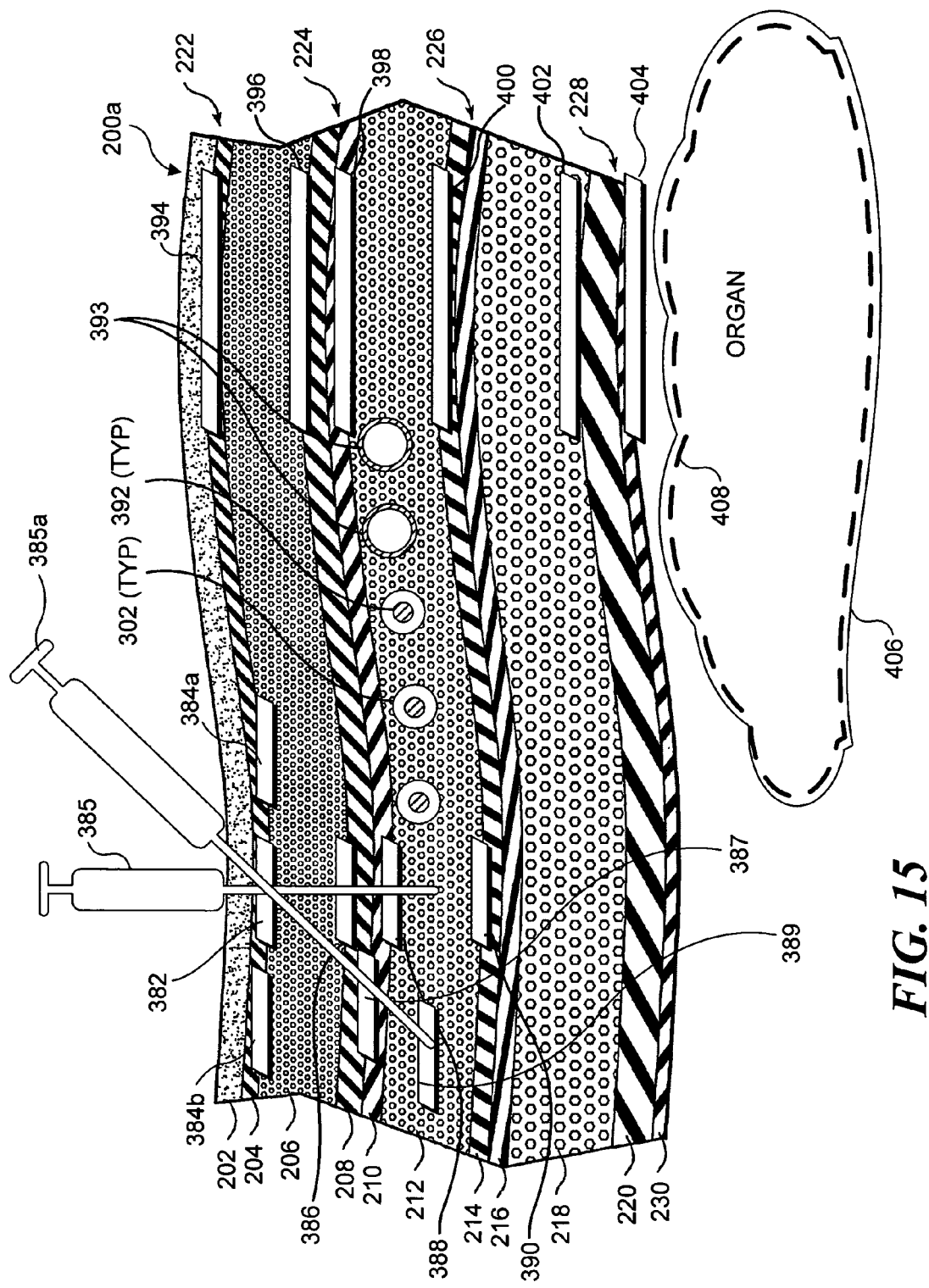
Figure 16:
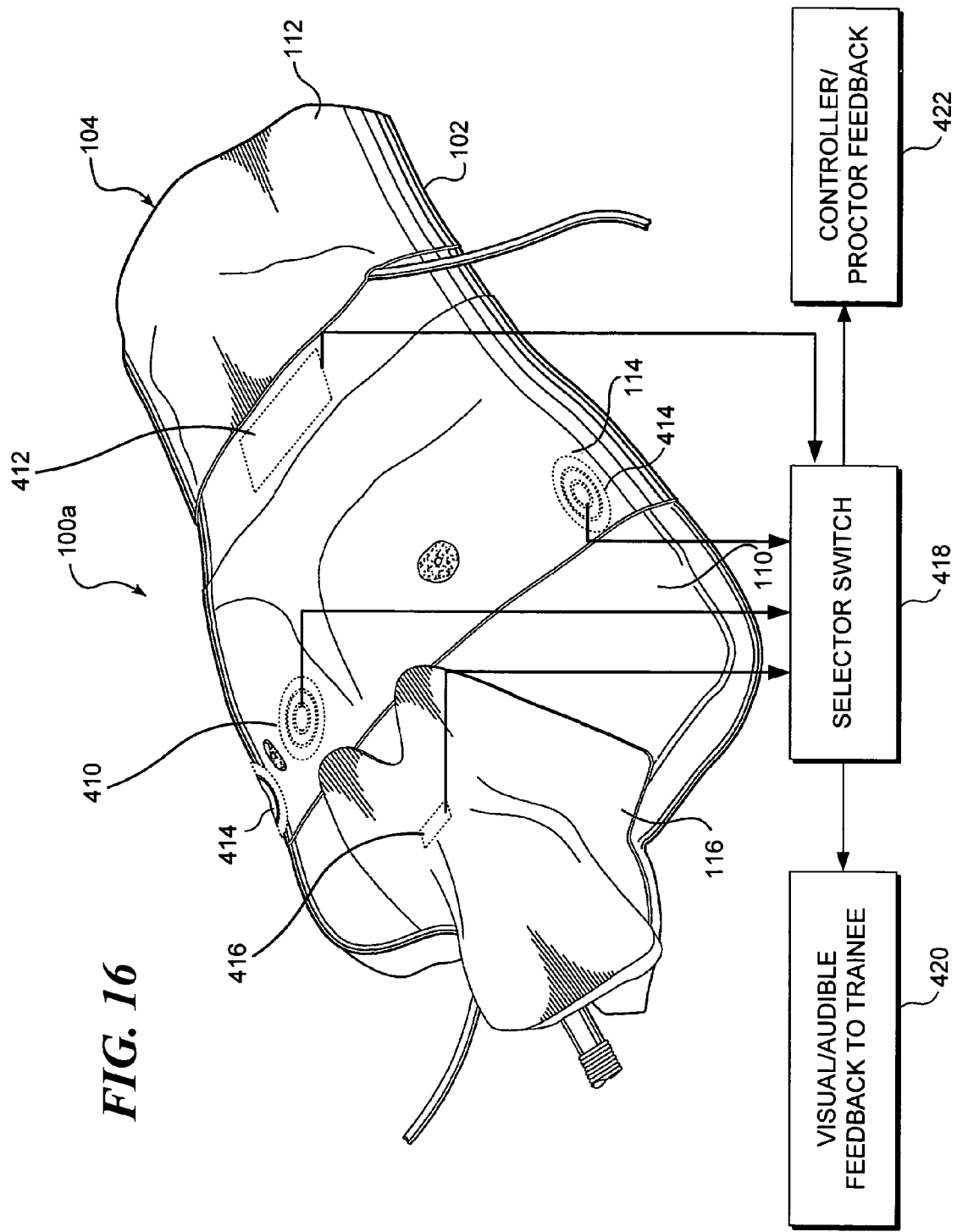
Figure 17A:
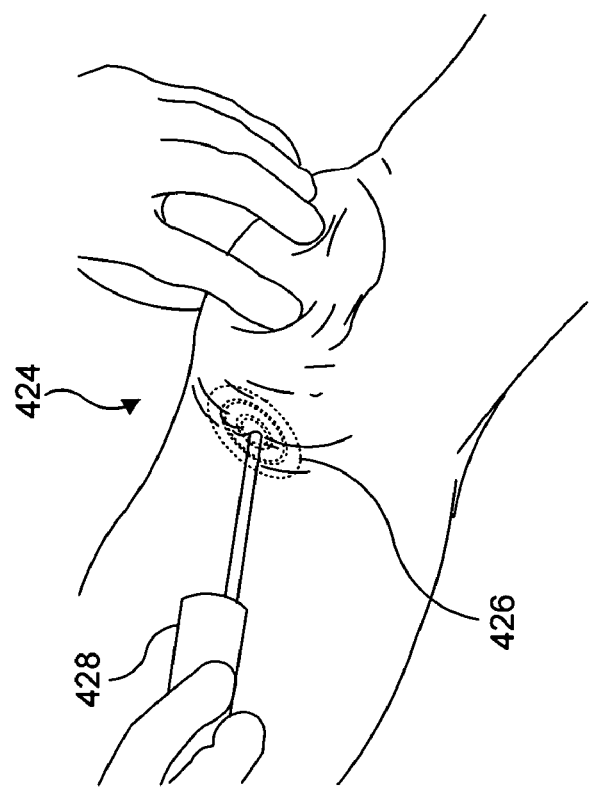
Figure 17B:
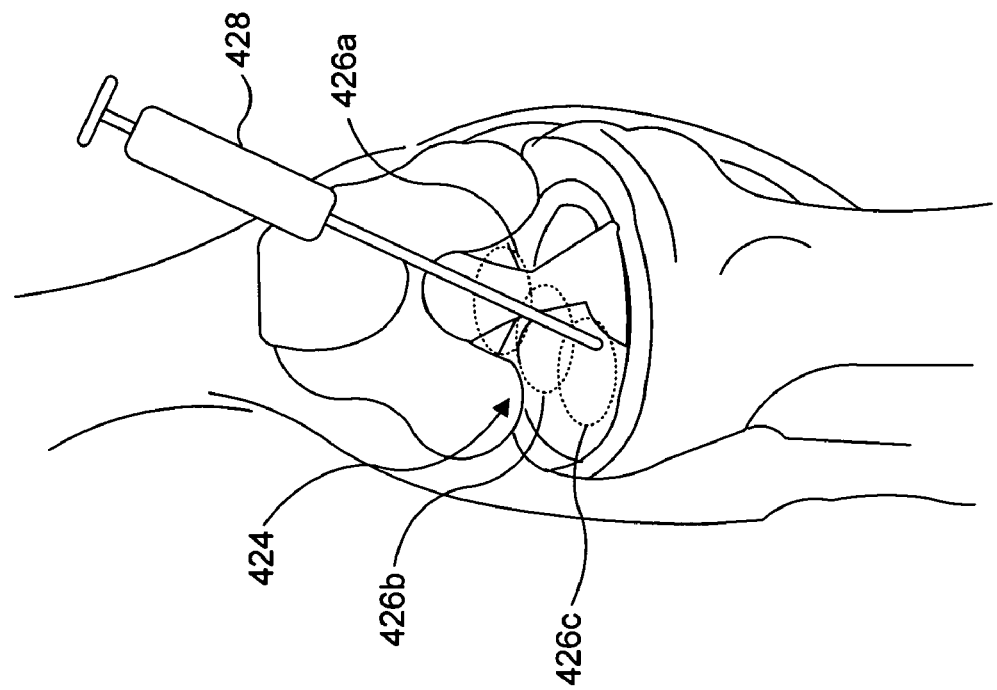
Figure 18:
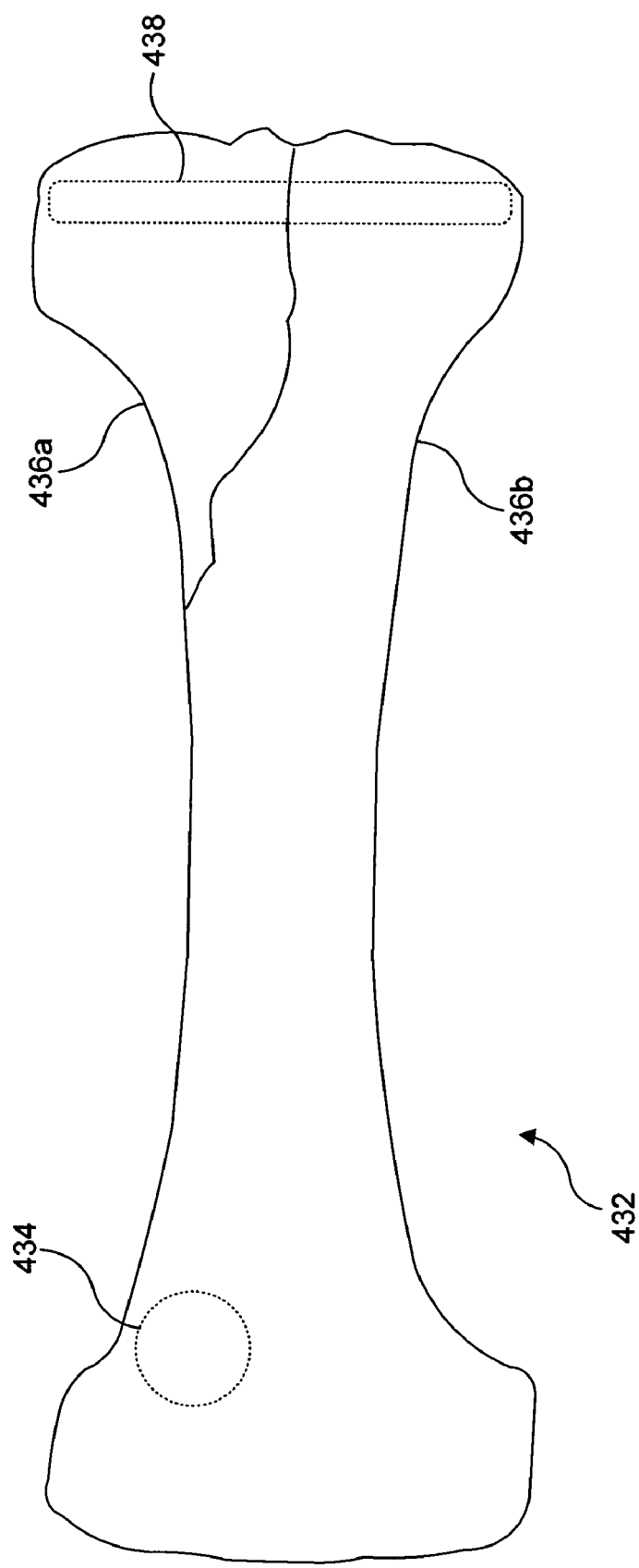
Figure 19A:
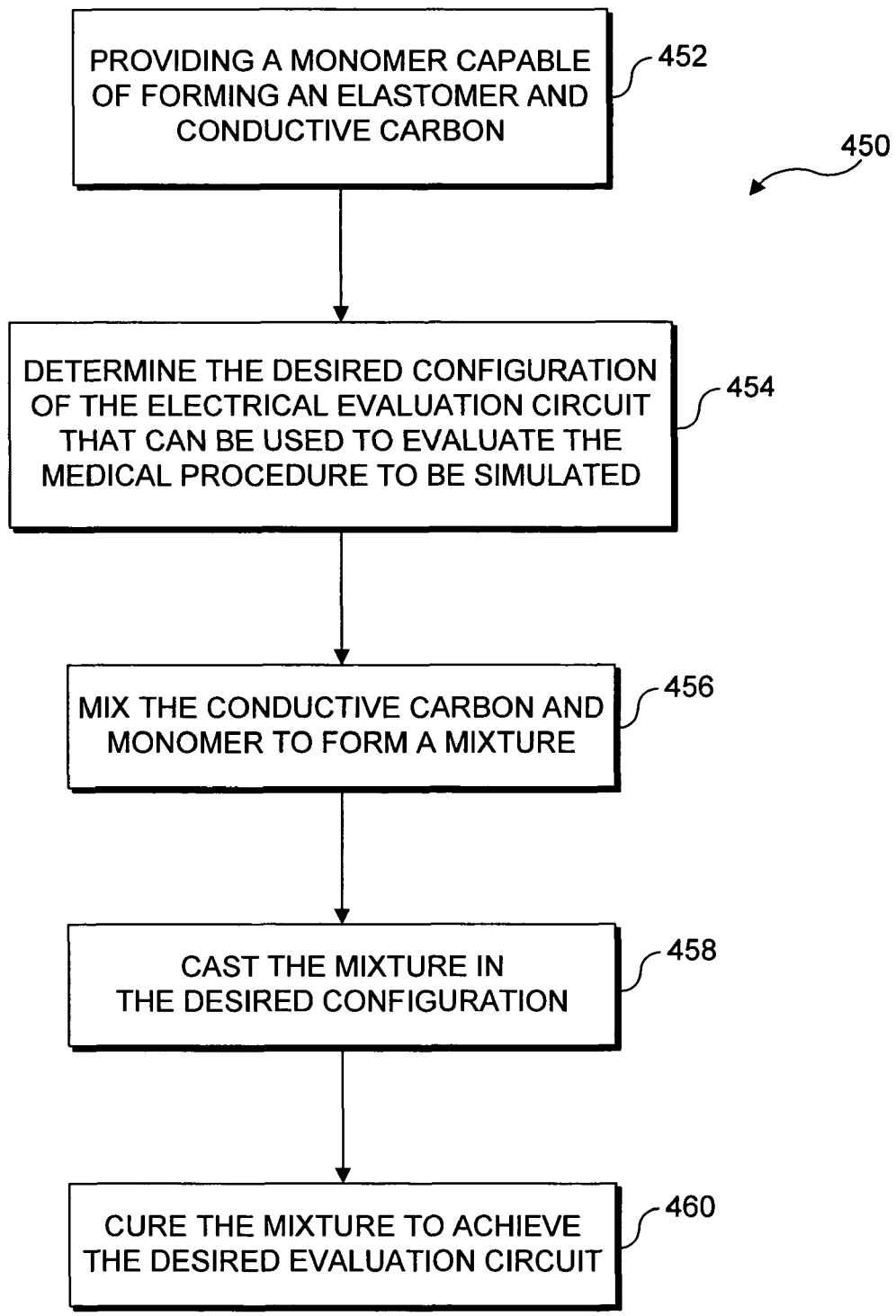
Figure 19B:
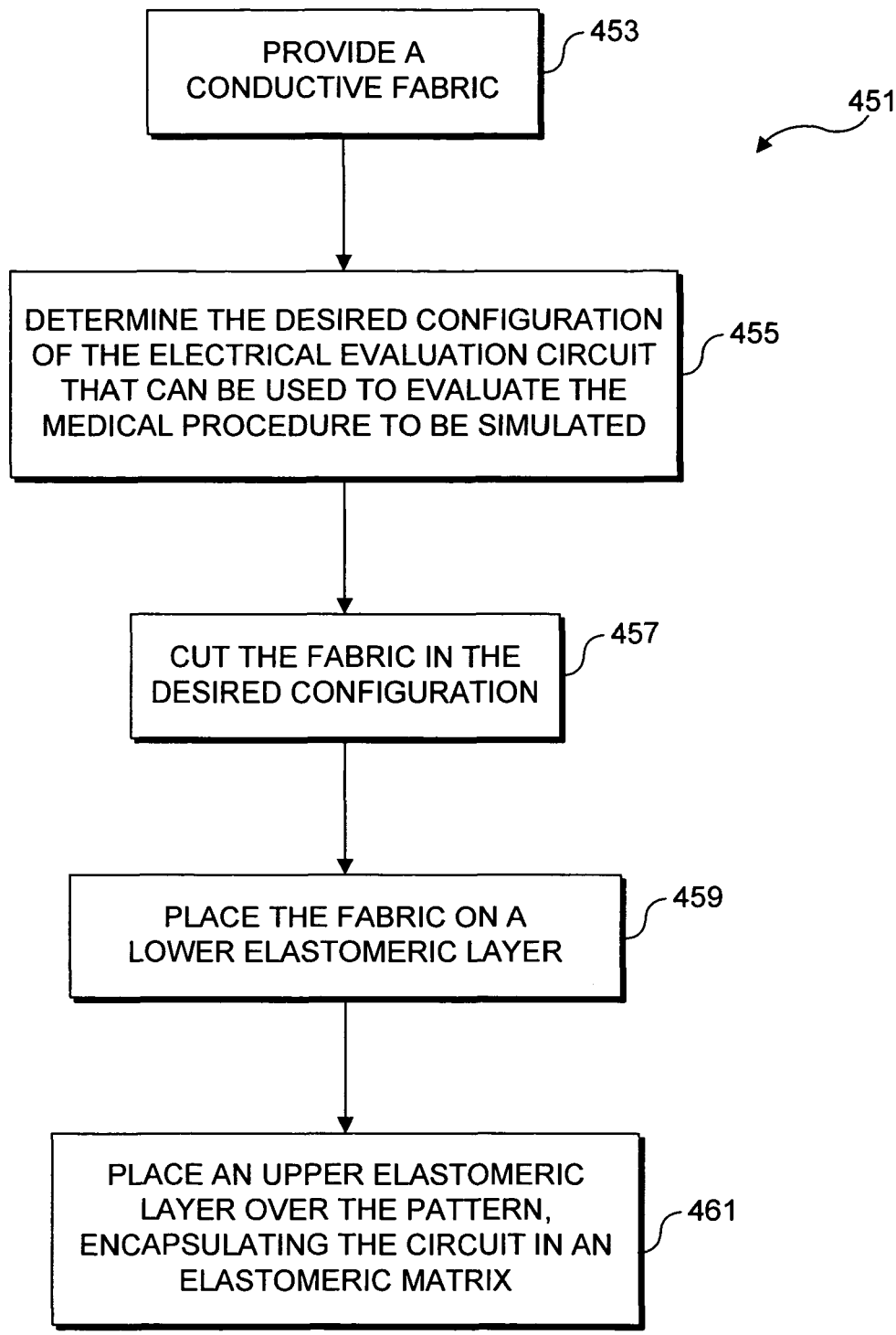
Figure 19C:
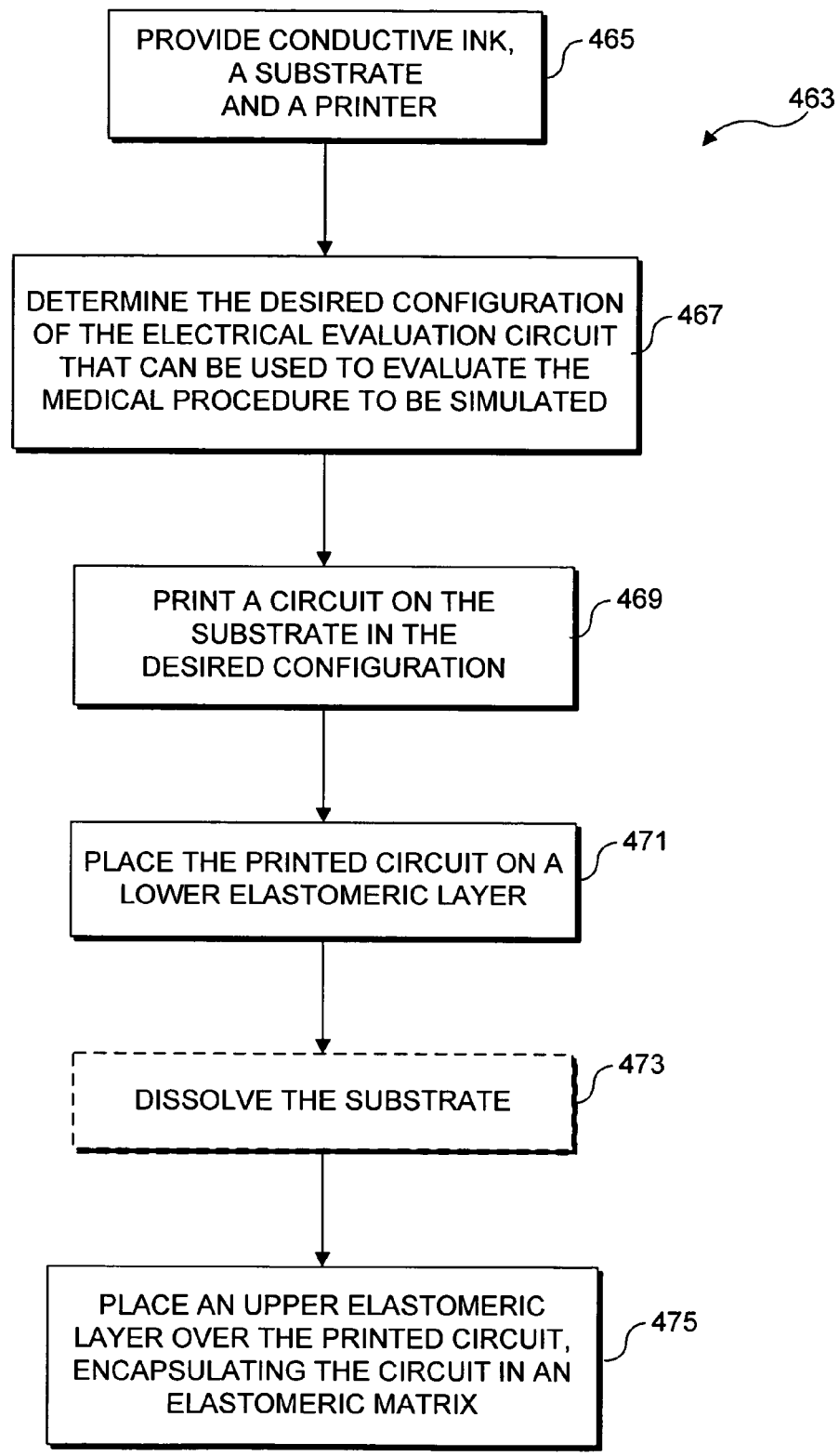
Figure 20:
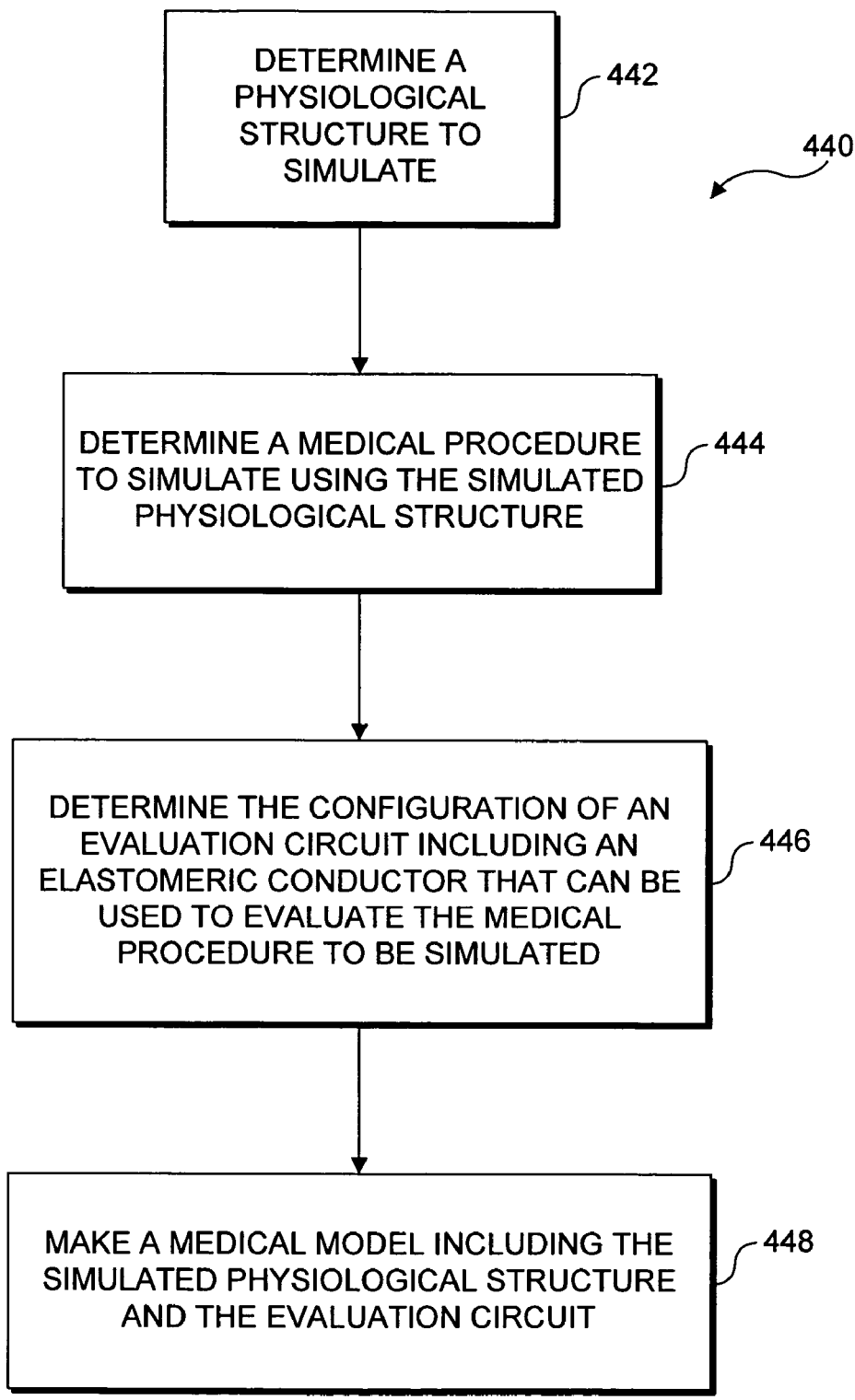
Figure 22A:
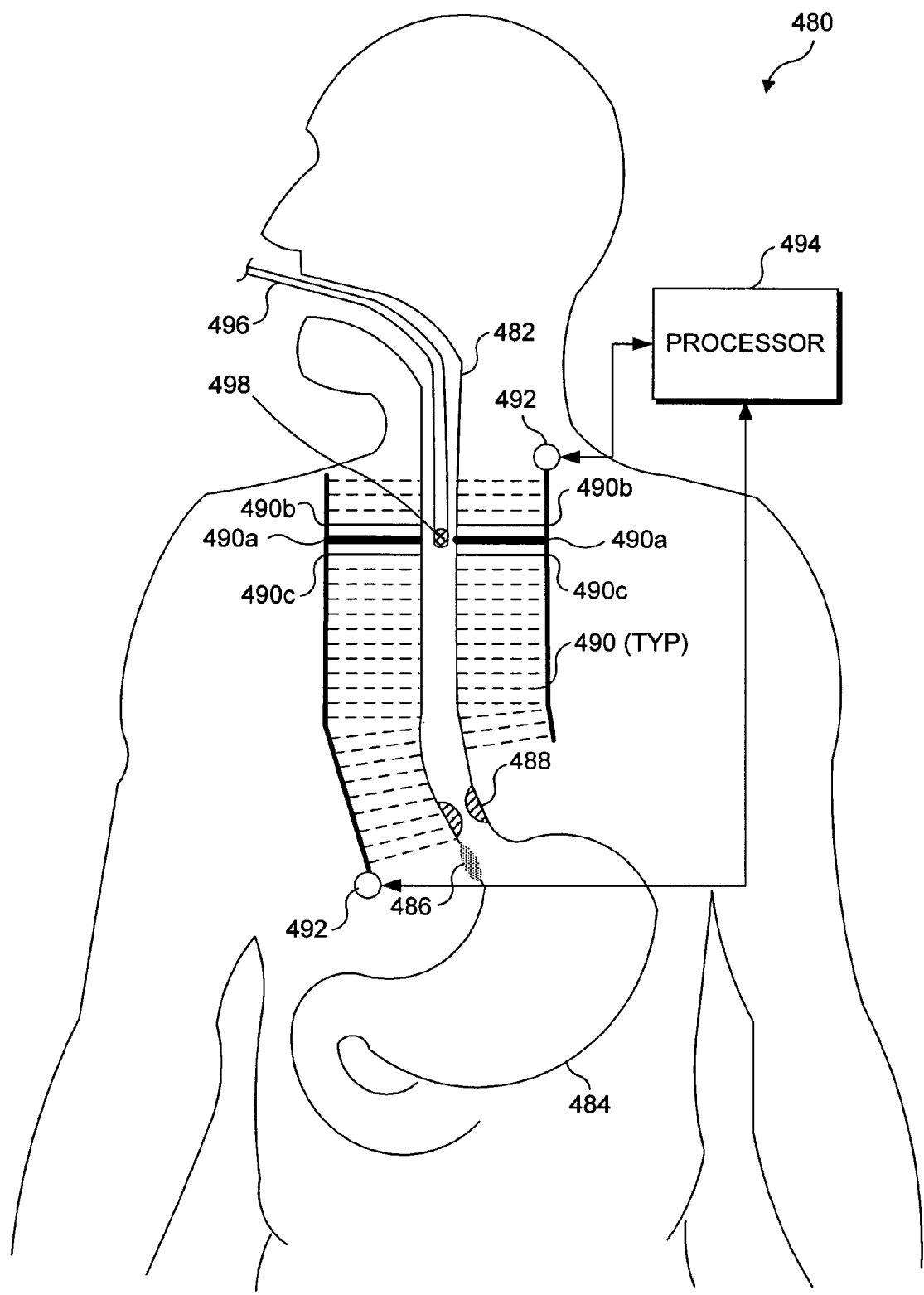
Figure 22B:
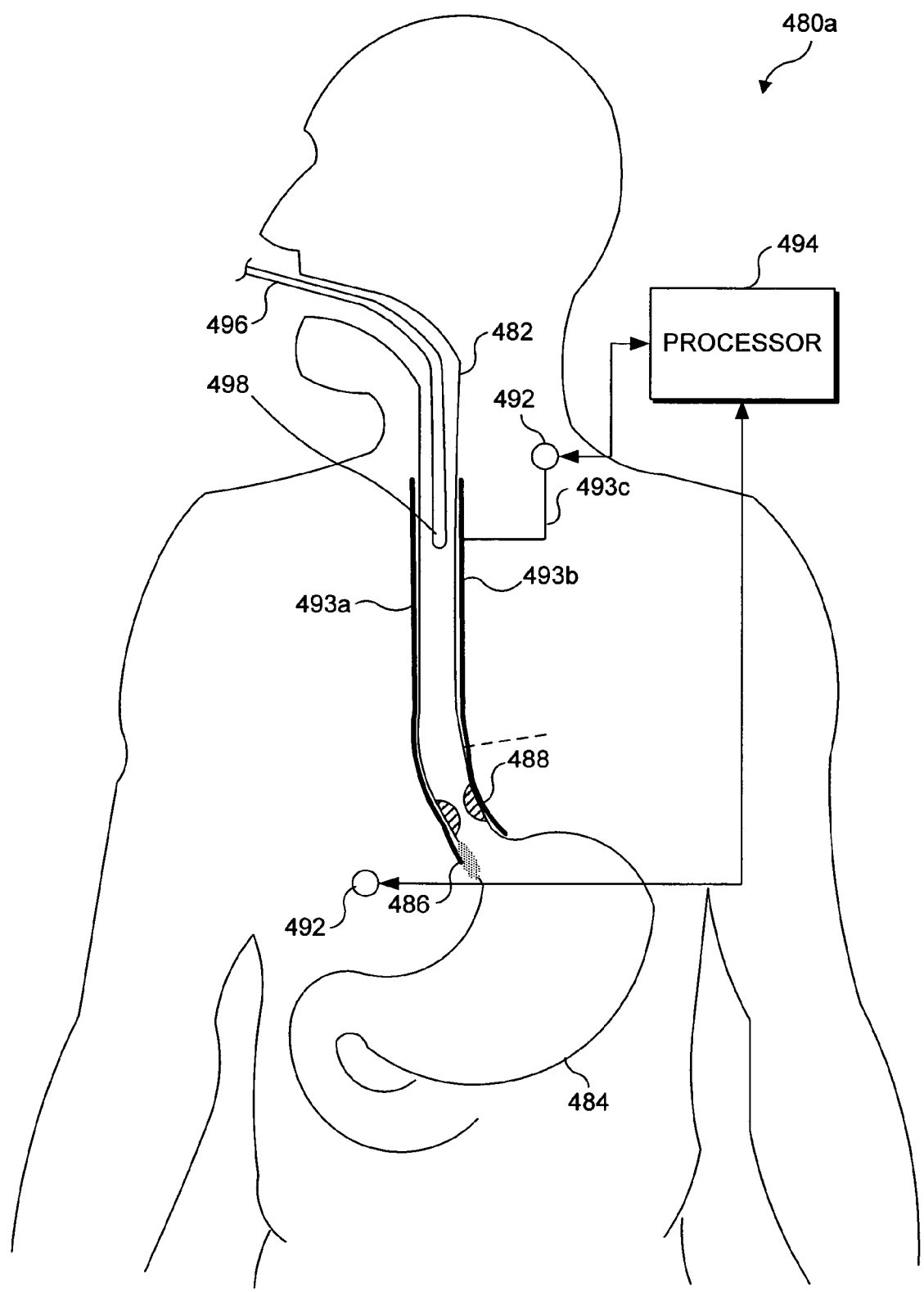
Figure 22C:
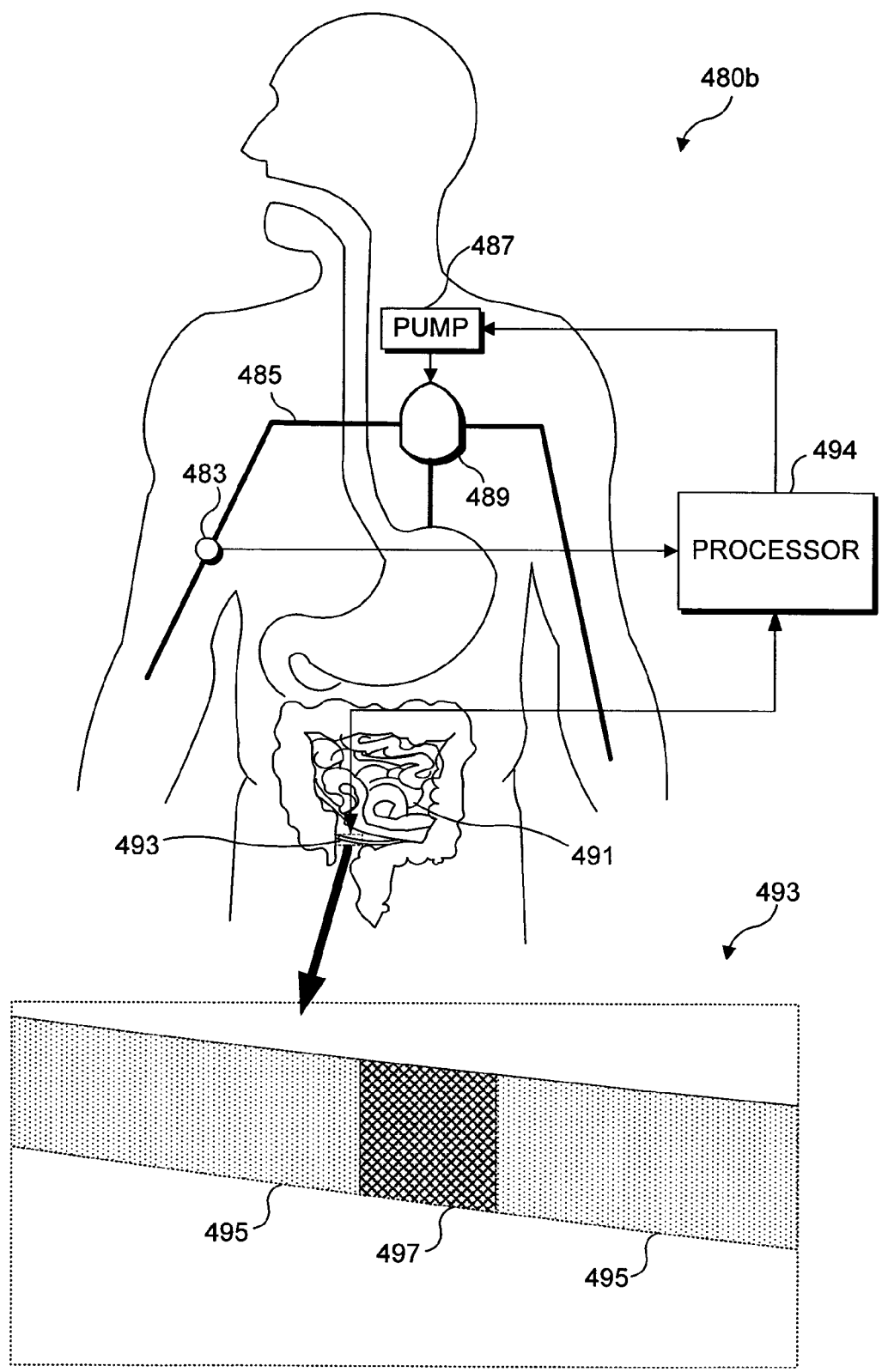
Figure 23:
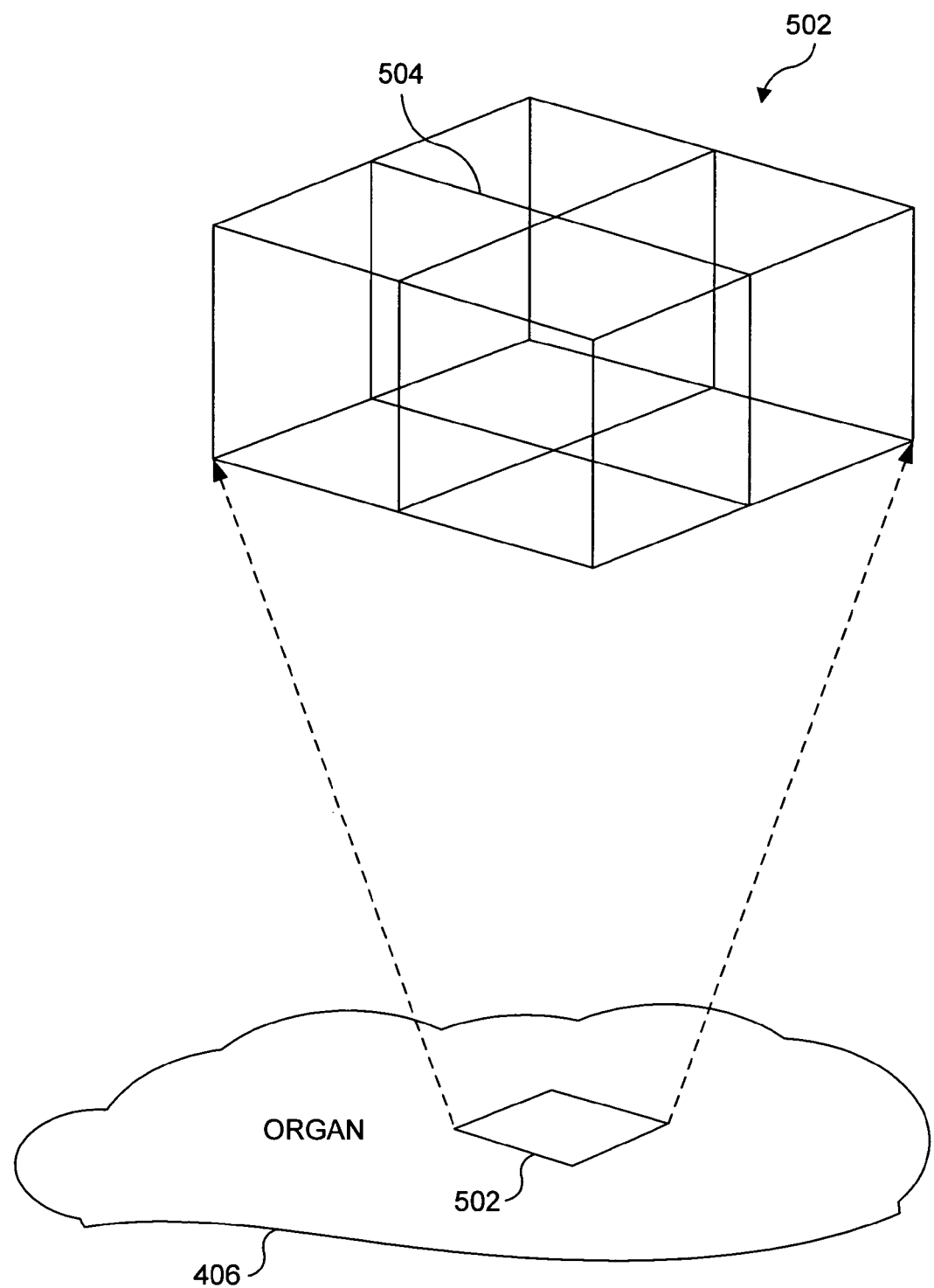
Figure 24:
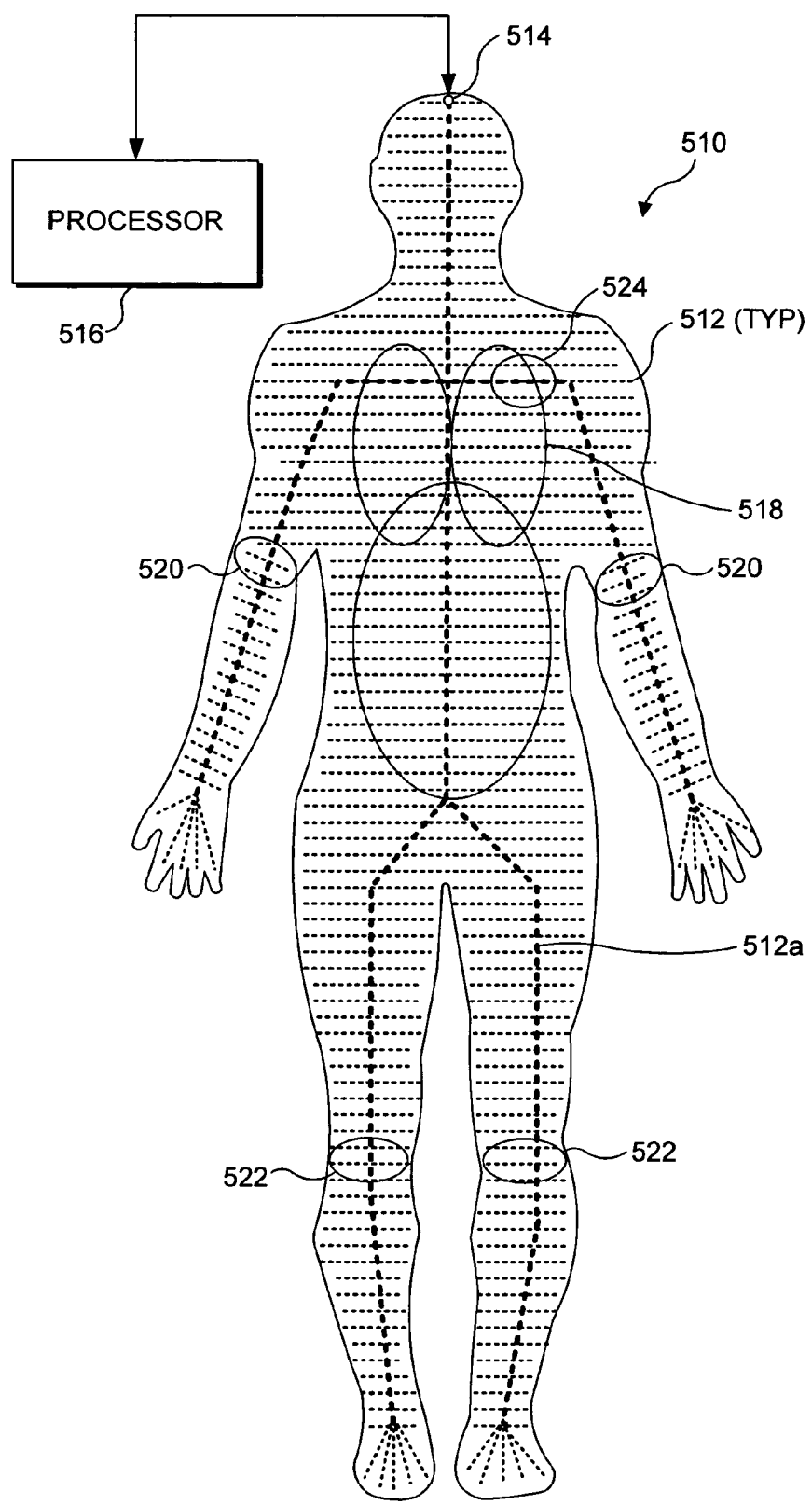
Figure 25:
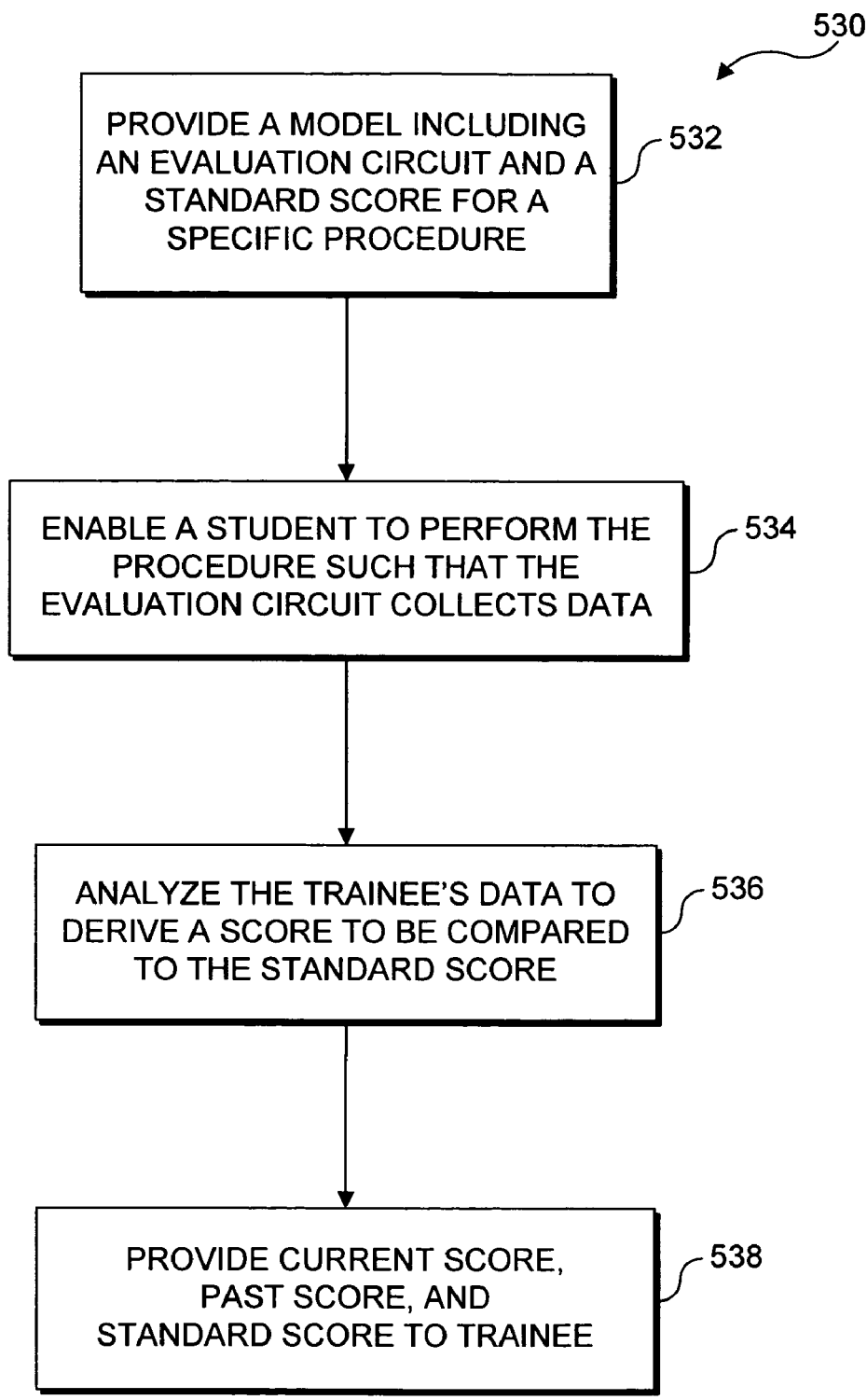

FIGS. 10A-10D schematically illustrate embodiments of evaluation circuits in accord with the present invention;

FIGS. 11A-11E schematically illustrate pressure sensitive circuits in accord with one embodiment of the present invention;

FIGS. 12A-12D schematically illustrate different embodiments for processing an indication from one of the evaluation circuits of FIGS. 10A-10D and 11A-11E;

FIG. 13 schematically illustrates conductive elastomer-based evaluation circuits disposed in a concentric orientation in order to evaluate how close to a desired target area a trainee reached with a medical device during a simulated medical procedure;

FIG. 14A schematically illustrates a conductive elastomer-based circuit corresponding to the circuit diagram of FIG. 10C;

FIG. 14B schematically illustrates a conductive elastomer-based test circuit fabricated to provide a working model of the present invention, corresponding to the circuit diagram of FIG. 10D;

FIG. 15 schematically illustrates conductive elastomer-based evaluation circuits in accord with the present invention incorporated into the simulated human tissue of FIGS. 3 and 4;

FIG. 16 schematically illustrates conductive elastomer-based evaluation circuits in accord with the present invention incorporated into the human torso surgical trainer of FIG. 1;

FIG. 17A schematically illustrates a simulated joint incorporating conductive elastomer-based evaluation circuits in order to evaluate if a trainee has correctly positioned a syringe relative to the joint during an aspiration of the joint;

FIG. 17B schematically illustrates a simulated joint incorporating conductive elastomer-based evaluation circuits in order to evaluate if a trainee has inserted a syringe to an appropriate depth during a procedure for aspirating the joint;

FIG. 18 schematically illustrates a simulated bone incorporating conductive elastomer-based evaluation circuits in accord with one embodiment of the present invention;

FIG. 19A is a flowchart showing the sequence of steps employed to construct a conductive elastomer-based evaluation circuit using a conductive carbon in accord with one aspect of the present invention;

FIG. 19B is a flowchart showing the sequence of steps employed to construct a conductive elastomer-based evaluation circuit using a conductive fabric in accord with another aspect of the present invention;

FIG. 19C is a flowchart showing the sequence of steps employed to construct a conductive elastomer-based evaluation circuit using a circuit printed onto a substrate in accord with yet another aspect of the present invention;

FIG. 20 is a flowchart illustrating the sequence of the steps employed to construct a medical model including a simulated physiological structure and a conductive elastomer-based evaluation circuit in accord with the present invention;

FIG. 21 is a flowchart indicating the sequence of logical steps employed to utilize a medical model including a simulated physiological structure and a conductive elastomer-based evaluation circuit to evaluate the performance of a trainee using the medical model to simulate a medical procedure;

FIG. 22A schematically illustrates a simulated medical instrument that interacts with conductive elastomer-based evaluation circuits in a medical model via induction;

FIG. 22B schematically illustrates a simulated medical instrument that interacts with conductive elastomer-based evaluation circuits in a medical model via capacitance;

FIG. 22C schematically illustrates a medical model in which the removal of a portion of simulated and proper suturing of adjacent simulated tissue completes a conductive elastomer-based evaluation circuit;

FIG. 23 schematically illustrates a conductive elastomer-based evaluation circuit implemented as a three-dimensional grid within a simulated organ;

FIG. 24 schematically illustrates a conductive elastomer-based evaluation circuit distributed throughout substantially the entire volume of a human patient simulator; and FIG. 25 is a flowchart illustrating the sequence of logical steps employed to utilize a medical model including a simulated physiological structure and a conductive elastomer-based evaluation circuit to evaluate the performance of a trainee using the medical model to simulate a medical procedure, and to compare that performance with a standardized score, as well as with scores from the trainee's prior performances.

DESCRIPTION OF THE PREFERRED EMBODIMENT

Overview of the Present Invention

In the present invention, flexible circuits formed of conductive elastomers are incorporated into simulated physiological structures used for medical training and simulations. The flexible circuits can be employed to provide feedback indicating how well a simulated procedure was performed on the simulated physiological structure.

The use of a conductive elastomer, as opposed to a conventional metallic wire conductor, enables a more realistic simulated physiological structure to be achieved, one which has tactile characteristics like that of a corresponding real physiological structure. Metallic conductors generally do not look or feel like any naturally occurring physiological structure. In contrast, the composition of elastomeric materials can readily be controlled to both visually and tactilely simulate many different physiological structures, such as tissues, organs, cartilage, and bone. While a portion of the circuitry associated with a medical model in accord with the present invention can be implemented using conventional metal wires, the use of a conductive elastomer, particularly at locations where realistic visual and tactile representations of anatomical structures is desirable, enables a realistic model to be achieved, which at the same time provides feedback functionality requiring conductive elements.

Conductive elastomer-based evaluation circuits incorporated into simulated physiological structures can be used in a variety of different ways. Three significant uses include collection of data which is stored for later use, collection of data to be processed to provide some contemporaneous feedback (such as a visual or an audible indication that a procedure has been performed correctly or incorrectly, provided to a trainee, a proctor, or both), and collection of data which is analyzed and may be used to trigger a simulated physiological response in the simulated physiological structure (i.e. a change in a simulated heartbeat, a simulated muscular response, a change in a simulated respiratory rate, etc., implemented by controlling a servo or pump). In a relatively simple implementation, the electrical signal obtained from a conductive elastomer-based evaluation circuit is used to provide simple feedback, such as lights that turn on or off, and/or the activation of aural or verbal prompts or cues. In some implementations the metric is simply whether a current is flowing through the circuit. More complex circuits can be configured to determine a position of a simulated medical instrument (such as a needle, a catheter, an endoscope, or other tool) during each phase of a simulated procedure, to respond to touch, to measure pressure (useful for determining if the force applied by a trainee in handling a structure such as an organ is appropriate), and/or to measure impedance changes throughout a circuit. The use of appropriate sensors in a conductive elastomer-based evaluation circuit will enable changes in physical properties of the model to be evaluated. For example, some medical procedures involve the application of chemicals (i.e., drugs), heat, cold, and/or electromagnetic radiation to tissue or other physiological structures. Appropriate sensors can be incorporated into conductive elastomeric-based evaluation circuits so that feedback relating to the physical property change can be gathered. The electrical signal from the evaluation circuit can be manipulated and analyzed by logical processing elements, such as computers. Using a computer enables data provided by such evaluation circuits to be immediately processed and displayed, immediately processed but stored for later use, stored for later processing, compared to similar data, electronically distributed to other users in a network, or any combination thereof.

Instead of providing immediate feedback to a user, the feedback can be hidden from the user, and made instead available to an instructor. Based upon the feedback thus provided, the instructor may "grade" the performance of the user. Such an application will be particularly useful in skill assessments of medical personnel.

Incorporating conductive elastomers into a simulated human tissue structure will enable many different types of simulated procedures to be evaluated. For example, feedback can be provided that is indicative of how accurately a needle is inserted into a simulated tissue structure. The positioning of the needle can be evaluated relative to the outer surface of the simulated tissue structure, as well as to depth. Simulated tissue structures with a plurality of different layers of circuits can be used to evaluate incisions into the simulated tissue structure, by analyzing circuits broken by the incision, providing feedback of location, and optionally of the depth of the incision.

The following describes a preferred simulated human tissue structure, and a surgical simulator using such a simulated human tissue structure. After the preferred simulated human tissue structure is described, the incorporation of conductive elastomer-based evaluation circuits into such simulated human tissue structures will be discussed, illustrating the benefits arising from the incorporation of electrical circuits formed from conductive elastomers in the simulator. Specific examples showing how such flexible electrical circuits are used to provide feedback, as well as examples of other types of simulated physiological structures that include the flexible circuits are also provided below.

Exemplary Simulated Human Tissue Structure and Surgical Trainer

For the purposes of this description, human tissue, not including bone or cartilage may be divided into two classes. The first class is tissue whose presence in a human body fills or lends significant bulk. The second class of tissue is tissue whose function is to line, support, or surround the first class of tissue. As used herein and the claims that follow, the second class of tissue is referred to as "membrane" or "membranes," or as "membranous tissue." By implication, the first class is referred to as "sub-membranous tissue." Membranes are generally thinner but are characterized in that they are comparatively more dense and tougher than sub-membranous tissue, due in part to their composite construction, since they include a fibrous layer. The types of membranes found in a human body include skin and serous membranes, for example, the peritoneum, pericardium, or parietal pleura, and any of the number of fasciae or connective tissues, for example, the deep fascia, which binds muscles such as the anterior and posterior rectus sheath or aponeuroses, ligaments, and tendons. Sub-membranous tissue, such as fat, muscle or extraperitoneal tissue, by comparison, occupies more space and is generally easier to dissect than membranes. However, even in different tissues that are sub-membranous, there can be a great disparity in tissue consistency. For instance, fat is much easier to dissect and has a very different tactile characteristic than muscle. In some instances, only the blunt end of a scalpel can be employed to dissect fat. Given the need to provide realistic simulation and training models, it is therefore appropriate to impart a level of realism to surgical trainers to enable a user to experience the subtle differences between membranous and sub-membranous tissues.

An exemplary surgical trainer constructed in accord with the present invention is shown in FIG. 1. The size and shape of trainer 100 are substantially proportional to the dimensions of a fully-grown average male torso. However, in another aspect of the present invention, surgical trainer 100 can alternatively be provided having the proportions of a fully-grown average female. In addition, in yet another aspect of the present invention, the trainer can be provided with the proportions of a small child or infant.

Trainer 100 rests on a base 102, which is preferably contoured to the trainer's dimensions. In addition, trainer 100 is buttressed by underlying structures, giving realistic shape and appearance to the trainer as though a complete muscular and skeletal system supports an exterior body cover 110. Body cover 110 is made from an elastomeric material and is preferably pigmented to present a visually similar appearance to that of human skin. A lower boundary 104 of the trainer is roughly commensurate with the lower abdomen; parts of the hypogastric and iliac areas have been included, but the lower extremities have been omitted. From the lower abdomen, the trainer continues to follow the outline of an average-sized male torso. Lumbar and hypochondriac, medial and lateral areas, as well as umbilical and epigastric areas, are faithfully replicated. Trainer 100 concludes with the upper chest and includes the upper neck portion. Upper extremities have been omitted. Preferably, the trainer includes swatches of simulated human tissue structure draped over practice surgery areas and over areas of body cover 110, and these swatches are preferably fastened to trainer 100 with hook and loop fasteners or snap fasteners (not shown), because the surgical practice tissue is incisable and is intended to be replaced after its useful life. Thus, only the practice surgical swatches need be replaced instead of the body cover. Preferably, the practice surgery areas include the abdomen, the chest, and neck areas. Each of the practice areas may include further simulated anatomical features and more tissue structure as described below.

Figure 2:
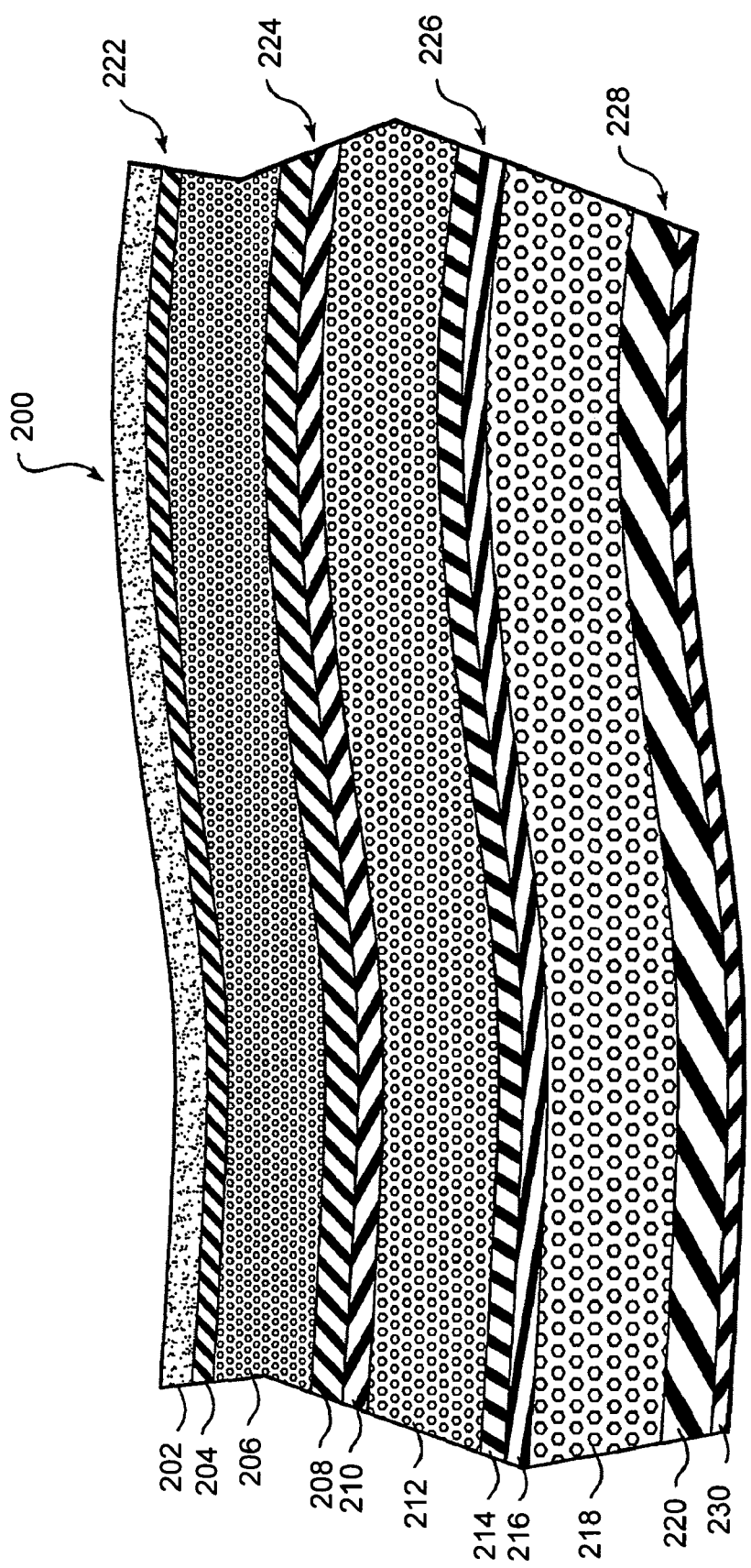
FIG. 2 is a schematic representation of simulated human tissue constructed according to the present invention.

Still referring to FIG. 1, the trainer includes an abdomen surgical practice area with abdomen tissue 112. The abdomen area is preferably used to perform diagnostic peritoneal lavage. Preferably, the abdomen includes the simulated human tissue of FIG. 2 to cover the underlying simulated viscera. Trainer 100 includes a chest surgical practice area with a chest tissue structure 114. The chest area is preferably used to perform both the chest tube insertion procedure and pericardiocentesis. Preferably, the chest area includes the simulated tissue of FIG. 2 to cover the underlying simulated viscera. Trainer 100 includes a neck surgical practice area with neck tissue structure 116. The neck area preferably includes the simulated tissue structure of FIG. 2 to cover the underlying viscera and is used to practice cricothyroidotomy. In addition, trainer 100 includes the underlying laryngeal cartilages and trachea in the neck area. While FIG. 2 is a preferred embodiment, other tissue structures made in accordance with the present invention are contemplated, while maintaining correct human anatomy for a particular area, meaning that more or fewer layers are possible. While trainer 100 has been designed with certain surgical procedures in mind, it is useful for the practice of other procedures involving those areas mentioned above.

Trainer 100 includes both exterior and interior structures and features that impart a lifelike quality to the trainer to better prepare medical students and other medical personnel for real operations or procedures. The exterior tissue members covering the surgical practice areas, of which there are preferably three, are incisable and suturable, owing to a fibrous layer within the simulated human tissue. Preferably, the simulated human tissue is secured to the trainer by hook and loop fasteners or snap fasteners, thereby making the exterior tissues replaceable at the end of their useful life. However, fasteners are optional.

Referring now to FIG. 2, a preferred simulated human tissue constructed according to the present invention is shown. Alternates to the preferred embodiment may have more or fewer layers, to simulate the different anatomical features for a given area of the human body. A simulated human tissue structure 200 is the visible exterior in the surgical practice areas shown in FIG. 1. Simulated human tissue 200 of FIG. 2 preferably includes a number of strata of an elastomeric composition selected so as to replicate the actual layered membranes and sub-membranes of a human body. The layers may be of similar formulation or they may be of different formulations depending on the human tissue being simulated. For instance, simulated fat is of a different consistency than simulated muscle. As used herein, a stratum, or layer is used to denote a substantially uniform area extending in a longitudinal direction. Layers in the human tissue structure may be bonded to one another, or they may be individual layers that are placed atop one another without being bonded. Layers may even be separated by members that are not a part of the human tissue structure. Further, for any given surgical area, simulated human tissue 200 layers can vary in thickness.

Beginning with the uppermost and outermost layer, a composite layer 222 simulates human skin. For the purposes of this description, skin is considered a membranous layer. Composite layer 222 includes a silicone blend 202 and a reinforcing silicone-coated fibrous layer 204, and preferably a pigment. As is generally known in the elastomer arts, any of a number of suitable pigments for silicone blends can be used to visually represent different layers. The silicone used in the invention is preferably obtained from Silicones, Inc. of High Point, N.C., under the mark XP-153A. Preferably, the silicone is mixed with a thinning agent, also obtained from Silicones, Inc., under the mark GI THINNER™. The volume ratio of silicone to thinner may be adjusted more or less to arrive at a suitable hardness and texture, but preferably, the volume ratio is between about 2:1 of silicone to thinner and about 10:1 of silicone to thinner. Techniques for molding and curing items of silicone and thinner are generally known by those of ordinary skill in the art and need not be set forth herein to enable the present invention. Although silicone has been found to perform best, other elastomeric materials, such as latex, may alternatively be used. Silicone-coated fibrous layer 204 is preferably pre-formed and cured and is then applied below or atop an uncured silicone formulation while in the mold. As the silicone formulation cures, the pre-formed fibrous layer is bonded thereto. However, the silicone-coated fibrous layer need not be bonded to the silicone blend layer. The silicone-coated fibrous layer 204 imparts a realistic resistance to cutting, similar to the resistance of real human skin. The fibrous layer is preferably made of a nylon mesh material. However, a felt material will perform equally well under some circumstances. Any number of synthetic or natural fibers will also be effective for use in this layer, to some degree. For instance, in the abdomen area, felt is the preferred fibrous material for the silicone-coated fibrous layer. While the skin is intended to be a very close approximation to actual human skin, it is to be recognized that real human skin includes numerous strata of virtually imperceptible differences. However, the simulated skin of the present invention closely represents the epidermis and dermis of actual human skin. Preferably, a pigment is added in the silicone blend to color the skin similar to human skin. Also, composite skin layer 222 including the fibrous layer 204 is about 2 to about 4 millimeters thick. While a preferred embodiment of skin layer 222 includes a reinforcing silicone-coated fibrous layer 204, the use of more reinforcing layers are contemplated.

Underlying skin layer 222 is a layer 206 that simulates the subcutaneous fat found in actual human tissue. For purposes of this description, subcutaneous fat is considered a sub-membranous layer. Subcutaneous fat layer 206 is preferably formed of a silicone blend and includes a pigment. However, to simulate the less dense texture of fat, the formulation is adjusted to be different than that used for the layer simulating skin. The volume ratios of the fat layer are preferably about 1:1 silicone to thinner, to about 2:1 silicone to thinner. Subcutaneous fat layer 206 is similar in texture and hardness (tactile sensation) to a layer of subcutaneous fat found in humans. In humans, the subcutaneous fat occurs as a thin layer of loose fatty tissue underlying the skin and binding it to underlying layers. It is optional to provide a fibrous material or fibrous layer in the subcutaneous fat and to add pigments. Preferably, subcutaneous fat layer 206 is about 10 to about 60 millimeters thick.

Underlying subcutaneous fat layer 206 is a composite layer representing an anterior rectus sheath layer 224. For purposes of this description, the anterior rectus sheath is considered a membranous layer. The anterior rectus sheath layer includes a silicone blend 208 and a reinforcing silicone-coated fibrous layer 210. Preferably, the fibrous material is a nylon mesh; however, SPANDEX™ has also been found to perform well. The fibrous layer 210 is pre-formed and bonded to anterior rectus sheath layer 208 by the method described above. However, fibrous layer 210 can instead be provided as a non-bonded layer. The formulation of silicone and thinner used to form the anterior rectus sheath is preferably in the range of about 1:0 silicone to thinner to about 2:1 silicone to thinner. Silicone alone (with no thinner) may be used for this layer, because the rectus sheath is a dense, tough serous layer, and these characteristics can be achieved by using little or none of the thinner. Preferably, the silicone used for anterior rectus sheath layer 224 is of a different consistency than that used for skin layer 222 or subcutaneous fat layer 206. The silicone preferably used for producing anterior rectus sheath layer 224 is obtained from Silicones, Inc. under the name GI-1000A™.

This formulation of silicone is of a higher specific gravity, and therefore, upon curing, will be denser than skin layer 222 or subcutaneous fat layer 206. For the sake of comparison, the lighter silicone, XP-153A™, has a specific gravity of about 0.98, while the more dense silicone, GI-1000A™, has a specific gravity of about 0.99. Preferably, anterior rectus sheath layer 224 is about 0.5 to about 1.5 millimeters thick, and more preferably about 1.0 millimeter thick. While a preferred embodiment of anterior rectus sheath layer 224 includes a reinforcing silicone-coated fibrous layer 210, more reinforcing layers are possible.

Underlying the anterior rectus sheath layer 224 is a muscle layer 212. For purposes of this description, muscle is considered a sub-membranous layer. Muscle layer 212 includes a silicone blend and preferably, a pigment, and is preferably formulated from silicone. However, of the two silicones mentioned above, it is preferable to use the less dense silicone, XP-153A™. The formulation is adjusted to realistically simulate the texture and consistency of actual muscle. Therefore, volume ratios of muscle layer 212 are preferably about 1:0 silicone to thinner, to about 4:1 silicone to thinner. Muscle layer 212 can be supplemented by adding more tissue structure in the chest area and by the addition of more layers. While it is understood that in actuality, there may be more or fewer muscles in certain areas of the abdomen and sides and anterior chest, this problem is addressed by providing a distinct member, which underlies the simulated tissue and body cover, to make up for any muscle that is not distinctly provided in the tissue structure of FIG. 2. This additional layer is discussed in greater detail below. It is also optional to provide a fibrous material or layer in the muscle or to add pigments to achieve a realistic color.

Underlying muscle layer 212 is a posterior rectus sheath layer 226. For purposes of this description, the posterior rectus sheath is considered a membranous layer. Posterior rectus sheath layer 226 includes a silicone blend 214 and a reinforcing silicone-coated fibrous layer 216. Preferably, the fibrous material is a nylon mesh, however, SPANDEX has been found to perform appropriately as well. The fibrous layer 216 is pre-formed as well and bonded to the posterior rectus sheath layer 226 using the same method described above. However, fibrous layer 216 can be provided as a separate and distinct layer. The formulation of silicone and thinner is preferably in the range of about 1:0 silicone to thinner to about 2:1 silicone to thinner, because the posterior rectus sheath 226 in humans is a dense, tough serous layer, which is most closely simulated by using little or none of the thinner in the layer formulation. Preferably, the silicone used for posterior rectus sheath 226 is the silicone GI-1000A™. Preferably, posterior rectus sheath layer 226 is about 0.5 to about 1.5 millimeters thick and more preferably, about 1.0 millimeter thick. While a preferred embodiment of posterior rectus sheath 226 includes reinforcing silicone-coated fibrous layer 216, more reinforcing layers can be added.

Underlying the posterior rectus sheath layer 226, is the extraperitoneal tissue layer 218. For purposes of this description, the extraperitoneal tissue is considered a sub-membranous layer. Extraperitoneal tissue 218 is tissue that is similar in consistency to fat. Extraperitoneal tissue layer 218 is formed of a silicone blend and preferably, a pigment to provide realistic color and is preferably formulated from the silicone XP-153A™, to simulate the less dense texture of the corresponding true extraperitoneal tissue. The volume ratios of silicone to thinner for extraperitoneal tissue layer 218 are preferably about 2:1 silicone to thinner to about 1:1 silicone to thinner. Extraperitoneal tissue layer 218 is similar in texture and hardness to a layer of extraperitoneal tissue found in humans. It is optional to provide a fibrous material or layer in the extraperitoneal tissue layer or to add pigments for coloration. Preferably, the extraperitoneal layer 218 is about 4 to about 10 millimeters thick.

Underlying extraperitoneal layer 218 is a composite peritoneum layer 228. For purposes of this description, the peritoneum is considered a membranous layer. Peritoneum layer 228 simulates a smooth transparent surface membrane that lines the cavity of the abdomen of a human. In this simulated human tissue, peritoneum layer 228 includes a silicone blend 220 and a reinforcing silicone-coated fibrous layer 230. Preferably, the fibrous material is a nylon mesh; however, SPANDEX has also been found to perform well. Fibrous layer 230 is pre-formed, as in other membranous tissue, and is bonded to silicone blend 220 by the same method described above. Alternatively, fibrous layer 230 can be provided as a separate and distinct layer. The formulation of silicone and thinner for this layer is preferably in the range of between about 1:1 silicone to thinner to about 1:0 silicone to thinner. This is because the peritoneum is a dense, tough layer. Preferably, the silicone used for the peritoneum is GI-1000A™ because of its higher density. Preferably, the peritoneum layer 228 is about 0.5 to about 1.5 millimeters thick, and most preferably, about 1.0 millimeter thick. While the preferred embodiment of the peritoneum layer 228 includes reinforcing silicone-coated fibrous layer 230, more reinforcing layers are possible.

Referring now to FIG. 3, another aspect of a simulated human tissue 300 according to the present invention is the ability to include venous or arterial channels 302 to simulate actual human veins or arteries. Channels 302 are formed by placing lengths of string or other material, such as fishing line in the mold in any suitable configuration. Large diameter line or string will result in larger diameter simulated veins. Small diameter strings can be connected to larger ones at common junctures 304 and 306, just as actual capillaries connect to larger veins in a human body. The strings are arranged within the mold before or even after the silicone blend is poured. When cured, the strings can be simply pulled out from the casting, leaving channels 302, which serve as the veins. Flexible hoses or tubing 308, 310 can be connected to junctures 304, 306 respectively, where a number of smaller channels converge. In this manner, simulated human tissue 300 can have a simulated circulatory system modeled therein. Tubing 308 is connected to the discharge of a pump (not shown). Simulated blood resides in a reservoir (not shown). Preferably, a manually operated pump, such as a syringe with a plunger, is used. Tubing 308, 310 connected at junctures 304, 306 thus form a path from reservoir to pump to tissue. In an alternative configuration, a closed loop is formed, and the reservoir serves as a return sump that is fed by tube 310. If used, a mechanical pump can continually feed the tissue structure. Also, a peristaltic pump can be used to simulate the pulsating rhythm of an actual beating human heart. Preferably, the flow rate is also controlled. Channels 302 that define veins and arteries can be provided in every layer of the tissue structure, or in only one layer, or no layer. When a simulated vein is severed while there is simulated blood in the system, a trainee sees simulated blood filling the operative site, just as would occur if the trainee were operating on an actual live patient. The simulated blood is made from a formulation that includes water colors, such as a ratio of 1:1 water color paint to water.

Referring now to FIG. 4, the simulated human tissue of FIG. 2 is shown with venous or arterial channels 302 provided in muscle layer 212. However, other layers may be provided with similar arterial or venous channels. Any number of channels 302 of any size may be provided and necessary to correlate to the corresponding structure of the human body.

Figure 5:
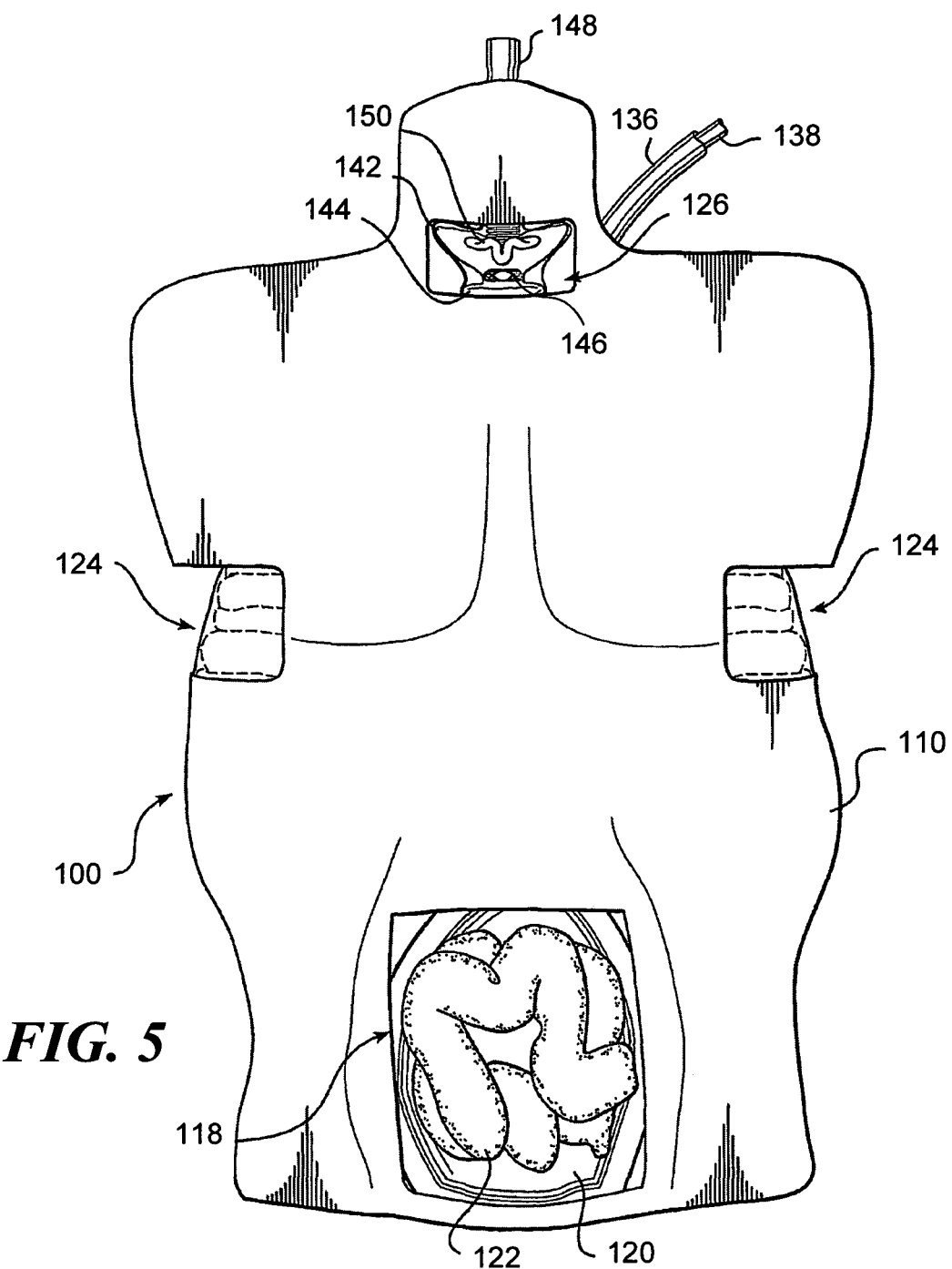
FIG. 5 is a top plan view of the trainer of FIG. 1 with the simulated tissue removed, exposing internal structures.

In FIG. 5, the swatches of exterior simulated human tissue structure have been removed from the three surgical training operative sites, exposing body cover layer 110 over the structure, but the interior structure is visible in the operative areas, because body cover 110 is not intended to be as frequently replaced as the tissues covering the practice areas, which are used for practicing incisions. Preferably, body cover 110 is made of an elastomeric composition that includes silicone configured in multiple layers. A thicker layer made from GI 1000™ silicone can be provided as a coating to assist durability. FIG. 5 shows an operative site 118 relating to the abdominal region, for practicing diagnostic peritoneal lavage. The site includes simulated human organs enclosed within abdominal cavity 120. The simulated abdominal cavity is defined by a structural member shaped to correspond to the contours of the hip bones and surrounding muscles. Preferably, a simulated large intestine 122 is formed from silicone and includes a silicone-coated fibrous layer, as well. Methods for making simulated organs have been described by Younker in U.S. Pat. No. 5,951,301, the drawings and specification of which are specifically incorporated herein by reference. Simulated large intestine 122 can be filled with simulated bodily fluids to enable realistically modeling the results of an accidental laceration by an errant scalpel. Simulated abdominal cavity 120 can also include a simulated bodily fluid to provide for more realism when performing the diagnostic peritoneal lavage procedure. For instance, after an incision has been made on the exterior tissue 112, the procedure may call for extending a gloved finger into the incision to feel for complications of the abdominal cavity. The trainer, according to the present invention, enables the trainee to perform this step in a realistic manner.

Figure 6:
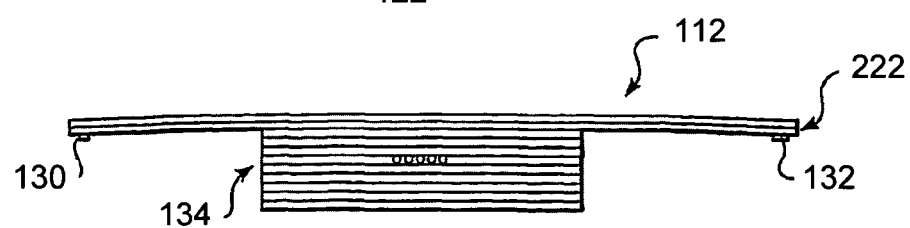
FIG. 6 is a cross section view of simulated tissue constructed according to the present invention.

Referring now to FIG. 6, a cross-sectional view of preferred abdominal simulated human tissue structure 112 is shown. Tissue structure 112 includes the layers shown in FIG. 4; however, an uppermost, exterior skin layer 222 has been expanded longitudinally to form a band that drapes across the abdominal operative site in the trainer. Preferably, the undersides of the ends of the band are provided with fasteners 130 and 132, which are attached to one another or to fasteners provided on the underside of the trainer. A plug 134 of human tissue, seen in exaggerated scale, fits over the exposed cutout area 118 in body cover 110 and in the abdominal area. Similar plugs of tissue may be used over the other cutout exposed areas 124, 126.

Figure 7:
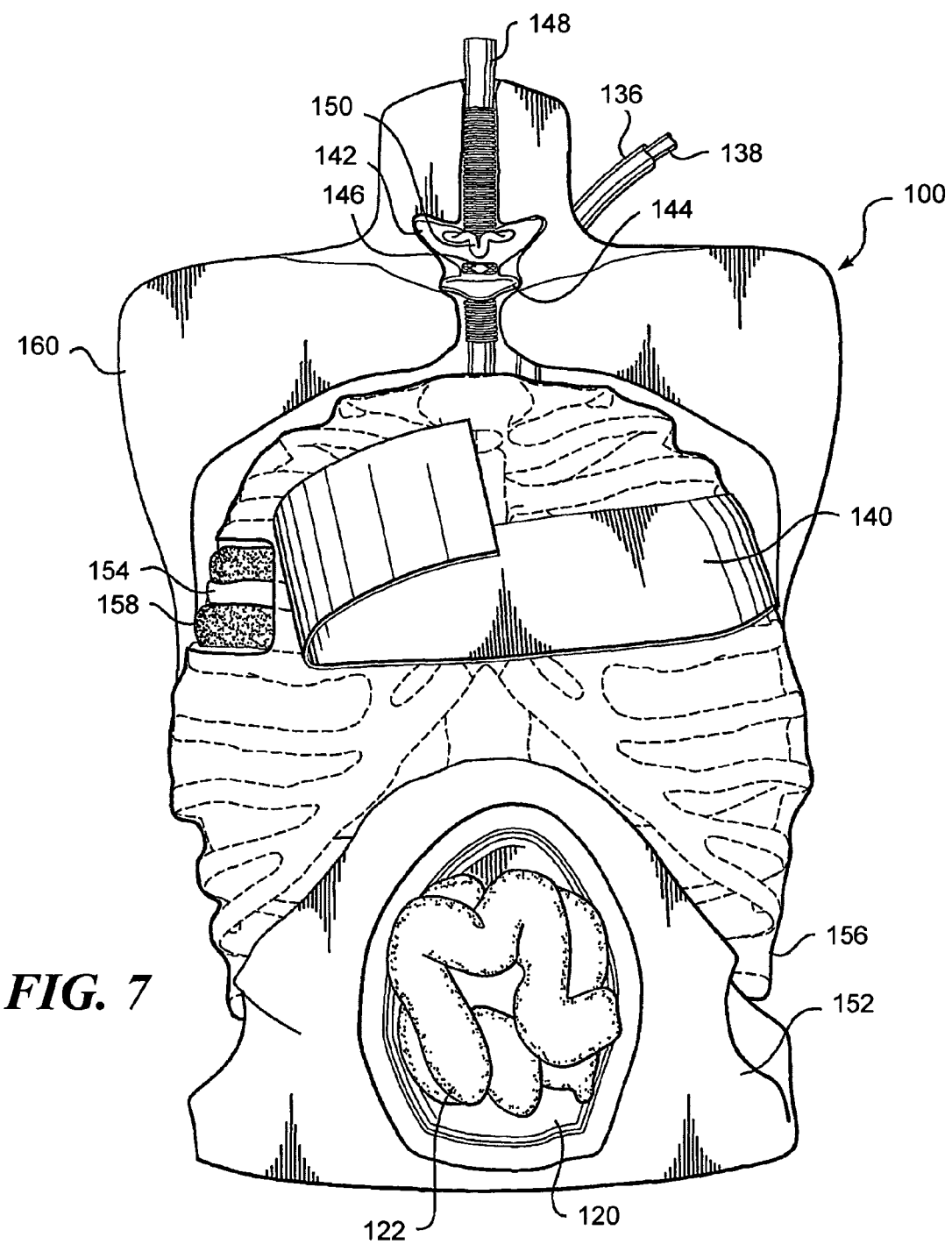
FIG. 7 is a top plan view of the trainer of FIG. 5 with the exterior cover removed, exposing more internal structures.

As illustrated in FIG. 7, surgical trainer 100 includes an additional tissue structure to simulate intercostal muscle. Preferably intercostal muscle layer 140 is formed as a band and placed over the chest region of the trainer. For purposes of this description, the intercostal muscle layer is considered a sub-membranous layer. Preferably, the intercostal muscle layer is provided with a membranous layer (not shown) to simulate the parietal pleura. For purposes of this description the parietal pleura is considered a membranous layer. The intercostal muscle layer and the parietal pleura also form part of the human tissue structure. However, in keeping with the present invention, these layers can be provided separate and apart from the exterior structure. Intercostal muscle layer 140 is pierced or incised when performing both chest tube insertion and pericardiocentesis procedures and is preferably attached to trainer 100 using hook and loop fasteners or snap fasteners (not shown) at the rear of the trainer. Intercostal muscle layer 140 is preferably formed from a silicone formulation and may have one or more elastomeric layers, with one or more reinforcing layers of fibrous material to simulate the parietal pleura. Preferably, the intercostal muscle layer is formed from GI 1000™ silicone. If the parietal pleura is included, the intercostals muscle layer is preferably formed from a nylon coated mesh with GI 1000™ silicone. In a human body, the parietal pleura forms a sac around the chest cavity, which encloses the lungs.

Figure 9:
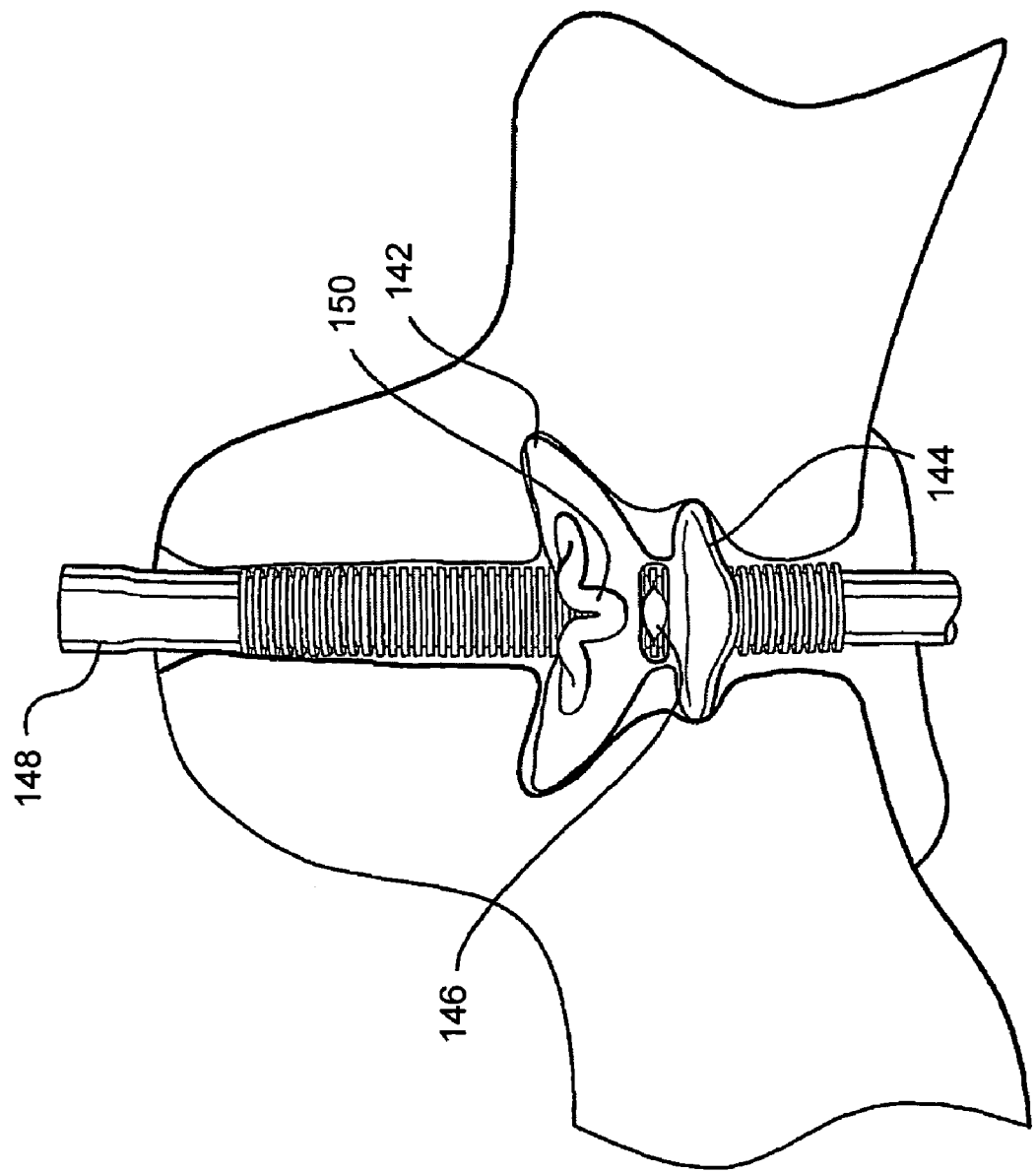
FIG. 9 is a surgical practice pack for the neck area in the trainer of FIG. 7.

Referring to FIG. 5, in the area of the neck region, surgical trainer 100 also includes a simulated thyroid cartilage 142, a simulated cricoid cartilage 144, and a simulated cricothyroid ligament 146. Cricoid cartilage 144 and thyroid cartilage 142 are molded of suitable thermoplastic or polymeric materials. Preferably, a rubber such as POLY-FAST 72-40 RTV™ liquid rubber, available from the Polytek Development Corporation of Easton, Pennsylvania can be used to fabricate these pieces. In FIG. 9, a more detailed view of these structures is shown. These structures form part of the respiration system and include a trachea, modeled here by a plastic tube 148 of similar consistency and resistance to cutting, as exhibited by an actual human trachea. Trachea 148 is connected to the cricoid cartilage 144, which is thicker and stronger than thyroid cartilage 142. Thyroid cartilage 142 is the largest of the laryngeal cartilages (others have been omitted for clarity) and includes a laryngeal prominence 150, better known as the Adam's Apple, and the thyroid notch. In a trainer modeled after a female, the laryngeal prominence will be almost imperceptible. Cricothyroid ligament 146 is represented in this Figure as being integral with the trachea member, but in a human, actually connects the cricoid cartilage 144 and thyroid cartilage 142. The cricothyroid ligament is modeled by a suitable plastic tubing or hose of similar consistency and resistance to cutting as an actual human cricothyroid ligament. The thyroid and cricothyroid cartilages are modeled from a unitary molded piece, which has an aperture traversing longitudinally along the mid axis, so as to fit through trachea 148.

With reference to FIG. 7, body cover 110 of the surgical trainer 100 has been removed, exposing the next structural layer. In the abdominal region, a member simulating the abdominal cavity has been provided so as to form the shape and provide support for the abdominal region, including both the upper and lower regions. An abdominal member 152 provides support in the area of the hypogastric, the umbilical, and the epigastric portions of the abdomen, and also the lumbar and iliac regions laterally and medially thereof. Abdominal member 152 is formed from any suitable thermoplastic or polymeric material. Preferably, a polyurethane foam, such as TC-265 A/B™, available from BJB Enterprises Incorporated, is used to fabricate the abdominal member. As mentioned above, abdominal member 152 includes abdominal cavity 120, in which simulated intestines 122 are disposed.

Still referring to FIG. 7, trainer 100 includes a rib cage 154 (shown in phantom). Rib cage 154 is preferably made of a unitary construction of a thermoplastic and/or polymeric material that define the shape to the chest region. The rib cage is covered by a rib cover 156, which is formed of one or several layers, bonded or non-bonded to one another. Rib cover 156 simulates several of the muscles surrounding the ribs, such as the serratus anterior muscle, the latissimus dorsi muscle, and the external abdominal oblique muscle. For the purpose of this description, the rib cover and its muscle layers are considered sub-membranous layers. Rib cover 156 includes cutout areas disposed laterally and medially of the trainer's longitudinal centerline. The regions are in the abdomen, exposing ribs 154 and lungs 158. Intercostal muscle layer 140, mentioned above and shown in FIG. 6, is intended to be removable and covers cutout areas 124 (shown in FIG.

6) of the body cover 110. Rib cover 156 is connected to a tube 136, which can provide air to rib cover 156; the rib cover holds a slight pressure due to being covered by intercostal muscle layer 140. When the chest tube insertion procedure is performed and intercostal muscle layer 140 is pierced, a trainee experiences a gush of air, just as when the procedure is performed on a human. When the trainee inserts a finger through the operative site, the simulated lung expanding and contracting can be felt, just as would be the case when the procedure is performed on a person, while the air is rushing through the small incision site in the intercostal muscle layer. As with other areas that are meant to be incisable, intercostal muscle layer 140 is preferably fitted with fasteners on the underside of both ends. The ends can be fastened to one another or can be attached to fasteners on the underside of the rib cage. Alternatively, fasteners in intercostal muscle layer 140 can be omitted. The remaining structure of the upper torso of the trainer is preferably modeled by a unitary member 160, which includes a solid piece that is fabricated from any suitable thermoplastic or polymeric material to model the bone and muscle tissues of the shoulder, neck, and back areas and to provide shape and form to the trainer.

Figure 8:
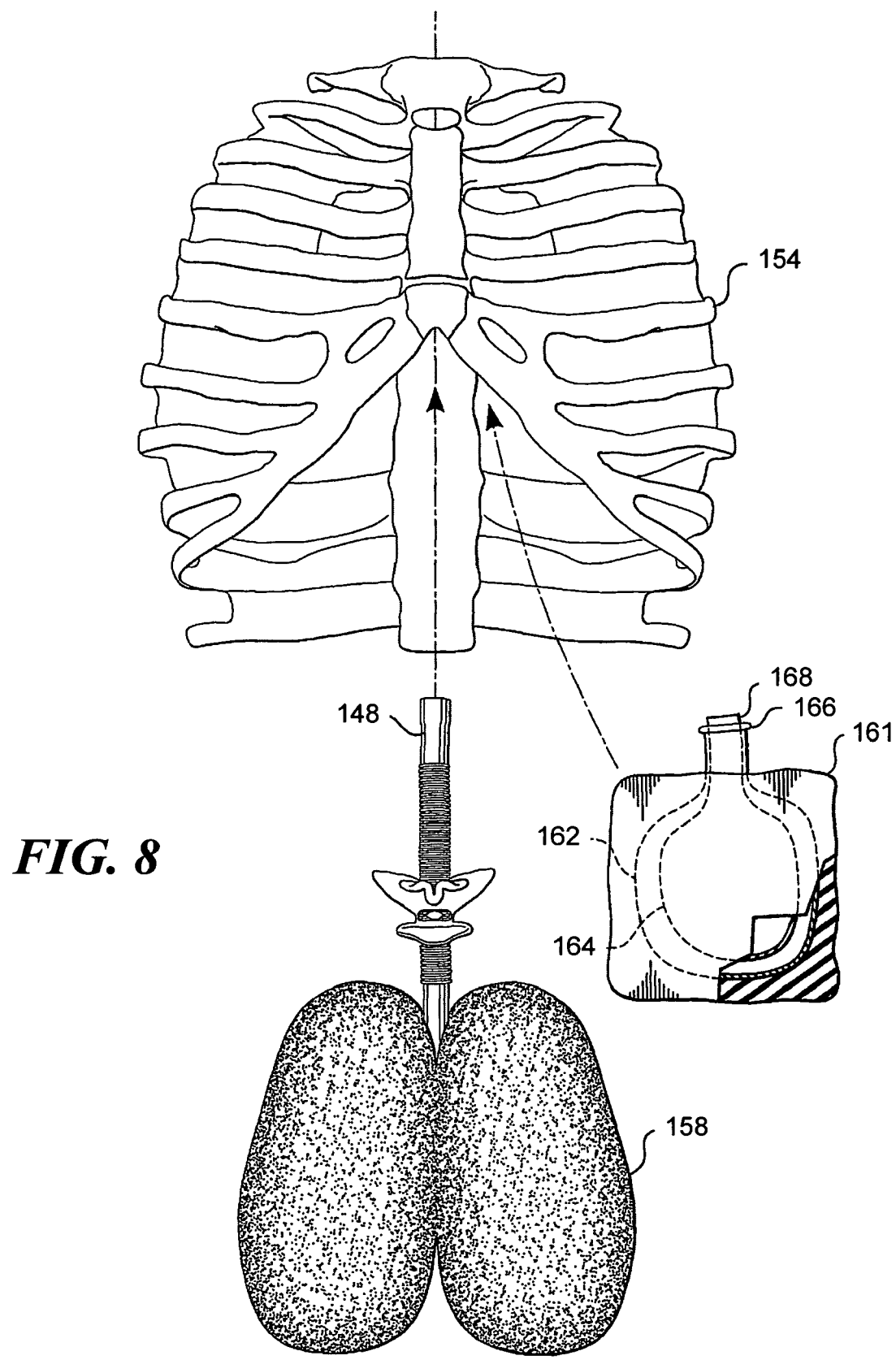
FIG. 8 is an exploded view of the internal structure of the trainer of FIG. 7.

Turning now to FIG. 8, an exploded view of the internal structures of trainer 100 is shown. Preferably, rib cage 154 is formed from a unitary member that includes the backbone and sternum, using a suitable plastic material. Spaces are preferably provided between ribs, since procedures may be called for that include inserting medical devices between the ribs. Lungs 158 are modeled by inflatable oblong sacs that are connected to simulated bronchial/tracheal tube 148, which is connected at one end to an artificial respirator (not shown). The artificial respirator can be activated during any of the surgical procedures, for example, during chest tube insertion to provide realism to the procedure.

As also shown in FIG. 8, a heart block member 161 is inserted within rib cage 154 to model the human heart. Preferably, heart block 161 is made of silicone and includes a simulated pericardium 162. A simulated heart 164 is enclosed within heart block 161. For purposes of this description, the pericardium is considered a membranous layer that forms part of the simulated human tissue structure, albeit it is not shown to be bonded thereto. In a human, the pericardium is a sac of serous membrane that envelopes the heart. The pericardium is modeled in the trainer using a layer of a spherical shaped elastomeric material, such as a balloon. The heart is simulated in the trainer by an elastomeric spherical member as well. Simulated heart 164 is enclosed within simulated pericardium 162. Outlets 166 and 168 for both simulated pericardium 162 and simulated heart 164 extend from the heart block 161. Preferably, outlets 166 and 168 are connected to supply tubes 136 or 138 (shown in FIG. 7), depending on whether tube 136 is connected to rib cover 156. Tube 136 or 138 optionally carry simulated blood formulations to enhance the surgical training experience. Preferably, both simulated pericardium 162 and simulated heart 164 are filled with simulated blood. However, the simulated blood of the heart is of a different hue than the simulated blood of the pericardium. If the trainee is successful in the procedure, he or she will draw simulated blood from the pericardium 162. However, if the trainee is unsuccessful, meaning that he or she has inserted the needle too far and has lacerated the myocardium simulated by elastomeric spherical member 164, he or she will draw a different shade of blood from the simulated heart 164. In this manner, the trainee will learn to recognize the complications associated with pericardiocentesis.

Preferably, the surgical trainer 100 will be used for the following surgical procedures. However, the surgical trainer need not be limited to those enumerated below.

Diagnostic Peritoneal Lavage

Trainer 100 enables a user to practice diagnostic peritoneal lavage (DPL). DPL is a diagnostic procedure employed when a person sustains blunt trauma to the abdomen. DPL basically includes the step of inserting a needle with a guide wire through peritoneum 228 and into abdominal cavity 120. Peritoneum 228 is a serous tissue and therefore, a resistance will be encountered when inserting the needle. This resistance is modeled in the trainer using fibrous layer 230, which included within peritoneum 228. Once the needle has penetrated peritoneum 228, the needle is further inserted a short distance. The needle is then removed leaving the guide wire. A small incision is then made, and the peritoneal lavage catheter is inserted over the guide wire and into the peritoneal cavity. The guide wire is then removed from the abdominal cavity 120 so that only the lavage catheter remains. Any collected fluid will be analyzed to determine whether surgery is indicated. Trainer 100 provides simulated resistance at peritoneum 228, and the aspiration of the catheter tube will result in collection of a fluid because abdominal cavity 120 contains simulated blood and/or bodily fluid. Complications, which may arise during peritoneal lavage, include peritonitis due to intestinal perforation from the catheter. The trainer includes simulated intestines 122 filled with simulated bodily fluids. Therefore, a trainee can experience the undesirable result if intestine 122 punctured while performing the procedure. In an alternative DPL, the procedure includes dissecting with a scalpel through the human tissue structure and inserting the catheter through the incision. This and other procedures that include dissecting tissue can be performed on the surgical trainer, which is constructed in accord with the present invention.

Chest Tube Insertion

Trainer 100 also enables a trainee to practice chest tube insertion. As with DPL, chest tube insertion is a procedure that is often used in trauma situations. More specifically, chest tube insertion is employed to aid patients suffering from a pneumothorax. To perform the procedure, a 2 to 3 centimeter horizontal incision is made in the fifth intercostal space, anterior to the midaxillary line on the affected side. The subcutaneous tissues are dissected to just over the top of the rib. Trainer 100 provides simulated tissue with subcutaneous tissues and ribs, and therefore support practicing this procedure. The parietal pleura, which in this embodiment is added to intercostal muscle layer 140, is punctured, and a gloved finger is inserted into the incision to avoid injury to other organs and to clear any adhesions or clots. Trainer 100 provides this opportunity as well, and the trainee user can experience the tactile interaction with simulated lungs 158 and ribs 154. The thoracostomy tube is then inserted into the pleural space. Complications encountered in chest tube insertion include laceration or puncture of intrathoracic and/or abdominal organs, all of which can be prevented by using the finger technique noted above, before inserting the chest tube. Thus, trainer 100 provides the opportunity for a trainee to perform and experience this aspect of the procedure as well.

Pericardiocentesis

Trainer 100 also enables a trainee to practice pericardiocentesis. Pericardiocentesis is another trauma procedure usually done to evaluate the status of a chronic or recurrent pericardial effusion (fluid in the pericardial sac), as a result of trauma to the chest. It may also be done to relieve cardiac tamponade (compression of the heart from an accumulation of fluid within the pericardial sac). The procedure includes the steps of puncturing the skin 1-2 centimeters inferior and to the left of the xiphochondral junction, at a 45 degree angle to the skin. The needle is advanced cephalad, aimed toward the tip of the left scapula. When the needle tip enters the blood-filled pericardial sac (pericardium), blood within the pericardial sac can be withdrawn. This part of the procedure is simulated in trainer 100 by filling pericardium 162 with simulated blood. A complication of this procedure includes laceration of the myocardium or wall of the heart, which is simulated in trainer 100 by providing simulated heart 164 filled with a different colored simulated blood. If blood from simulated heart 164 is aspirated, the trainee will recognize that the myocardium has been lacerated (or punctured) by the change in blood color. Thus, the trainee can experience this complication resulting if the needle is inserted at the incorrect location. Another complication might be puncturing a lung, which can be simulated on trainer 100, because the trainer provides an inflatable lung 158.

Cricothyroidotomy

The trainer 100 allows medical personnel to practice cricothyroidotomy. This procedure is yet another trauma procedure and is performed when a secure airway needs to be maintained. The first step in cricothyroidotomy is to palpate the thyroid notch and cricothyroid interval for orientation, which can be experienced in trainer 100, because these cartilages are reproduced. Also, the thickness of simulated human tissue 116 around the neck area of the trainer is similar to that of human tissue in the neck area. A transverse incision is made over cricothyroid ligament 146, and the ligament is incised transversely. The incision is opened, and an endotracheal tube is inserted into the trachea. Trainer 100 is provided with functioning lungs 158, so the trainee can experience lung inflations as would occur in a real procedure. Furthermore, any incision into the respiratory tract, such as one made in the neck area during a simulated cricothyroidotomy, would result in a gush of air being expelled, just as in an actual procedure performed on a human patient.

Conductive Circuits for Use in Physiological Training and Evaluation Simulators

FIGS. 10A-10D, 11A-11E, 12A-12D, 13, 15, 16, 17A and B, 18, 22A, 22B, 22C, 23, and 24 schematically illustrate various embodiments of electrical evaluation circuits that can be employed in accord with the present invention to evaluate the performance of a simulated medical procedure when such circuits are included in a physiological training and evaluation simulator. As noted above, such circuits include conductive elastomers. The use of conductive elastomers enables the functionality of an electrical circuit to be achieved without adversely impacting the realistic look and feel of a physiological structure. By selecting elastomeric materials of the appropriate thickness and density, physiological training and evaluation simulators can provide a very realistic training experience, just like the surgical trainers discussed above. However, inclusion of conductive elastomers within such structure enables much greater functionality that can both improve the quality of the training and provide an objective evaluation of the skill with which a procedure is performed.

The use of elastomers in achieving realistic physiological training and evaluation simulators is very important. For example, as noted above, by manipulating the amount of diluent added to an elastomeric monomer before curing, simulated fat can be produced. Generally, diluents will be added only up to a certain amount specified by a manufacturer, because use of excess diluent results in an elastomer that is "oily" and has very little strength. Such properties are undesirable in most applications for which elastomers are used, as a solid and durable product is more generally desired. However, excess diluent enables a very realistic simulated fat to be achieved. As with actual human fat, a simulated fat layer can readily be parted using a finger or the blunt end of a scalpel, and the simulated fat provides a very realistic tactile sensation.

The simulated tissue structures described in detail above use elastomers to achieve a realistic training simulator. To provide realism, a simulated physiological structure should not only look like an actual physiological structure, but should also respond to manipulation by a user in a manner that corresponds to the response of the physiological structure of a human. For example, the simulated physiological structure should exhibit a resistance to cutting corresponding to that of the actual human body structure so that the feel of cutting the simulated, structure is realistic and closely emulates the feel of cutting the corresponding actual human physiological structure. The simulated physiological structure should thus be formulated and configured to provide this realistic tactile experience to fully prepare a user for carrying out the medical procedure on a human. The use of an appropriately formulated elastomeric material enables such realism to be achieved.

Not only can elastomeric materials be used to provide simulated human tissue structures, but other physiological structures, such as organs, joints and bones can be simulated using elastomers, as discussed in detail below. A further goal of the present invention is to provide feedback or an indication of how well a procedure is being performed on almost any type of simulated physiological structure. The types of electrical circuitry employed to achieve that further goal have been selected to avoid degrading the visual and tactile realism of the simulated structures.

Referring now to FIGS. 10A-10D, examples of basic electrical circuits that include conductive elastomers for providing feedback or an indication of the quality with which a procedure is being implemented are described. It should be understood that the circuits of FIGS. 10A-10D are merely exemplary, and are not intended to be limiting on the scope of the invention. Those of ordinary skill in the art will readily recognize the tremendous variation that is possible with respect to almost any type of electrical circuit. Accordingly it will be apparent that the electrical evaluation circuits used in the present invention can also be formed in many different ways that are still within the scope of the invention as described below. It should also be understood that circuits can be configured to receive input based on a variety of different inputs, such as changes in electromagnetic fields, changes in capacitance, changes in impedance, changes in temperatures, as well as inputs based on electromagnetic phenomena. As desired, conductive elastomer-based evaluation circuits can be configured as desired to respond to such varied inputs.

At least part of an electrical circuit used in a training and evaluation simulator in accord with the present invention is formed of a conductive elastomer configured to provide a realistic look and feel to the simulator. Generally, the conductive elastomer is part of the simulated physiological structure. The evaluation circuit is configured to provide an indication of the quality with which medical personnel performs a simulated medical procedure. As discussed in greater detail below, the electrical circuit can provide an indication of whether the procedure was performed within acceptable limits, or can even indicate the quality with which the procedure was completed.

FIG. 10A shows an evaluation circuit 330, at least part of which is formed of an elastomeric material. The portion of the circuit formed of the conductive elastomer is preferably incorporated into a simulated physiological structure. A power source 332 provides a voltage. Power source 332 can be simply a user replaceable battery contained within the physiological training and evaluation simulator of which the evaluation circuit is a part, or can be a battery disposed external to the physiological training and evaluation simulator, or can be a separate line voltage energized power supply, e.g., a "power brick." Many. useful circuits can be configured that require relatively modest amounts of power, such that the power for the circuit can be provided by a universal serial bus (USB). As some implementations of the present invention are intended to be used in conjunction with a computing system, such as a desktop or laptop computer, a USB interface can be employed to provide a data input, a data output, and to energize an evaluation circuit.

Circuit 330 is incomplete, as indicated by a gap 336. When the circuit is completed (using any of the actions described below), a current flowing through the circuit actuates an indicator 334, which may be visual, such as a light or meter, and/or an audible indicator. As discussed in greater detail below, a signal provided by evaluation circuits in accord with the present invention can be used in a variety of ways to provide feedback to a user. Embodiments for using a signal from a conductive elastomer-based evaluation circuit to provide feedback are discussed below in connection with FIGS. 12A-12D. As will be described in detail below, one technique for completing circuit 330 requires bridging gap 336 with a conductor 338a. Because other techniques can be used to complete the circuit, conductor 338a is shown using dashed lines, indicating the use of conductor 338a is optional.

For circuit 330 to provide feedback, generally the circuit must be completed as a result of an action performed on the simulated physiological structure by a trainee. While those of ordinary skill in the art will recognize that many configurations of open circuits can be implemented, conductive elastomer-based evaluation circuits associated with simulated physiological structures that are open (i.e. incomplete) can be closed (i.e. completed) based on three basic types of actions. First, some physical manipulation of the simulated physiological structures can close gap 336 to complete the circuit (i.e. placing a dislocated joint back in its socket). Second, gap 336 can be closed by coupling together opposing portions of the simulated physiological structure (i.e. suturing together the opposed ends of a severed blood vessel). Third, some conductor, either an instrument or a segment of a simulated physiological structure, is placed into gap 336 to complete the circuit. More detailed examples of such actions are provided below.

In one embodiment, a manipulation of the simulated physiological structure consistent with the proper execution of a simulated procedure will complete the circuit. For example, consider a simulated physiological structure including a dislocated shoulder (or other joint). Circuit 330 is incorporated into the simulated dislocated shoulder, such that the circuit is open while the simulated shoulder is dislocated. If the trainee properly manipulates the simulated shoulder and positions the shoulder in the shoulder socket, circuit 330 is completed and the circuit provides an indication that the procedure was performed appropriately.

In another embodiment where a manipulation of a simulated physiological structure is required to complete the circuit, physically coupling portions of the simulated physiological structure together will complete the circuit. Consider a simulated physiological structure representing a severed blood vessel (or intestine). Circuit 330 is incorporated into the simulated blood vessel (or a simulated intestine), such that adjacent ends proximate a gap in the simulated blood vessel are conductive. If the trainee is able to reconnect the adjacent ends of the blood vessel, the circuit is completed and the circuit provides an indication that the procedure was performed correctly. This type of coupling can also be implemented in conjunction with other simulated physiological structures, such as damaged epidermal layers, where a break in the epidermal layer is sealed by suturing together a simulated wound. Another type of simulated physiological structure that can be coupled together is a simulated broken bone. Circuit 330 is incorporated into the simulated broken bone, such that before the bone is properly reset the circuit is incomplete, and then when the bone is properly set the circuit is completed, and the circuit provides an indication that the procedure was performed correctly.

In yet another embodiment, a conductor 338a is placed in gap 336 to complete the circuit. With respect to the blood vessels/intestines noted above, rather than physically moving adjacent ends of such a simulated structure so that the opposed ends are coupled together, conductor 338a represents an additional section of a blood vessel or an intestine that is placed in the gap (and sutured or otherwise coupled to the other portions of the simulated physiological structure) to complete the circuit. In some embodiments, conductor 338a is a probe or instrument, that when properly employed in a simulated medical procedure will complete the circuit. For embodiments in which conductor 338a is a probe or instrument (as opposed to a portion of a simulated physiological structure), the configuration of conductor 338a depends on the simulated medical procedure to be evaluated. In such cases, conductor 338a can be any metallic medical instrument, such as a syringe needle or a scalpel.

Regardless of which of the three basic actions are used to complete the circuit (manipulating the simulated physiological structure, coupling portions of the simulated physiological structure together, or bridging a gap in the circuit by placing a conductor in the gap), once the circuit is completed, indicator 334 provides an indication to that effect.

FIG. 10B shows an evaluation circuit 340, which also includes at least a portion 341 that is disposed proximate to a simulated physiological structure formed of an elastomeric material (not shown). Power source 332, as described above, provides an electrical current. Circuit 340 is complete, and indicator 334 is configured to only produce an indication when the circuit is broken. Probe 338b, most often implemented as a scalpel, breaks circuit 340 when a simulated medical procedure (i.e., an incision) is properly executed at the appropriate location in the simulated physiological structure, where portion 341 is located. In this case, the loss of the current flowing in the circuit causes indicator 334 to provide an indication of a properly executed simulated medical procedure, while the continued flow of electrical current causes the indicator to provide an indication of an improperly executed simulated medical procedure.

In FIG. 10C, a conductive elastomer-based evaluation circuit 342a is initially coupled to power source 332, but is initially incomplete. A probe 338c is coupled to one side of the power source and is configured to connect to a target 339a, when the probe is properly employed to execute a simulated medical procedure. Again, while probe 338c must be conductive, the form of the probe will be appropriate for completing a specific simulated medical procedure. For example, the probe may comprise a syringe/needle or an electrically conductive catheter. Generally, target 339a will be hidden from view, such that the student will need to rely on feedback provided by the evaluation circuit to determine if probe 338c actually connected with the target (thereby completing the circuit). It should be understood that target 339a can be implemented in many forms, such as a thin sheet, a plurality of adjacent strips, a bulls eye, or a grid. Target 339a will normally be incorporated into a medical model at the area of the model where a simulated procedure is to be performed. As will be discussed in greater detail below, a plurality of different circuits might be disposed in the same general location of the model to enable feedback to be provided relative to how close to an ideal position the probe was positioned.

FIG. 10D shows a closely related conductive elastomer-based evaluation circuit 342b, in which a probe 338d is not initially coupled to power source 332. Probe 338d must be conductive. Circuit 342b includes a charged target 339b as well as target 339a. When the probe is properly employed to execute a simulated medical procedure, the probe couples charged target 339b to target 339a, thereby completing the circuit. Circuit 342b has the advantage over circuit 342a in that probe 338d is not required to be coupled directly to the power source, as is required in circuit 342a. This enables probe 338d to be more freely manipulated by the student, and thus enables a more realistic simulation. Circuit 342b is particularly well suited to be used in conjunction with simulated procedures involving needle insertion. Medical needles are readily conductive, thus a specialized probe is not required. Note that circuit 342b is functionally very similar to circuit 330 (FIG. 10A), the only difference being the inclusion of targets 339a and 339b. As noted above, target 339a can be implemented as a thin sheet, strips, or a grid. Charged target 339b should be at least as large as target 339a, and can be implemented as substantially larger than target 339a. The targets (particularly when implemented as sheets) must be spaced far enough apart so as not to share charges as would opposed plates of a capacitor, as indicator 334 should be triggered only when probe 338d actually physically couples the targets together during the proper execution of a simulated procedure. Again, targets 339a and 339b will normally be hidden from view, such that the student will need to rely on feedback provided by the evaluation circuit to determine if probe 338d actually connected with the target as desired. Note that portions of circuit 342a (as well as portions of the other circuits discussed above) may be implemented with convention conductors and wiring, but targets 339a and 339b are preferably implemented as conductive elastomers, as those portions of the circuit will be incorporated into the medical model, where the presence of conventional circuit elements would not be realistic.

FIG. 11A schematically illustrates an evaluation circuit 344 that includes a pressure sensitive transducer 343, which as will be described in greater detail below, can be beneficially incorporated into a simulated physiological structure. Such piezoelectric circuits are well known and generate an electrical potential in response to applied mechanical force. Evaluation circuit 344 is configured so that when a probe 338d is utilized to properly execute a simulated medical procedure (and in doing so, applies a force to pressure sensitive transducer 343), an electrical current is generated that can be used to produce a feedback signal indicative of the level of pressure applied. Note that while piezoelectric materials are not elastomeric, a portion of circuit 344 is formed of conductive elastomers. As discussed above, elastomeric materials can be employed to realistically simulate many physiological elements, such as skin, tissue, membranes, fat, muscle and organs. Piezoelectric materials are generally hard. There are physiological elements that can be simulated using hard materials, such as bone and cartilage. Thus, one implementation of circuit 344 could be a simulated bone, with piezoelectric material simulating a portion of the bone structure, and conductive elastomers simulating muscle and other tissue attached to and disposed adjacent to the bone. However, the force can be transmitted using a fluid, so that the tactile sensation associated with applying the force does not correspond to the feel of a relatively hard pressure sensitive transducer. Thus, if the simulated medical procedure being evaluated is manual cardiac massage, a pressure sensor sensing a pressure of a fluid in the simulated heart can produce the feedback signal indicative of the applied pressure, to indicate if the person applying the pressure to the simulated heart is performing the procedure properly and within acceptable limits. Also, other types of pressure transducers, such as variable capacitance and variable resistance transducers, are available that are less detectable by touch and can be used for sensing applied force or pressure.

Note that touch sensitive switches (as opposed to switches that must be flipped or pushed to make and break a mechanical connection) are commonly used in many devices, such as touch screen displays and microwave oven controls. Touch sensitive switches can be configured to operate under several different principles, including temperature sensitive switches (commonly found in elevator buttons configured to respond to the warmth of the human finger), resistance sensitive switches (closely adjacent contacts, at least one of which can be deflected to close the circuit), radio sensitive switches (switches configured to sense a change in radio-wave reception that occurs when the switch is touched by an object that acts as an antenna), and capacitance sensitive switches (switches configured to determine when the switch is touched by an object that changes the inherent capacitance of the switch). While temperature sensitive switches, resistance sensitive switches, and radio sensitive switches generally do not determine the magnitude of the pressure applied to the switch, if a circuit requires sensing only that the switch has been touched, any of the above types of touch sensitive switches can be incorporated into a conductive elastomer-based evaluation circuit.

A simple embodiment of a resistance sensitive switch incorporated into an elastomer-based evaluation circuit is illustrated in FIG. 11B. Touch sensitive circuit 345 includes conductive plate portions 347a and 347b that are formed of a conductive elastomer and which are disposed adjacent to each other, but not normally in electrical contact. The gap separating the portions is maintained until a sufficient deforming force or pressure is applied. The force or pressure is either applied with a probe 338d to the elastomeric portion of either of portions 347a and 347b, or can be applied manually by the person being evaluated, using a finger or a hand. In response to the force or pressure applied, the affected elastomeric portion deforms until it contacts the opposing portion, thereby completing the circuit and conducting an electrical current. Indicator 334 registers that the circuit is closed.

It should be noted that such resistive systems can be configured to determine the coordinates of where the contact with the switch occurs. For example, touch sensitive displays include a normal glass panel that is covered with both a conductive layer and a resistive metallic layer, each layer being separated by spacers. An electrical current runs through the two layers while the monitor is operational. When a user touches the screen, the two layers contact in that exact spot. The change in the electrical field is noted and the coordinates of the point of contact are calculated by the computer. If desired, such a coordinate sensitive touch switch can incorporated into a conductive elastomer-based evaluation circuit in accord with the present invention.

FIGS. 11C and 11D illustrate a conductive elastomer-based evaluation circuit 351 that includes a radio sensitive switch 353. In FIG. 11C, a probe 359 that can function as an antenna is not coupled to switch 353, and the switch is open (the circuit is incomplete). Switch 353 naturally receives a baseline amount of radiofrequency energy, indicated by a line 355a. In FIG. 11D, probe 359 is coupled to switch 353, and because probe 359 acts as an antenna, switch 353 receives a greater magnitude of radiofrequency energy (indicated by a line 355b), and the switch closes to complete the circuit. Indicator 334 registers that the circuit is closed. Note that many objects can function as an antenna, including metallic surgical instruments such as scalpels and needles, as well as the human body itself. A student holding a needle or scalpel will act as an antenna when the needle or scalpel touches switch 353. Such a switch can also be actuated by the trainee touching the switch.

FIG. 11E illustrates a conductive elastomer-based evaluation circuit 361 that includes a capacitance sensitive switch 363. In a capacitance sensitive switch, an inherent or baseline charge of a capacitor is changed. Depending on the configuration of the capacitance sensitive switch, the baseline charge can be changed by a conductive object (which adds or removes charge from the capacitance sensitive switch), or by a non conductive object that changes the properties of the dielectric in the capacitor. Capacitance sensitive switches or sensors can be configured in several ways. In some configurations, at least one of the two electrodes of a capacitor are movable, and the sensor/switch responds to the increase or decrease of the dielectric gap between the electrodes (which changes the baseline charge of the capacitor). In other configurations the positions of the electrodes are fixed, and a nonconductive material is introduced into the dielectric gap between the electrodes, which changes the properties of the dielectric gap, again resulting in a change from the baseline charge of the capacitor. In yet another configuration, the positions of the electrodes are fixed, and a conductive material is placed in contact with one of the plates, yet again changing the baseline state of the capacitor. Thus depending on the configuration of capacitance sensitive switch 363, probe 365 can be a conductor or an insulator. Note that capacitance can be used to measure pressure, as well as responding to touch. As described above, when the dielectric gap between two plates of a capacitor changes, the change in capacitance can be measured. A pressure sensitive circuit can be configured such that as pressure is applied to one plate of a capacitor by a simulated instrument, that plate moves relative to the other plate of the capacitor, effectively changing the baseline capacitance of the capacitor by changing the dielectric gap. The more pressure is applied, the smaller the gap becomes, and the larger the change. Of course, the simulated instrument must be an insulator, or contact by the instrument to the capacitor plate will in and of itself change the baseline capacitance. To respond to pressure applied by a user's fingers or a conductive simulated instrument, an insulator layer (for example, a non conductive elastomeric layer of sufficient thickness to block induction) can be placed between the movable capacitor plate and a trainee's finger or the conductive simulated surgical instrument. Because capacitance sensitive circuits measure the change in capacitance, and capacitance can be changed based on a function of a distance between a capacitor and an object affecting the baseline charge of the capacitor, capacitance sensitive switches/sensors can be used to determine proximity. For example, as a simulated instrument is brought closer and closer to a capacitance sensitive circuit, the change in the baseline capacitance increases. Such capacitance sensitive circuits can be used to determine the degree of proximity between the circuit and an object. Such capacitance sensitive circuits are therefore very useful in enabling a conductive elastomer-based evaluation circuit to provide feedback about the proximity (and the degree of proximity) of an object relative to the circuit. As with resistance sensitive switches, capacitance sensitive switches have also been used to determine a coordinate position in touch sensitive display implementations. When a user touches such a touch sensitive display, some of the charge from the display is transferred to the user, so the charge on the capacitive layer decreases. This decrease is measured in circuits located at each corner of the display. A computer calculates, from the relative differences in charge at each corner, exactly where the touch event took place. If desired, such a position sensitive capacitance sensitive switch can be implemented in a conductive elastomer-based evaluation circuit in accord with the present invention. As discussed above, portions of circuit 361 may be implemented using conventional circuit elements. To achieve a realistic model, preferably portions of circuit 361 that can be seen or felt by a trainee will be implemented using conductive elastomers, to enhance the training experience.

As noted above, FIGS. 12A-12D schematically illustrate different embodiments for utilizing the current flowing in the circuits described above to provide feedback indicative of whether a simulated medical procedure is being properly performed, or indicative of the quality of the performance. In FIG. 12A, an electrical current flowing in the evaluation circuit is used to energize a light source 346a comprising indicator 334. The light source can be a light emitting diode (LED) or other type of light emitting device or lamp. A LED or other solid state light source is preferable, since such devices require less electrical power than do conventional incandescent light sources.

In FIG. 12B, indicator 334 comprises a circuit 348, which includes a power source 350, a light source 346b, and an electronic switch 352, which is used to open and close circuit 348. Electronic switch 352 is normally in an open state, and thus, light source 346b is not illuminated. When the evaluation circuit provides a potential to trigger electronic switch 352, the electronic switch changes to a closed state, completing circuit 348 and causing the light source to produce light. Light source 346b is an LED, or lamp. Note that light source 346b can be an incandescent source or other higher current light emitting device without requiring that the evaluation circuit carry the current needed to energize the light source, because light source 346b in circuit 348 is energized by separate power source 350. Of course, electronic switch 352 can be configured to be in the closed state until a trigger potential is received from the evaluation circuit, so that the light source remains energized until the evaluation circuit produces a potential indicative of the proper execution of a simulated medical procedure.

Referring now to FIG. 12C, an electrical current flowing in the evaluation circuit can be used to energize an audio source 354 to produce an audible feedback indicating that the simulated medical procedure was properly executed. As described above, if desired, a tone can be provided until the simulated medical procedure is properly executed, however such an embodiment is likely to be distracting. It should be understood that audio source 354 can replace light source 346b in circuit 348, so that the evaluation circuit provides a trigger potential to close electronic switch 352 to produce an audible tone or pulse, or other audible signal indicative of successfully completing a simulated medical procedure. Of course, if desired, voltage from indicator 334 can generate both light and sound using combinations of FIGS. 12A-12C.

In FIG. 12D, indicator 334 comprises a controller 357 that receives an electrical current or potential from the evaluation circuit when a simulated medical procedure is completed correctly (or alternatively, responds to the loss of current that occurs when a medical procedure is completed correctly). The embodiment of FIG. 12D is likely to be useful in testing situations where no feedback is provided to the person while carrying out the simulated medical procedure. Instead of being used to produce light or sound that can be seen or heard by the trainees, controller 357 of indicator 334 produces light or sound or stores data for subsequent evaluation. A proctor who is monitoring the trainee's attempt of the simulated medical procedure in real time or at a later time, if reviewing the stored data, can then determine the results of the evaluation. Controller 357 will most often be implemented by a computing device, such as a personal computer, or a portable computing device such as a personal digital assistant.

It should be understood that the circuits disclosed above are not limited to any specific configurations, but are simply exemplary. The actual design of the evaluation circuit will be largely based on the type of simulated medical procedure being evaluated and the required level of feedback regarding the quality of performance when completing a medical procedure.

The pericardiocentesis procedure discussed above requires a trainee to properly select a specific portion of a simulated torso in which to insert a needle, based on visual and physiological landmarks provided by the simulator. FIG. 13 schematically illustrates part of a simulated torso 356, and three evaluation circuits 358, 360, and 362 that respectively correspond to regions A, B, and C. It should be understood simulated torso 356 comprises a layered simulated tissue structure like those shown in FIGS. 2 and 4, as described in detail above. The regions of simulated torso 356 that are respectively monitored by evaluation circuits 358, 360, and 362 are defined by circular dashed lines, and the circuits for each region are disposed underneath a first layer so as not to be evident visually or tactilely to the person being evaluated. Circuit 358, labeled "A," is disposed at the most preferred location for the simulated medical procedure to be completed, and region A is generally circular shaped (i.e., like the center of a bull's eye target). Introducing a probe (i.e., a needle) into region A monitored by circuit 358 will generate an indication as described above, which can be an audible or visual feedback signal that is evident either to the person being evaluated (or to a proctor, but not to the person being evaluated, as desired). Circuit 360, which monitors region B, shaped as an annular ring concentrically disposed about region A, represents a location that is close to the most preferred location, but less preferred for the site where the simulated medical procedure should be carried out. Circuit 362 for monitoring region C (yet another concentric annular ring) is even farther removed from the most preferred location and is thus much less preferred.

In one embodiment, circuit 358 is coupled to light source of a first color (such as green) indicating the location on the simulated torso selected by the person being evaluated to perform the simulated medical procedure was correct. Circuit 360 can be coupled to a light source of a different color (such as yellow), so that if lighted, indicates that the location selected by the person to perform the simulated medical procedure is close, but not correct. Finally, circuit 362 can be coupled to yet another colored light source (such as red), indicating when lighted that the selected location is relatively far from the desired location for performing the simulated medical procedure. As described in more detail below, to properly evaluate a simulated pericardiocentesis, additional evaluation circuits configured to indicate whether the depth (and angle) the probe is inserted is correct are also included in the simulated torso. While circuits 358, 360 and 362 are not shown as including leads that enable the circuits to be coupled to an indicator, it should be understood that the circuits do include such elements. If the circuits are implemented on the same plane, such leads for circuits 358 and 360 will be required to pass through different planes to avoid contact with circuit 362. It is also possible to implement each circuit on a different plane so that such leads do not interfere with the other circuits.

FIG. 14A schematically illustrates an evaluation circuit 368 that includes conductive elastomers, and which is based on circuit 342*a* of FIG. 10C. Circuit 368 includes conductive elastomers 374, 376, and 378. The conductive elastomers can be produced using the monomers described above in conjunction with making simulated human tissue structures, to which a conductive carbon is added. It should be understood that the conductive elastomers can readily be formed into other shapes, such as the circular shape and concentric annular rings shown in FIG. 13.

Each of conductive elastomers 374, 376, and 378 is coupled to a different light source. Conventional wire conductors can be used for this purpose, or smaller segments of conductive elastomers. Conductive elastomer 378 is coupled to a green light 380*a*, conductive elastomer 376 is coupled to an amber light 380*b*, and conductive elastomer 374 is coupled to a red light 380*c*. Each conductive elastomer is labeled R, A, or G to indicate the color of light to which the conductive elastomer is electrically coupled. The other terminal of each light 380*a*-380*c* is then electrically coupled to one terminal of a battery 370. An opaque elastomeric layer 379 is placed over each conductive elastomer, so that the individual conductive elastomers are not visibly apparent.

A conductive probe 372 (simulating a medical instrument such as a syringe needle, which would be employed to perform a simulated medical procedure) capable of penetrating layer 379 is also coupled to battery 370. Whenever the conductive probe contacts one of conductive elastomers 374, 376, and 378, a circuit is completed and the corresponding light for the region that was contacted provides a visual indication of the completed circuit. The orientation of conductive elastomers 374, 376, and 378 is such that a relative position of probe 372 along an X-axis (extending from left to right in this Figure) of the opaque elastomeric layer 379 can be determined. For example, the region monitored by conductive elastomer 378 is designated as the correct position (along the X-axis) for carrying out a simulated medical procedure with probe 372. If the probe is placed in contact with conductive elastomer 378, the green light is energized, indicating the probe was inserted in the correct position along the X-axis. The amber is energized to indicate that the probe contacted conductive elastomer 376, adjacent to the correct position (along the X-axis). The red light is illuminated when the probe contacts conductive elastomer 374, indicating that the probe was inserted too far from the correct position (relative to the X-axis). On Page 47, the paragraph beginning at line 3 should be replaced with the following.

It should be understood that it would be straightforward to modify circuit 368 to include discrete conductive elastomers that are shaped as vertical strips (like conductive elastomer 378) for monitoring more regions along the X-axis. Thus, the vertical portions of conductive elastomers 374 and 376 to the left of conductive elastomer 378 would represent discrete conductive elastomers that monitor corresponding regions, and the vertical portions of conductive elastomers 374 and 376 to the right of conductive elastomer 378 would similarly represent discrete conductive elastomers that monitor corresponding discrete regions along the X-axis. Each individual discrete conductive elastomer would be coupled to a light source of a different color (or to lights in different corresponding positions along an array of light sources-not shown), so that the light source would indicate whether the probe was placed to the left or right of the correct position along the X-axis (i.e.

to the left or right of conductive elastomer 378), and the extent of the deviation from the correct position. Of course, instead of coupling each conductive elastomer to a light, the elastomers can be connected to a different indicator, such as a meter, or a computing device or processor that keeps track of which conductive elastomer is contacted by the energized probe. It should also be understood that multilayer configurations with conductive elastomer bars extending horizontally can be used to determine the accuracy of the probe penetration along the Y-axis, and thus the configuration of circuit 368 merely represents one potential embodiment. Any configuration of conductive elastomers employed for a commercial application of the present invention will be selected to evaluate specific simulated medical procedures. Thus, the specific configuration of the evaluation circuit will depend on the simulated procedure being evaluated, and the simulated physiological structure with which the evaluation circuit is employed. Several examples are described below.

FIG. 14B schematically illustrates a prototype evaluation circuit 368a that includes conductive elastomers, which was produced to provide a proof of principle for the present invention. Note circuit 368a is based on circuit 342b of FIG. 10D (which does not require a probe coupled to a power supply, but does require a conductive probe such as a needle). Circuit 368a is very similar to circuit 368, and includes conductive elastomers 374a, 376a, and 378a. The conductive elastomers were produced using the monomers described above. Conductive carbon fibers were added to the elastomers before curing. The mixture of elastomers and conductive carbon was then cast into the elongate and "U" shapes illustrated, and allowed to cure. As noted above, the conductive elastomers can readily be formed into other shapes. It should also be understood that instead of casting the mixture into the different shapes of conductive elastomers 374a, 376a, and 378a, the mixture could be cast as a sheet and allowed to cure. Individual sections of any desired shape can then be produced by cutting the sheet into the desired configuration. Complex shapes can be produced by assembling a plurality of different conductive and non conductive elastomeric segments.

Each of conductive elastomers 374a, 376a, and 378a were similarly coupled to a different light source; conductive elastomer 378a was coupled to a green light 380d, conductive elastomer 376a was coupled to an amber light 380e, and conductive elastomer 374a was coupled to a red light 380f. Each conductive elastomer is shaded using a different pattern, and that pattern is reproduced on the base of the light to which the conductive elastomer is electrically coupled. The other terminal of each light 380d-380f was then electrically coupled to one terminal of a battery 370. As noted above, opaque elastomeric layer 379 was placed over each conductive elastomer, so that the individual conductive elastomers were not visibly apparent.

A conductive layer 373 is disposed between the conductive elastomers and the user. Note if conductive layer 373 is opaque, then layer 379 and layer 373 can be implemented as a single layer. As the proof of concept was intended to simulate a multilayered tissue structure, multiple layers were employed. In the prototype, conductive layer 373 was produced by adding conductive carbon fibers to an uncured elastomer mass, and that mixture was then cast into a sheet. The entire sheet is conductive, although it should be understood that the conductive portions of layer 373 need only correspond to the shapes of conductive elastomers 374a-c.

A conductive needle 372a was used to penetrate conductive layer 373 and opaque layer 379. The conductive needle was charged as it contacted conductive layer 373 (which is coupled to the battery). When the needle contacted one of conductive elastomers 374a, 376a, and 378a, a circuit was completed and the corresponding light for the region that was contacted provided a visual indication of the completed circuit. As discussed above in greater detail, the orientation of conductive elastomers 374a, 376a, and 378a enable a relative position of needle 372a along an X-axis of the opaque elastomeric layer 379 can be determined.

While not implemented in prototype circuit 368a, it should be understood that it would be straightforward to modify the circuit to include discrete conductive elastomers for monitoring more regions along the X-axis, as well as to add additional layers to enable monitoring along a Y-axis as well.

Later versions of prototype circuit 368 included additional layers of conductive elastomers distributed in a multilayer simulated tissue structure, each coupled to a light source, to enable the depth to which the needle penetrates the simulated tissue structure to be evaluated.

Simulated Human Tissue Structures Incorporating Conductive Elastomers

FIG. 15 schematically illustrates exemplary locations of conductive elastomer-based evaluation circuits in accord with the present invention that are incorporated into the simulated human tissue of FIGS. 3 and 4. Of course, each conductive elastomer will be coupled with other components (such as an electrical power source, and one or more light sources, audible sources, other circuits, and/or controller(s), generally as described above).

Conductive elastomers 382, 384a, and 384b are each disposed under skin layer 222, to ensure that the conductive elastomers are not visible to a person using the simulated tissue structure. If the conductive elastomers-were readily visible, then the person might deduce the correct location for performing a simulated medical procedure. With respect to conductive elastomers 382, 384a, and 384b, it is not critical whether the conductive elastomers are disposed beneath both silicone blend 202 and silicone-coated fibrous layer 204 as shown, or just under silicone blend 202, so long as the conductive elastomers are not visible. Conductive elastomers 382, 384a, and 384b are disposed and configured to evaluate whether a trainee has inserted a syringe 385 at an appropriate location to perform a simulated medical procedure (such as pericardiocentesis, described in detail above). Conductive elastomer 382 is disposed to detect that the syringe needle has been inserted in a preferred position, while conductive elastomers 384a and 384b represent adjacent, but incorrect positions. It should be understood that conductive elastomers 384a and 384b can be discrete segments, or can be different portions of a continuous conductive segment, such as annular ring-shaped conductive elastomers of evaluation circuits 360 and 362 of FIG. 13. Each of conductive elastomers 382, 384a, and 384b is configured in an evaluation circuit to provide an indication useful for evaluating the performance of a person performing a simulated medical procedure. As described above, the indication can be an audible feedback, a visual feedback, or a signal that can be processed and stored as data by a controller. The person performing the simulated procedure can be provided the feedback immediately in real time, or the simulated medical procedure can be conducted as a blind test, with the indication being hidden from the person undergoing the evaluation, but made available to a proctor administering the blind test, either in real time or stored as data for subsequent review.

Conductive elastomers 386, 388, and 390 are employed to determine if simulated syringe 385 has been inserted into the simulated tissue structure to the depth required for a specific simulated medical procedure. Assuming that conductive elastomer 390 represents the depth required for a specific medical procedure, feedback can be provided that the needle of syringe 385 is disposed deeper than conductive elastomer 388, but not as deep as conductive elastomer 390, and therefore should be inserted deeper. If the feedback is provided to the person inserting the needle in real time, the person will be alerted that syringe 385 needs to be inserted deeper into the simulated tissue structure to properly simulate the medical procedure, which will clearly be useful in training the person to perform this aspect of the medical procedure properly. If desired, additional conductive elastomers (e.g., covering a relatively large area) can be provided beneath conductive elastomers 384*a* and 384*b*, so that even when a person fails to select the correct position corresponding to conductive elastomer 382, the person's performance with respect to determining the appropriate depth can be evaluated.

Note that while the needle of syringe 385 has been inserted into the simulated tissue structure at an angle normal to the surface of the simulated tissue structure, there are procedures (such as pericardiocentesis) in which a needle must be inserted into a simulated physiological structure at a range of specific acute angles. Thus, a syringe 385*a* is shown being inserted into the simulated tissue structure at an angle of substantially 45 degrees. Syringe 385*a* passes through conductive elastomer 382, as well as conductive elastomers 387 and 389, which are properly disposed to provide feedback indicating that syringe 385*a* is inserted at the proper angle (and to a proper depth). Because of the angle, conductive elastomers 382, 387, and 389 must be offset from another to correspond to the correct angle, as opposed to being stacked one on top of another, as when the needle of the syringe should be inserted at a ninety degree angle relative to the skin layer.

While it is useful to include a conductive elastomer at the boundary of each different layer in the simulated tissue structure, to provide detailed feedback to a trainee, such conductive elastomers can be disposed at fewer than all such boundaries. Also, while it is convenient to include such conductive elastomers at the boundaries of each layer, it should be understood that conductive elastomers can be included within the a single layer (such as conductive elastomer 389) either by casting the conducting elastomer into the layer, or by placing a pre-cast conductive elastomer into a layer being formed.

Conductive elastomers 392 are disposed within channels 302, which simulate veins or arteries and can be used in several ways. For example, the conductive elastomers can be used to electrically couple devices disposed in a physiological training and evaluation simulator incorporating a simulated tissue structure. A physiological training and evaluation simulator of a human torso may include a simulated heart that is electrically coupled to a power source and a controller. The power source energizes the beating heart, and the controller can vary the heart beat to respond to simulated conditions, such as administering a simulated anesthetic. In such an embodiment, conductive elastomers are analogous to nerve bundles that send signals to and from muscles.

Conductive elastomers can also be employed to evaluate if a trainee damages a simulated artery or vein during a simulated medical procedure. For example, if a simulated medical procedure does not require cutting any simulated veins or arteries corresponding to channels 302 that include conductive elastomers 392, damage to such channels can be evaluated by detecting that the conductive elastomer has been cut with a scalpel. For this purpose, conductive elastomers 392 should substantially fill the simulated vein or artery, as opposed to filling only a small portion as shown. Otherwise, a person cutting near the channel could damage the channel without damaging the conductive elastomer, so that the error might not be properly detected. A more preferred alternative to conductive elastomers 392 are conductive elastomers 393, which are disposed on the outer periphery of channels 302, so that any incision into a channel surrounded by conductive elastomer 393 will be detected.

Conductive elastomers 394, 396, 398, 400, 402, and 404 are configured to evaluate an incision performed to gain access to an organ 406. As described above, these conductive elastomers will determine if the trainee has selected the correct location on skin layer 222 to perform the incision, and whether the trainee has cut through each layer required to access organ 406.

Simulated Organs Incorporating Conductive Elastomers

Simulated organ 406 can include a pressure sensor evaluation circuit 408, to evaluate if the trainee manipulates the organ using the proper technique. Pressure sensor evaluation circuit 408 can be implemented using piezoelectric sensors, such that pressure or force applied to the organ is converted into electrical signals that provide an indication of the magnitude and location of the pressure applied. As the amount of pressure is increased, the voltage level produced by a pressure sensor increases. Based on the level of the indication, it is possible to determine whether a person is applying sufficient pressure when handling organ 406, or too much pressure, and to determine if the pressure is being applied at the correct location on the organ. As discussed above in connection with FIG. 11E, capacitance based circuits can also be employed to respond to pressure.

Surgical Trainers Incorporating Conductive Elastomers

FIG. 16 shows a surgical trainer 100*a*, generally as described above in connection with the surgical trainer of FIG. 1, which additionally includes a plurality of conductive elastomer-based evaluation circuits in accord with the present invention. Generally as described above, trainer 100*a* simulates a torso, including faithful replication of the lower abdomen, hypogastric, iliac, lumbar, hypochondriac, medial, lateral, umbilical and epigastric areas. As described in detail above in connection with trainer 100 of FIG. 1, trainer 100*a* of FIG. 16 includes swatches of simulated human tissue structure draped over practice surgery areas and over areas of body cover 110. One or more conductive elastomer-based evaluation circuits is included in each practice surgery area of surgical trainer 100*a*.

For example, surgical trainer 100*a* includes an abdomen surgical practice area with abdomen tissue 112, which is preferably used to perform DPL. The abdomen surgical practice area of surgical trainer 100*a* preferably includes evaluation circuit 412. As discussed above, evaluation circuits are preferably hidden beneath at least one layer of a simulated physiological structure, so that their presence cannot be visually detected by a person performing a medical procedure. Thus, the evaluation circuits indicated in FIG. 16 are each shown using dashed lines, indicating that each evaluation circuit is disposed beneath an elastomeric layer simulating a skin layer. It should be noted that in some cases, such as providing an initial training experience, it might be useful to allow the positions of evaluation circuits to be observable by a trainee, to better familiarize the trainee with portions of a simulated physiological structure relevant to a specific simulated medical procedure. Once such basic training is provided, practical training exercises (with feedback from the evaluation circuits being provided to the trainee) and skill evaluations (with feedback from the evaluation circuits being provided to a proctor administering the evaluation) are best implemented using physiological training and evaluation simulators in which the disposition of evaluation circuits are not visible or otherwise evident to a trainee.

Referring once again to evaluation circuit 412 of surgical trainer 100a, the evaluation circuit is configured to evaluate a person's performance of DPL. As described above, DPL involves inserting a needle with a guide wire through the peritoneum 228 (FIG. 2) into the abdominal cavity 120 (FIG. 5). Once the needle has penetrated the peritoneum 228, the needle is further inserted a short distance and is then removed, leaving the guide wire. A small incision is then made and the peritoneal lavage catheter is inserted over the guide wire and into the peritoneal cavity. The guide wire is then removed from abdominal cavity 120 so that only the lavage catheter remains. Evaluation circuit 412 therefore preferably includes a plurality of individual conductive elastomer-based circuits disposed throughout the simulated operative area. Preferably at least one such circuit will be disposed proximate an upper layer of simulated abdomen tissue 112 to evaluate if the trainee has selected to insert the needle in the correct portion of the abdomen. At least one other circuit will be disposed proximate peritoneum 228, to determine if the trainee has inserted the needle to the proper depth. Such "stacked" evaluation circuits are represented by circuits 394, 396, 398, 400, 402, and 400 of FIG. 15. The more of such circuits that are employed, the greater will be the detailed evaluation of the performance of this medical procedure. For example, if only circuits 394 and 404 were utilized, the evaluation would only be able to determine if the needle had penetrated the layers proximate circuits 394 and 404, which are relatively far apart. It would be desirable to provide feedback to a trainee such as an indication that the needle has been inserted past layer 224 (the anterior rectus sheath), muscle layer 212, and the posterior rectus sheath 226 (see FIG. 15), but not as far as peritoneum 228. Such feedback will provide useful information to the trainee with respect to how far the needle should be inserted.

Complications that may arise during peritoneal lavage include peritonitis due to intestinal perforation with the catheter. Referring to FIG. 15, simulated organ 406 can represent a simulated intestine, and pressure sensor evaluation circuit 408 of organ 406 can instead comprise a circuit configured to provide feedback whenever the simulated intestine is perforated by a needle or the catheter during a simulated DPL. The simulated intestine may be pressurized with air to slightly above ambient pressure, and the pressure of the air sensed by pressure sensor evaluation circuit 408 to determine if the simulated intestine has been perforated.

Surgical trainer 100a of FIG. 16 includes a chest surgical practice area with chest tissue structure 114, which can be used to simulate chest tube insertion procedure and pericardiocentesis. Chest tube insertion requires making a 2-3 centimeter horizontal incision in the fifth intercostal space, anterior to the midaxillary line on the affected side. Preferably, each side of surgical trainer 100a will include an evaluation circuit 414, specifically configured to evaluate chest tube insertion, to determine if a person being trained or evaluated has performed the procedure correctly. Evaluation circuit 414 will include a portion disposed proximate a skin layer, to determine if the trainee has made the incision in the proper location. The chest tube insertion procedure also requires the insertion of a thoracostomy tube into the pleural space. Evaluation circuit 414 can include additional evaluation circuits using conductive elastomers disposed within surgical trainer 100a to determine of the tube has been inserted properly. Complications encountered in chest tube insertion include laceration or puncture of intrathoracic and/or abdominal organs, and as described above with respect to organ 406 simulating an intestine, evaluation circuit 414 can include evaluation circuits in each adjacent simulated organ to evaluate if the simulated chest tube insertion has damaged any adjacent simulated organs.

As noted above, chest tissue structure 114 of surgical trainer 100a can be employed to simulate pericardiocentesis, which includes the steps of puncturing the skin 1-2 centimeters inferior and to the left of the xiphochondral junction, at a 45-degree angle to the skin. The needle is advanced cephalad, aimed toward the tip of the left scapula. When the needle tip enters the blood-filled pericardial sac (pericardium), the blood can be withdrawn. Surgical trainer 100a includes an evaluation circuit 410 configured to evaluate a person's performance during a simulated pericardiocentesis. Evaluation circuit 410 includes at least a portion disposed adjacent a simulated skin layer to determine if the trainee selects the proper position for the insertion of a needle. Preferably, evaluation circuit 410 includes stacked layers (generally as indicated by conductive elastomers 382, 387, and 389 of FIG. 15) properly configured to provide feedback when the needle is inserted at the correct depth and angle.

A complication arising from an improperly executed pericardiocentesis involves laceration of the myocardium or wall of the heart. As discussed above, a simulated heart including its own conductive elastomer can be included in evaluation circuit 410 to provide feedback indicating whether the needle employed in the simulated pericardiocentesis damages a simulated heart. Yet another complication involves puncturing a lung, which can be evaluated by yet another portion of evaluation circuit 410 that is disposed at the periphery of simulated lung 158 (lung 158 is shown in FIGS. 7 and 8).

Surgical trainer 100a of FIG. 16 also includes a practice area configured to enable cricothyroidotomy to be simulated. Cricothyroidotomy is performed when a secure airway needs to be maintained, and includes palpitating the thyroid notch and cricothyroid interval for orientation. Once the proper location is identified, a transverse incision is made over cricothyroid ligament 146 (see FIG. 7), and the ligament is incised traversely. The incision is opened and an endotracheal tube is inserted into the trachea. Surgical trainer 100a includes an evaluation circuit 416 configured to evaluate the performance of a simulated cricothyroidotomy. If desired, a pressure sensor included in evaluation circuit 416 can be incorporated into simulated laryngeal cartilages and trachea, to evaluate whether a trainer is employing an appropriate amount of pressure when palpitating those structures. Evaluation circuit 416 includes a portion disposed adjacent to the surface of simulated skin layer of surgical trainer 100a to evaluate whether the position selected by the trainee for an incision is correct. Preferably, a portion of evaluation circuit 416 (or another such circuit) will be incorporated into simulated cricothyroid ligament 146, to evaluate whether the trainee correctly incises the ligament. If desired, portions of evaluation circuit 416 or another such circuit can also be configured to evaluate whether the endotracheal tube is positioned in the proper orientation, and at the proper depth.

Each evaluation circuit in surgical trainer 100a is electrically coupled to a selector switch 418. The incorporation of selector switch 418 enables a user to determine whether the feedback provided by the evaluation circuits will be used to provide feedback immediately to a trainee, as indicated by a block 420, or if the feedback will be stored by a controller for later review, or made available only to a proctor (or both) as indicated by a block 422. As described in conjunction with FIGS. 12A-12D, feedback can be provided visually, audibly, or as stored data using a controller.

Simulated Joints Incorporating Conductive Elastomers

FIGS. 17A and 17B schematically illustrate the incorporation of conductive elastomer-based evaluation circuits into a simulated knee. It should be understood that other joints can be simulated, and the present invention is not intended to be limited in application only to use on simulated knees. A common medical procedure performed on joints is aspirating accumulated fluid from the interior of the joint. This procedure is schematically illustrated in FIG. 17A, with the needle of a syringe 428 being inserted into a simulated knee 424. Simulated knee 424 accurately represents an actual knee and the tissue adjacent thereto. Elastomers are used as described above, to simulate tissues such as skin, muscle, and fat. More rigid polymers can be employed to simulate bone, cartilage, tendons and or ligaments associated with the knee. Simulated knee 424 includes an evaluation circuit 426 configured to evaluate aspiration of the simulated knee. It should be understood that other joint-related procedures can also be simulated, and evaluation circuits can be specifically configured to evaluate a specific procedure on such a joint. Thus, the present invention is not intended to be limited to evaluating aspiration of joints.

Conductive elastomers of evaluation circuit 426 are disposed adjacent to a skin layer of simulated knee 424, to determine if a person doing the procedure has selected the proper position for insertion of syringe 428. As illustrated, this portion of circuit 426 can be configured like the bull's eye of FIG. 13, if desired. FIG. 17B schematically illustrates conductive elastomers 426a, 426b, and 426c of evaluation circuit 426 that monitor the corresponding regions to detect the location where the needle is inserted. Evaluation circuit 426 is thus configured to determine if the needle of the syringe has been inserted into knee 424 along a desired track, and to an appropriate depth. Each portion of circuit 426 can be implemented as a discrete circuit, or as a portion of a single circuit.

Simulated Bones Incorporating Conductive Elastomers

FIG. 18 schematically illustrates the incorporation of conductive elastomer-based evaluation circuits into a simulated bone 432. Common medical procedures performed on bones include the withdrawal of bone marrow, and the reattachment of bone fragments into a unified structure. Simulated bone 432 is fabricated of a rigid polymer having an appropriate strength and density. Less dense and rigid polymers are employed to form a core of the simulated bone. Elastomeric materials are used to simulate tissues, such as muscle and fat, associated with a bone, generally as noted above, and can also be used to simulate bone marrow. If desired, physiological training and evaluation simulators of bones can be provided that include none of the tissues normally attached or adjacent to a bone. For simplicity, simulated bone 432 is shown without any associated tissues; however, it is also possible to provide physiological training and evaluation simulators that include both simulated bone and simulated tissue.

Simulated bone 432 includes an evaluation circuit 434 configured to determine if a bone marrow retrieval procedure is performed properly. Evaluation circuit 434 is disposed at a position relative to simulated bone 432 that is appropriate for evaluating a bone marrow retrieval procedure and is preferably not visible to a person performing the procedure. If simulated tissues associated with the bone are provided in a physiological training and evaluation simulator, then evaluation circuit 434 can alternatively be incorporated in such tissues. For physiological training and evaluation simulators that include only simulated bone, but not the related tissue, evaluation circuit 434 is preferably incorporated into simulated bone 432. If desired, evaluation circuit 434 can include portions configured to determine whether the syringe employed to extract simulated marrow has been inserted at a preferred angle, and to a preferred depth, generally as discussed above with respect to syringe 428 in FIG. 17B and syringe 385a of FIG. 15.

Simulated bone 432 includes a fragment 436a separable from a remainder 436b. A procedure often employed to rejoin a fragment to the remainder is to drill a hole passing through the fragment and into the remainder, and to insert a rod or screw into the hole to join the fragment to the remainder while the body's healing processes fuse the fragment and remainder together. Simulated bone 432 thus includes an evaluation circuit 438, configured to evaluate whether a hole drilled by a person performing the procedure is properly positioned. Conductive elastomers comprising evaluation circuit 438 are disposed along the preferred drill path through the fragment and remainder of the bone and the drill bit completes a circuit (or breaks a circuit) formed by the conductive elastomers to provide an indication that the drill is properly positioned to drill the hole for the rod.

Fabricating Conductive Elastomer-based Evaluation Circuits

FIG. 19A is a flowchart 450 showing the steps employed to construct a conductive elastomer-based evaluation circuit in accord with the present invention. In a block 452 a monomer capable of forming an elastomer is provided, along with a conductive carbon. Note that specific monomers can be selected based on the simulated physiological structure in which the evaluation circuit will be incorporated. Many types of conductive carbons are available. Conductive carbon nanomaterials can be employed; however, the cost of such materials may not be warranted. Significantly less expensive carbon blacks also can provide the required conductive properties and are readily available in granulated form, so that mixing the conductive carbon into an uncured liquid monomer is readily accomplished. There is no specific requirement for the conductive carbon, beyond its ability to be successfully incorporated into an elastomeric matrix, and that the resulting elastomer be electrically conductive. In the working model described in conjunction with FIG. 14, commercially available graphite powder was employed with excellent results. In general, exemplary conductive carbons possess the following key properties: excellent dispersion, integrity of the carbon structure or network, and consistent particle size. Exemplary specific resistance properties include a high resistance of less than 10 ohm-cm, a general resistance of 10-100 ohm-cm, and antistatic resistance of greater than 1000 ohm-cm.

While conductive carbons represent a preferred material, due to the ease with which carbon can be incorporated into elastomeric materials, it should be understood that the present invention is not limited to employ only conductive carbons. Metallic powders can be incorporated into elastomers as well, as long as the metal does not undesirably change the texture, density, and tactile properties of the elastomer to such an extent that the resulting elastomer is no longer well suited for being employed in a simulated physiological structure. Metal foils can be incorporated into elastomeric materials, subject to the same concerns. There are also classes of electrically conductive polymers that are known and which are suitable for use in creating evaluation circuits as used in the present invention.

Adding conductive carbon to a monomer before curing an elastomer has the benefit of being relatively simple and inexpensive. While some conductive carbons are costly (i.e., carbon nanomaterials), many conductive carbons such as graphite and conductive carbon blacks are available at modest cost. Furthermore, the resulting elastomer, with conductive carbon distributed throughout the matrix, is surprisingly resilient. Some of the simulated medical procedures involve repeatedly inserting a needle of a syringe into an elastomer-based simulated tissue structure. In the working model described in conjunction with FIG. 14, a needle was repeatedly inserted into a conductive elastomer fabricated of a monomer and conductive carbon. Despite repeated punctures, the resiliency of the elastomeric material caused the material to spring back and seal the puncture that had been formed as soon as the needle was removed. No damage was done to the conductive elastomer, such as causing a short in the circuit. In contrast, had a metal foil been encased in layers of an elastomeric material, repeated needle punctures in the same area would have resulted in a hole being formed in the metal foil. If the hole should become sufficiently large, later insertions of the needle into the same area might miss contacting conductive material. The conductive elastomer made with conductive carbon did not evidence any such flaw. This "self-healing" capability is a desirable characteristic, because a physiological training and evaluation simulator that includes replaceable simulated tissue must be capable of being repetitively used without need for too frequent replacement of the portions of the simulator that are not intended to be replaced after each use. Reducing the frequency of replacement saves both time and costs.

Referring once again to FIG. 19A, once the conductive carbon and the monomer have been provided in block 452, the circuit configuration is determined in a block 454. Note that the configuration of the evaluation circuit is highly dependent on the simulated physiological structure in which the circuit will be used, and the simulated medical procedure to be evaluated. For example, as described above, a simulated tissue structure can be configured to enable practice of both DPL and pericardiocentesis. Evaluating DPL can be achieved using a circuit configuration such as achieved using the stacked conductive elastomers 394, 396, 398, 400, 402, and 404 of FIG. 15 (or conductive elastomers 382, 384*a*, 384*b*, 386, 388, and 390). In contrast, pericardiocentesis requires a needle to be inserted at a 45-degree angle, and portions of an evaluation circuit configured for pericardiocentesis cannot simply be stacked atop each other, but instead must be configured in an offset stack (based on the degree of the angle and the distance between the portions (see conductive elastomer 382, 387, and 389 of FIG. 15)).

Once the configuration has been selected based on the simulated physiological structure and the simulated medical procedure to be evaluated, in a block 456, the conductive carbon is mixed with the monomer. The mixture is cast into the desired configuration, as indicated in a block 458. For example, a mold matching the desired configuration is prepared, and the mixture cast into the mold. Alternatively, a flat sheet of conductive elastomer is cast, and the desired configuration is obtained by selectively removing and/or combining portions of the flat sheet to achieve the desired configuration.

In a block 460, the mixture is cured to achieve a conductive elastomer. Those of ordinary skill in the polymeric arts will readily recognize that curing can be achieved in numerous ways, depending upon the monomers employed. A chemical agent can be added to the mixture before it is cast to cause the mixture to cure after a defined cure time has elapsed. Some monomers are cured by the application of certain wavelengths of light.

Closed cell foam is a particular type of elastomeric material, often based on synthetic rubber, that is particularly well suited for use as an acoustical absorbent material. Generally less dense than many other types of elastomers, closed cell foam is characterized by thousands of tiny chambers distributed throughout the foam. The chambers are generated by pumping air into the monomer before the monomer cures. It should be understood that conductive elastomer-based evaluation circuits in accord with the present invention can be produced using closed cell foam, as well as more conventional elastomers.

Conductive fabrics can also be used to produce conductive elastomer-based evaluation circuits in accord with the present invention. Several different types of conductive fabrics are known. Some conductive fabrics comprise synthetic fabrics plated with a metal, such as copper, nickel, or a conductive metallic alloy. Other conductive fabrics are made of metal wire cloth or carbonized synthetic fabric. The conductive fabric can be used in place of the conductive carbon added to an uncured monomer. Preferably, the conductive fabric is cut into the shape and pattern desired and then placed onto a elastomeric substrate. An additional layer of elastomeric material is placed over the conductive fabric, such that the conductive fabric is embedded within an elastomeric matrix. Preferably, the upper and lower layers of elastomer are bonded together, though in some applications it may be desirable to form an un-bonded laminate. The upper layer can be added by pouring a monomer (or mixture of monomers) over the conductive fabric, and causing the monomer(s) to cure in place.

It should be understood that as opposed to a conductive fabric, a conductive yarn or thread could be used, particularly for coupling to switches or servos included within a medical model. Note that a conductive yarn (i.e. a textile coated with a conductive material) more realistically simulates nerves than would a conventional metallic wire encapsulated in an insulative sheath.

FIG. 19B is a flowchart 451 showing the steps employed to construct a conductive elastomer-based evaluation circuit using a conductive fabric. In a block 453, a conductive fabric is provided. Generally, wire cloth is less desirable than synthetic fiber-based conductive fabric because the synthetic fiber is more likely to enable a realistic simulated physiological structure to be achieved (wire mesh does not simulate any anatomical structure, whereas synthetic fiber can more readily simulate a fibrous tissue layer). However, wire cloth enables a functional circuit to be achieved. In a block 455, the circuit configuration is determined (this step is analogous to the step of block 454 in FIG. 19A). Again, the configuration of the evaluation circuit is highly dependent on the simulated physiological structure in which the circuit will be used, and the simulated medical procedure to be evaluated.

In a block 457, the conductive fabric is cut to achieve the desired configuration. Strips of fabric can be cut and laid in overlapping patterns to achieve the desired configuration, or the required pattern can be cut from a single sheet of fabric. In a block 459, the cut fabric is placed on a lower elastomeric layer. The specific elastomer selected is preferably based on the simulated physiological structure and the location of the circuit relative to the simulated physiological structure. If the circuit is to be disposed within a simulated tissue structure in a fatty layer, the elastomer selected ought to realistically simulate fat. In a block 461, an upper elastomeric layer is placed over the fabric and the lower elastomeric layer, thereby encapsulating the fabric in an elastomeric matrix. While the upper elastomeric layer will often be identical to the lower elastomeric layer, the present invention is not limited to such a configuration.

Referring to FIG. 15, it will be noted that conductive elastomer 398 is disposed between fibrous layer 210 and muscle layer 212, which as described above, are preferably implemented using elastomers of differing densities and thicknesses. If conductive elastomer 398 is implemented using a conductive fabric, the lower elastomeric layer is preferably made from the same elastomer used in muscle layer 212, while the upper elastomeric layer is preferably made from the same elastomer used in fibrous layer 212. Conductive elastomer 398 would thus be implemented by a conductive fabric encapsulated in an elastomeric matrix, the elastomeric matrix being configured to correspond to a specific portion of simulated human tissue structure 200a (FIG. 15). As noted above, the upper and lower elastomeric layers can be pre-formed and bonded together after being cured, or the upper layer can be cured in place over the fabric and lower elastomeric layer.

Several additional techniques can be employed to produce a conductive elastomer-based evaluation circuit. Circuits can be printed onto thin substrates using both offset lithography and a derivative of ink-jet printing technology. Relatively complicated circuits can be printed using either approach. The substrate can then be sandwiched between layers of elastomers to achieve an embedded circuit in an elastomeric mass. Substrates can include specialty papers and polymers. Furthermore, careful selection of the substrate will enable the substrate to be selectively dissolved, leaving behind the circuit, which is then embedded in an elastomeric matrix. For example, polyvinyl alcohol based plastics are water soluble and can be used for the substrate. Printing of conductive ink onto polyvinyl alcohol will produce a circuit of a desired configuration. That circuit can be placed onto an elastomeric layer, and the elastomeric layer and circuit will then be placed in a water bath. The polyvinyl alcohol-based substrate dissolves in the water, and the circuit is deposited onto the elastomeric layer. An additional elastomeric layer is placed over the original elastomeric layer, laminating the circuit between the elastomeric layers. The upper layer can be adhesively coupled to the lower layer, or a monomer (or mixture of monomers) can be poured over the first layer, and the circuit and allowed to polymerize.

FIG. 19C is a flowchart 463 showing the steps employed to construct a conductive elastomer-based evaluation circuit using a printed circuit. In a block 465 a conductive ink, a substrate, and a printer are provided. In a block 467, the circuit configuration is determined (this step is analogous to the step of block 454 in FIG. 19A and of block 455 in FIG. 19B). In a block 469, a circuit is printed based on the configuration determined in block 467. Generally, the circuit configuration is entered into a computer program configured to control the printer. In a block 471, the printed circuit is removed from the printer and placed on a lower elastomeric layer. Again, the specific elastomeric material used is preferably based on the simulated physiological structure with which the circuit will be used. In an optional block 473, the substrate onto which the circuit has been printed is dissolved. Of course, this step requires the selection of a substrate in block 465 that is soluble in a solvent that will not dissolve either the circuit or the underlying elastomeric layer. Polyvinyl alcohol-based plastic is again suitable because it is water soluble, whereas many elastomers and conductive ink residues (primarily metals) are not. Some papers will readily dissolve in water, and such papers can alternatively be used as a substrate. Note that if the upper elastomeric layer to be formed over the circuit and the lower elastomeric layer is provided as a solution of an uncured elastomer, and the substrate is soluble in the solution of the uncured elastomer, that a separate step for dissolving the substrate is not required, as merely adding the solution to generate the upper elastomeric layer will cause the substrate to dissolve. In a block 475, an upper elastomeric layer is placed over the circuit and the lower elastomeric layer, thereby encapsulating the circuit in an elastomeric matrix. As noted above, the upper elastomeric layer can be a different type of elastomer, and can be pre-cured or cured in place over the circuit and the lower elastomeric layer.

Clearly, conductive elastomers can be fabricated using a variety of methods. It should be understood that a conductive elastomer is an elastomer that in addition to its normal elastic properties, is also able to conduct electricity. Conductive elastomers in accord with the present invention can be prepared by introducing a conductive metal or carbon fiber or powder into an elastomeric matrix, preferably before curing. Metal foils, wires, conductive fabrics, and circuits printed using conductive inks can be sandwiched between elastomeric layers to form an elastomeric mass that is conductive. It will further be appreciated that inherently conductive polymers are known, and that circuits can be produced using such inherently conductive polymers. Examples of inherently conductive polymers include poly(ethylene-dioxythiophene), polyaniline, polypyrrole, and poly(phenylene vinylene). Circuits formed from such inherently conductive polymers can then be integrated into an elastomeric matrix in the same manner that a printed circuit or a conductive fabric is, generally as described above. Those of ordinary skill in the art will recognize that the above noted inherently conductive polymers are merely exemplary, and that other inherently conductive polymers can also be beneficially employed.

Making Simulators That Include Conductive Elastomer-Based Evaluation Circuits

FIG. 20 is a flowchart 440 showing the steps employed to construct a physiological training and evaluation simulator including a conductive elastomer-based evaluation circuit in accord with the present invention. In a block 442, a physiological structure to be simulated is selected. In a block 444, a medical procedure related to the selected physiological structure is chosen. Then, in a block 446, a configuration of an evaluation circuit to be used to evaluate the chosen medical procedure performed on the selected simulated physiological structure is determined. A block 448 provides for producing a physiological training and evaluation simulator that includes a simulated physiological structure corresponding to the selected physiological structure, and a conductive elastomer-based evaluation circuit configured to evaluate a person's performance of the chosen medical procedure performed upon the simulated physiological structure. Details of producing simulated physiological structures and evaluation circuits have been discussed above.

Preferably, the electrical evaluation circuit is disposed proximate a location on the simulated physiological structure at which a medical device will be employed in a simulated medical procedure, to evaluate if the person performed the simulated medical procedure properly. For example, the electrical evaluation circuit can be included under the outer layer (s) of the simulated physiological structure as the physiological training and evaluation simulator is constructed. The electrical evaluation circuit can be configured to include a gap, such that sides of the gap formed in the electrical evaluation circuit are electrically coupled to form a complete circuit by a conductive medical device, when the medical device is properly utilized to perform the simulated procedure. Alternatively, the electrical evaluation circuit can be configured to be complete, so that a portion of the electrical evaluation circuit is broken or cut by a medical device to open the circuit, when the medical device is properly utilized to perform the simulated procedure. The electrical evaluation circuit can include a light source to provide a visual indication, and/or an audio source to provide an audible signal to indicate when the medical device is properly utilized to perform the simulated procedure, as described above.

Using Simulators Including Conductive Elastomer-Based Evaluation Circuits

FIG. 21 is a flowchart 462 of the sequence of steps employed to use a physiological training and evaluation simulator including a simulated physiological structure and a conductive elastomer-based evaluation circuit to evaluate the performance of a person using the physiological training and evaluation simulator to simulate a medical procedure, which are provided in a block 464. In a block 466, a person uses the physiological training and evaluation simulator to perform a simulated medical procedure. In a block 468, the evaluation circuit provides feedback indicative of the person's performance in carrying out the procedure.

As described above, it should be noted that conductive elastomer-based electrical evaluation circuits can be configured to provide an indication that the person has either correctly or incorrectly performed the procedure, or both, as desired. The feedback can be visible, audible, or stored as data. The feedback can selectively be provided to a person while doing the procedure or to a proctor, such that the person doing the procedure is unaware of the evaluation of the performance during the simulated medical procedure.

Simulators with Complex Conductive Elastomer-Based Evaluation Circuits

The conductive elastomer-based evaluation circuits discussed above have been relatively simple and have provided feedback based on whether the circuit is "on" or "off" (i.e. "closed" or "open"). Some of the above examples provide feedback when a user action causes an open circuit to become closed. Other examples provide feedback when a user action causes a closed circuit to become open. Feedback is provided based on whether current flows through the circuit. Those of ordinary skill in the electrical arts will recognize that many circuit designs are possible wherein feedback can be provided based on a change in the level of electrical current flowing in a circuit, rather than simply on whether current is flowing through the circuit. It is thus expected that such circuit designs will be employed in physiological simulators in accord with the present invention.

One such embodiment would include a circuit configured to detect an increase in current flowing through the circuit. Such a circuit would be employed with a simulated medical instrument capable of inducing a current in the evaluation circuit. Induction can be achieved either with a rotating magnet or an energized alternating current coil. Generally an energized circuit (usually a conductive coil wrapped around a magnetically permeable core) in the simulated medical instrument will be preferred, because such a circuit can be made more compact than a rotating magnet. Induction cannot only be used to change the level of current flowing in an evaluation circuit, it can also be used to induce a flow of current within an evaluation circuit that is not directly coupled to a source of electrical current. Thus, induction can be used for both feedback based on a state change (i.e., on/off conditions of current flow), and feedback based on a change in current amplitude (e.g., by inducing more or less current to flow in the evaluation circuit). A useful aspect of induction is that the amount of current induced to flow in the evaluation circuit can depend upon how close a rotating magnet or energized circuit is to the evaluation circuit. If the rotating magnet or energized circuit is too far from the evaluation circuit, no change in the evaluation circuit occurs (because current is not induced to flow in the circuit). However, once a threshold distance has been reached, as the distance between the inductive source (the rotating magnet or the energized circuit) and the evaluation circuit decreases, the amount of current induced in the evaluation circuit increases. Thus, the induction of current can be used to enable a conductive elastomer-based evaluation circuit to determine how close a simulated medical instrument comes to the evaluation circuit, even if the simulated medical instrument never physically contacts the evaluation circuit.

FIG. 22A illustrates a simulated medical instrument that interacts with conductive elastomer-based evaluation circuits in a medical model via induction. A human patient simulator 480 includes a simulated esophagus 482 and a simulated stomach 484. Esophagus 482 includes simulated abnormal tissue 486 and an esophageal stricture 488.

Abnormal tissue and esophageal stricture are commonly associated with gastroesophageal reflux disease (GERD), a very common disorder. GERD occurs when the sphincter muscle at the bottom of the esophagus (not shown in FIG. 21) relaxes and regularly allows stomach acid into the esophagus. GERD is characterized by symptoms and/or tissue damage resulting from repeated or prolonged exposure of the lining of the esophagus to stomach acid. One type of tissue damage that can occur is referred to as Barrett's esophagus, in which the normal tissue lining the esophagus is replaced by tissue normally found in the stomach (i.e., acid-resistant tissue). While the tissue replacement may be a defense mechanism, the presence of such abnormal tissue within the esophagus has been clinically identified as being a risk factor for adenocarcinoma (cancer of the lower esophagus). Thus, abnormal tissue 486 is associated with Barrett's esophagus.

A second type of tissue damage associated with GERD is an esophageal stricture. The lower esophagus can open to the size of a quarter or wider. When recurrent inflammation occurs in the esophagus, scarring develops, underlying tissues becomes fibrous, and the opening narrows. In advanced cases, this narrowing, or stricture, can be severe. The opening may be reduced to the size of a pencil or even smaller. Food and fluid are delayed and only move slowly across the opening. into the stomach. A large piece of food, such as meat, may completely block the esophagus. Thus, stricture 488 is associated with GERD.

Medical instruments may be inserted into the esophagus to perform diagnosis or treatment related to GERD. The medical instrument can provide images to the physician, as the tissue associated with Barrett's esophagus is readily identifiable. The medical instrument may also be used to obtain a biopsy of abnormal tissue in the esophagus, to determine if any of the abnormal tissue is cancerous. Medical instruments inserted in the esophagus can be used to dilate a stricture. One dilation technique involves positioning a deflated balloon within the stricture, then inflating the balloon to dilate the opening. Simulated medical instrument 496 can thus be configured to simulate an endoscope, a tissue sampler, or a dilator.

Human patient simulator 480 includes a plurality of conductive elastomer-based evaluation circuits 490 (including circuits 490a, 490b, and 490c), disposed at regular intervals along esophagus 482. As discussed in greater detail below, the majority of conductive elastomer-based evaluation circuits 490 are shown as dashed lines, indicating that such circuits are not providing feedback, while conductive elastomer-based evaluation circuits 490a, 490b, and 490c are shown as solid lines, indicating that circuits 490a, 490b, and 490c are providing feedback. While FIG. 21 schematically shows a cross section of human patient simulator 480, it should be understood that circuits 490 can be disposed in a radial pattern about esophagus 482. The evaluation circuits are preferably coupled to nodes 492, which in turn are coupled with a processor 494. As discussed above, processor 494 can be disposed within or external to the medical model. The processor can be coupled with a display such that a trainee can receive feedback during a simulated procedure, or the data collected by the evaluation circuits can be provided only to a proctor and/or saved for later review. Nodes 492 are not specifically required, as each individual circuit can be separately coupled to the processor. It should be understood that each individual evaluation circuit is coupled to processor 494 so that the processor can track changes in individual circuits. The plurality of evaluation circuits 490 can be considered as comprising a single large scale evaluation circuit that includes a plurality of branches, each of which is logically coupled to the processor, so that the processor can evaluate the circuit as a whole, or evaluate individual branches of the circuit, as required.

A distal end of simulated tool 496 includes an inductor 498. As discussed above, electrical induction can be achieved using a rotating magnet or an energized coil. While powerful and relatively small rare earth magnets (such as neodymium-iron-boron magnets) are readily available, given the relatively small size of esophagus 482, it is more likely that inductor 498 will be implemented as an energized circuit (or electromagnetic coil). Once simulated medical instrument 496 is inserted into esophagus 482 and inductor 498 is energized, the position of the distal end of simulated medical instrument 496 (i.e., the position of inductor 498) can be determined by monitoring the plurality of conductive elastomer-based evaluation circuits 490. Inductor 498 will induce a current to flow in those evaluation circuits closest to the inductor. Those of ordinary skill in the art will recognize that factors such as the distance from the inductor to the evaluation circuits and the design of the inductor will determine how many of the evaluation circuits will experience an induced current. As shown in FIG. 22A, three evaluation circuits 490a, 490b and 490c on the left and three evaluation circuits 490a, 490b and 490c on the right are shown in bold, indicating that these evaluation circuits are experiencing an induced current. Evaluation circuits 490a, 490b and 490c thus respond to the location of inductor 496 without any physical contact by the simulated tool. Furthermore, because evaluation circuits 490a are disposed closest to inductor 496, more current will be induced in evaluation circuits 490a than in evaluation circuits 490b or 490c. Feedback provided by the evaluation circuits in human patient simulator 480 is therefore based not only on the presence of an induced current, but also on the magnitude of the induced current. This embodiment is in contrast to the evaluation circuits discussed above, which provide feedback solely based on whether the circuit is in an on or off state, independent of the magnitude of current flowing in the circuit.

By monitoring the magnitude of the electrical currents flowing in the evaluation circuits, conductive elastomer-based evaluation circuits 490 (including valuation circuits 490a, 490b and 490c) can be used to determine the position of the distal end of simulated medical instrument 496. As a result, human patient simulator 480 can be used to provide feedback about several different simulated esophageal procedures. In a simulated diagnostic procedure, feedback can be provided when, or if, the trainee properly positions an endoscope adjacent to simulated abnormal tissue 486. In a simulated biopsy, feedback can be provided when, or if, the trainee properly positions a tissue sampler to obtain a sample of simulated abnormal tissue 486, as opposed to normal esophageal tissue. In a simulated dilation procedure, feedback can be provided to determine if the trainee has properly positioned the dilator to expand stricture 488. If desired, the stricture can be formed using a fluid-filled bladder, so that the dilation forces fluid out of the bladder into a reservoir, enabling the stricture to be reduced in size. Fluid can then be forced from the reservoir back into the bladder, increasing the size of the stricture so that the dilation procedure can be simulated repetitively. Note the dilation procedure is similar to balloon angioplasty, and that the same principles can be employed to simulate balloon angioplasty in an appropriately configured simulated physiological structure.

Circuits including capacitance based switches and sensors have been discussed above in conjunction with FIGS. 10D and 15. It should be understood that a capacitance sensing circuit can be beneficially incorporated into. esophagus 482, in lieu of or in addition to the circuits discussed above, as is shown in human patient simulator 480a of FIG. 22B. Opposite sides of esophagus 482 can be configured as the opposed plates 493a and 493b of a capacitor, with the air in the esophagus being the dielectric between the opposed plates. As discussed in detail above, when simulated medical instrument 496 is introduced into the gap between the opposed plates of a capacitor (i.e. into the dielectric), the baseline charge of the capacitor changes. This effect can be used to determine the location of the distal end of a simulated medical instrument relative to the esophagus. Such a capacitance sensing circuit would be similarly coupled to node 492 (via lead 493c), and processor 494. In yet another embodiment, one wall of esophagus 482 (i.e. plate 493b) can be configured as a first plate of a capacitor, while simulated tool 496 is configured as the second plate of the capacitor (in such an embodiment plate 493a is not needed). As the position of simulated tool 496 changes relative to the portion of the esophagus configured as the other plate of the capacitor, the baseline charge of the capacitor changes and is measured. As discussed above in conjunction with the description of capacitance sensitive circuits, the incorporation of capacitance sensitive elements in a conductive elastomer-based evaluation circuit enables proximity, and degrees of proximity, between an object and the capacitance sensitive elements in the circuit to be determined.

FIG. 22C illustrates a human patient simulator 480b which includes a conductive elastomer-based evaluation circuit that is configured to be completed when a simulated portion of tissue is removed and adjoining tissue is sutured together. Human patient simulator 480a includes simulated intestines 491. At least one portion 493 of intestines 491 includes a blockage that must be removed. Portion 493 is logically coupled to processor 494, and is shown in an enlarged view. Portion 493 is a generally tubular elastomeric structure that includes portions 495 which are conductive, and portion 497 (representing a blockage) that is not conductive. Removal of portion 497, and properly joining portions 495, will complete the conductive elastomeric evaluation circuit and processor 494 will receive a signal. Substantially all of portions 495 can be conductive, or if desired only limited sections of portions 495 can be made conductive. The less of portions 495 that are conductive, the more critical it is that relative alignment between opposed portions 495 be correct when the opposed portions are sutured together. When less than all of portions 495 are conductive, misalignment between the conductive sections of portions 495 will cause the circuit to remain open. Non conductive portion 497 may be configured to be visually distinguishable from portions 495. For example, some blockages are a result of a diseased condition which results in visible changes to tissue. It should be understood that human patient simulator 480*b* can include other conductive elastomer-based evaluation circuits as well. Further, the removal of a portion of a simulated physiological structure to complete a circuit is not limited to simulated intestines. Such a configuration can be applied to simulated veins, simulated arteries, and other physiological structures.

FIG. 22C also includes a sensor 483 disposed within a simulated circulatory system 485 (simulated circulatory system only partially shown). The sensor is coupled to the processor via a conductive elastomer-based circuit. The sensor is configured to detect chemicals used to simulate drugs given to a patient during a medical procedure. Note that such sensors can be employed in conjunction with other simulated physiological structures, such as within a simulated internal organ, or within a simulated stomach. Sensor 483 communicates to processor 494, which determines if the quantity of chemical detected is sufficient to trigger a simulated physiological response. If so, processor 494 communicates with a pump 487 (or servo) controlling a simulated heart 489, and changes the simulated heartbeat. Note that the actual chemical introduced into the simulated circulatory system and detected by sensor 483 can be different than a real world drug that would actually be used to trigger the desired physiological response, as long as the processor is configured to control the pump or servo to simulate a physiological response that is consistent with the desired physiological response. For example, if a first dose of a real drug has no measurable effect on heart rates, a second larger dose has a measurable effect on heart rates, and a third even larger dose causes heart seizures, the processor can be configured to respond to equivalent doses of a different chemical the sensor is configured to detect. This enables relatively low cost chemicals to be used in place of expensive and potentially toxic drugs. It should be understood that other types of sensors (such as temperature sensors) can also be used to enable simulated physiological responses to be achieved.

FIG. 23 illustrates a complex conductive elastomer-based evaluation circuit implemented as a three-dimensional grid distributed throughout substantially the entire volume of a medical model. A section 502 of organ 406 is shown in an exploded view, illustrating evaluation circuit 504 implemented as a three-dimensional grid. It will be understood that such a grid can be distributed throughout the entire volume of organ 406, as in this example, or less preferably, only throughout an area where a simulated procedure is likely to be performed. Distributing evaluation circuit 504 throughout the entire volume of organ 406 is preferable, because in such an implementation, evaluation circuit 504 can provide feedback relating to a significant volume of organ 406. It should be understood that such three-dimensional grids can be implemented in other types of medical models, such as the tissue structure, bone, joint, and human patient simulator models discussed above. While such a three-dimensional grid is more complex to implement, the feedback provided by such a grid is highly detailed. In combination with the inductor described above, this type of grid can provide three-dimensional positional data enabling a trainee or proctor to monitor the position of a simulated medical instrument (equipped with an inductor) throughout each phase of a simulated procedure. The resulting positional data can be compared against a standard, to provide a quantitative measure of a trainee's execution of a simulated procedure.

FIG. 24 schematically illustrates a human patient simulator 510 that includes a highly complex conductive elastomer-based evaluation network 512 (i.e. a complex multipart circuit). In at least one embodiment, network 512 is implemented as a three-dimensional grid distributed through the volume of human patient simulator 510. In another embodiment, network 512 is distributed throughout human patient simulator 510 so that it corresponds to the configuration of the neural network present in human anatomy. The human neural network is designed to collect electrical impulses from substantially the entire body and to transmit those impulses to the brain. A simulated neural network would similarly be used to collect electrical signals from substantially all of human patient simulator 510, and these signals will be transmitted to and analyzed by a processor 516. It should be understood that communication with processor 516 can be bidirectional, such that commands to actuate servos coupled to network 512 can flow from processor 516, through network 512, and to the servo (or other controllable component). Regardless of the implementation (grid versus neural network), network 512 includes a port 514 used to couple the network to processor 516. As discussed above, processor 516 can be disposed within, or external to human patient simulator 510, and can be beneficially implemented as a computer, or an application specific integrated circuit (ASIC).

As shown, human patient simulator 510 includes simulated lungs 518, simulated joints 520 and 522, and a simulated heart 524. While no simulated skeletal structure is shown, it will be understood that such a skeletal structure can be, and preferably is, incorporated into human patient simulator 510. In at least one embodiment, human patient simulator 510 includes simulations of each major anatomical structure within a human body.

Network 512 includes major branches(shown in bold) 512*a* that are coupled to each smaller portion of the network, and branches 512*a* are coupled to port 514. Each simulated physiological structure within human patient simulator 510 (i.e., lungs, organs, joints, tissue, etc.) preferably includes conductive elastomer-based evaluation circuits that are coupled to a major branch, so that feedback from the structures can be collected via port 514. Port 514 and major branches 512*a* can be used to provide bi-directional signal flow. In some embodiments, simulated lungs will be coupled to a pump that causes the lungs to inflate and deflate. In other embodiments, servo motors will be incorporated into joints or other simulated structures to simulate voluntary and involuntary movements (i.e. blinking, breathing, flushing). Thus, port 514 and major branches 512*a* can be used to distribute control signals from processor 516 to such controllable components (not separately shown in FIG. 24). A deluxe human patient simulator includes simulated physiological structures having conductive elastomer-based evaluation circuits, each coupled to network 512, so that data relating to many different types of simulated procedures can be collected and analyzed.

Using Feedback Collected from Conductive Elastomer-Based Evaluation Circuits

In a simple form, conductive elastomeric evaluation circuits in accord with the present invention are configured to provide feedback when a simulated procedure completes or breaks the evaluation circuit. In such implementations the metric is simply whether a current is flowing through the circuit. As noted above, other implementations will employ more complex circuits. Those of ordinary skill in the art will recognize that such circuits can be configured to provide more sophisticated types of feedback. Such uses include, but are not limited to, determining a three-dimensional position of a simulated medical instrument (such as a needle, a catheter, an endoscope, or other tool) during each phase of a simulated procedure, measuring pressure (useful for determining if the force applied by a trainee in handling a structure such as an organ is appropriate), measuring impedance changes throughout a circuit, identifying which portion of a simulated physiological structure has been incised, and/or responding to changes in pressure. The use of appropriate sensors in a conductive elastomer-based evaluation circuit will enable changes in physical properties of the model to be evaluated. For example, some medical procedures involve the application of heat, cold, electromagnetic radiation and or chemicals (i.e. drugs) to tissue or other physiological structures. Appropriate sensors can be incorporated into conductive elastomeric-based evaluation circuits so that feedback relating to the physical property change can be gathered. For example, quantitative chemical sensors can be included that will determine if a required dosage of a physiologically active drug has been administered, such that the correct physiological response is simulated by the model (i.e. a change in simulated respiratory rates, a change in a simulated heartbeat, etc.). The conductive elastomer-based evaluation circuit (or network) can be used for bidirectional communication with a controller or processor (i.e. data from the network/circuit to the processor, and commands from the processor to the network/circuit).

The electrical signal from the conductive elastomer-based evaluation circuit can be utilized in a variety of different ways. The electrical signal (or the interruption or change in a signal) can be used to provide relatively simple feedback, such as lights that turn on or off, and/or the activation of aural or verbal prompts or cues. The electrical signal from the evaluation circuit can also be manipulated and analyzed by more complex systems, such as a computer. The use of a computer enables data collected during a training exercise to be immediately processed and displayed, immediately processed but stored for later use, stored for later processing, compared to similar data, electronically distributed to other users in a network, or any combination thereof.

FIG. 25 is a flowchart 530 showing the steps employed to collect data during a simulated procedure using a conductive elastomer-based evaluation circuit incorporated in a simulated physiological structure, and the step employed to evaluate such data. In a block 532, a medical model including a conductive elastomer-based evaluation circuit is provided. Also provided is a standardized preferred score that represents a satisfactory completion of a specific simulated procedure performed on the model. In one embodiment, the preferred score is obtained by having a skilled surgeon perform the simulated procedure on the simulated physiological structure.

In a block 534, a trainee performs the simulated procedure, and the evaluation circuit provides a signal indicative of a performance of the trainee in completing the procedure (i.e., data are collected from the evaluation circuits). In a block 536, a processor coupled to the evaluation circuit(s) analyzes the data to derive a score for the simulated procedure. In a block 538, the trainee's current score, any past score corresponding to a prior procedure performed by the trainee, and the standardized score are displayed. This step enables the trainee to compare his or her performance to both a standard score, and scores from any prior performances. Thus, even if the trainee fails to achieve the standardized score, the trainee may receive positive reinforcement of an improvement, based on a comparison with earlier attempts.

The concept of saving old scores and comparing older scores with current scores can be extended to include a comparison of a current score with scores of other trainees. For example, a medical school may collect data for students in each year of medical school who perform the same simulated procedure. Those scores can be averaged to determine a standardized score for first year students, a standardized score for second year students, and so on. Trainees can then compare their scores with such standardized scores, to evaluate their progress. The scores of other students can be further separated by class rank, so that trainees can evaluate their performance based on class rankings to see if their score is consistent with a higher class ranking or a lower class ranking. Scores can be collected nationally so trainees can evaluate their progress compared to a national learning curve.

One score based metric that is likely to be very useful is a measurement of a rate at which skills are learned. Learning institutions that wish to increase the efficiency of their programs need to collect data relating to different teaching strategies, in order to compare the different strategies to identify those strategies which consistently result in higher evaluation scores. Simulators including conductive elastomer-based evaluation circuits can be used to evaluate the performance of students undergoing different training curriculums, and the results obtained can be compared to identify the curriculum that facilitates higher scores.

The present invention can be implemented as a system that collects data using conductive elastomer-based evaluation circuits incorporated in a simulated physiological structure, stores the collected data in a digital format, processes and evaluates the data, and compares the data to related data. The benefits of the present invention will therefore be readily apparent.

Although the present invention has been described in connection with the preferred form of practicing it and modifications thereto, those of ordinary skill in the art will understand that many other modifications can be made to the present invention within the scope of the claims that follow. Accordingly, it is not intended that the scope of the invention in any way be limited by the above description, but instead be determined entirely by reference to the claims that follow.

The invention claimed is:

1. A physiological training and evaluation simulator suitable for training and testing personnel, comprising:
   (a) a simulated physiological structure; and
   (b) an evaluation circuit including a conductive elastomer, the conductive elastomer enhancing the realism of the simulated physiological structure, the conductive elastomer being configured as a portion of the simulated physiological structure, said evaluation circuit being configured to conduct an electrical signal from a chemical sensor disposed in the physiological training and evaluation simulator when the sensor detects a chemical in the physiological training and evaluation simulator;
   (c) a processor coupled to the evaluation circuit and configured to determine if a quantity of the chemical administered in a simulated procedure and detected by the chemical sensor is sufficient to trigger a simulated physiological response; and
   (d) a physiological control element configured to produce a simulated physiological response in the simulated physiological structure, the physiological control element being coupled to the evaluation circuit so that the processor uses the evaluation circuit to control the physiological control element based on input from the chemical sensor.

2. The physiological training and evaluation simulator of claim 1, wherein the conductive elastomer comprises a conductive carbon dispersed in an elastomeric matrix.

3. The physiological training and evaluation simulator of claim 1, wherein the conductive elastomer comprises a metallic powder dispersed in an elastomeric matrix.

4. The physiological training and evaluation simulator of claim 1, wherein the evaluation circuit is implemented in three dimensions.

5. The physiological training and evaluation simulator of claim 4, wherein the evaluation circuit is implemented as a three-dimensional grid.

6. The physiological training and evaluation simulator of claim 5, wherein the three-dimensional grid encompasses a majority of the simulated physiological structure.

7. The physiological training and evaluation simulator of claim 1, wherein the physiological control element comprises at least one of a servo and a pump.

8. A medical training simulator suitable for medical skills training and evaluation, the medical training model comprising a simulated physiological structure and an evaluation circuit including a conductive elastomer, the evaluation circuit including a first conductive segment and a second conductive segment separated by a non conductive segment such that they are not electrically coupled to each other, the first conductive segment and the second conductive segment being part of the simulated physiological structure, said evaluation circuit being configured to provide data related to proper execution of a simulated medical procedure being performed using the simulated physiological structure when the non conductive segment is removed and the first conductive segment and the second conductive segment are coupled together during the simulated medical procedure, thereby completing the evaluation circuit and enabling the evaluation circuit to provide the data related to the proper execution of the simulated medical procedure.

9. The physiological training and evaluation simulator of claim 8, further comprising an indicator coupled to the evaluation circuit, such that in response to the signal the indicator provides an indication relating to the performance of the simulated procedure.

10. The physiological training and evaluation simulator of claim 9, wherein the indicator comprises a light source, light emitted by the light source providing feedback regarding the performance of the procedure.

11. The physiological training and evaluation simulator of claim 9, wherein the indicator comprises a meter, a change in the meter providing feedback regarding the performance of the procedure.

12. The physiological training and evaluation simulator of claim 8, wherein the simulated physiological structure is a simulated human tissue structure.

13. The physiological training and evaluation simulator of claim 12, wherein the simulated human tissue structure comprises:

(a) at least one simulated membranous layer comprising at least one elastomeric layer; and (b) at least one simulated sub-membranous layer comprising at least one elastomeric layer underlying a first membranous layer.

14. The physiological training and evaluation simulator of claim 8, wherein the physiological training and evaluation simulator comprises a surgical trainer, and the simulated physiological structure comprises at least one of a simulated human tissue structure and a simulated organ included in the surgical trainer.

15. The physiological training and evaluation simulator of claim 14, wherein the surgical trainer comprises:

(a) at least one simulated structure corresponding to an internal anatomical structure of a human body;

(b) an exterior cover encompassing a substantial portion of the surgical trainer, the exterior cover having at least one predefined opening defining an operative site, so that each opening is disposed adjacent to a different structure, to facilitate access to said structure; and (c) the simulated human tissue structure is incisable, and is disposed proximate to each predefined opening, such that access to said at least one structure via the adjacent predefined opening requires making an incision in said simulated human tissue structure, an exterior surface of each simulated human tissue structure being substantially flush with respect to an outer surface of the exterior cover, each simulated human tissue structure being removable to be replaced after use, said simulated human tissue structure comprising a plurality of layers, said plurality of layers generally corresponding to layers of tissue found in a human being at a location corresponding to the operative site, and at least one of the plurality of layers including the conductive elastomer.

16. A medical training simulator suitable for medical skills training and evaluation, the medical training model comprising a simulated physiological structure and an evaluation circuit including a conductive elastomer, the evaluation circuit including a first conductive segment and a second conductive segment separated by a gap, such that they are not electrically coupled to each other, the first conductive segment and the second conductive segment being part of the simulated physiological structure, said evaluation circuit being configured to provide data related to proper execution of a simulated medical procedure being performed using the simulated physiological structure when either the first conductive segment or the second conductive segment are repositioned and placed in contact with either the other of the first conductive segment or the other of the second conductive segment during the simulated medical procedure, thereby completing the evaluation circuit and enabling the evaluation circuit to provide the data related to the proper execution of the simulated medical procedure.

* * * * *